US012786384B2

(12) United States Patent

Takehara et al.

(10) Patent No.: US 12,786,384 B2
(45) Date of Patent: *Nov. 3, 2026

(54) PICTURE CODING DEVICE, PICTURE CODING METHOD, PICTURE CODING PROGRAM, PICTURE DECODING DEVICE, PICTURE DECODING METHOD, AND PICTURE DECODING PROGRAM

(71) Applicant: Godo Kaisha IP Bridge1, Tokyo (JP)

(72) Inventors: Hideki Takehara, Yokohama (JP); Hiroya Nakamura, Yokohama (JP); Satoru Sakazume, Yokohama (JP); Shigeru Fukushima, Yokohama (JP); Toru Kumakura, Yokohama (JP); Hiroyuki Kurashige, Yokohama (JP)

(73) Assignee: Godo Kaisha IP Bridge1, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 19/055,900

(22) Filed: Feb. 18, 2025

(65) Prior Publication Data

US 2025/0193375 A1 Jun. 12, 2025

Related U.S. Application Data

(63) Continuation of application No. 17/468,763, filed on Sep. 8, 2021, now Pat. No. 12,261,997, which is a (Continued)

(30) Foreign Application Priority Data

Mar. 8, 2019 (JP) ................................ 2019-042580

(51) Int. Cl.

*H04N 19/105* (2014.01)
*H04N 19/159* (2014.01)
*H04N 19/172* (2014.01)

(52) U.S. Cl.

CPC ......... *H04N 19/105* (2014.11); *H04N 19/159* (2014.11); *H04N 19/172* (2014.11)

(58) Field of Classification Search

CPC .. H04N 19/105; H04N 19/159; H04N 19/172; H04N 19/82

See application file for complete search history.

(56) References Cited

U.S. PATENT DOCUMENTS

| | | | | |
|---|---|---|---|---|
| 2020/0007873 | A1* | 1/2020 | Coban | H04N 19/124 |
| 2020/0288175 | A1 | 9/2020 | Chang et al. | |
| 2022/0070456 | A1* | 3/2022 | Chiang | H04N 19/119 |

FOREIGN PATENT DOCUMENTS

| | | | |
|---|---|---|---|
| JP | H09172644 | A | 6/1997 |
| JP | 2013-118627 | A | 6/2013 |

(Continued)

OTHER PUBLICATIONS

Office Action from corresponding JP Application No. 2025-084649 dated Jan. 6, 2026, 5 pages.

(Continued)

*Primary Examiner* — Patrick E Demosky
(74) *Attorney, Agent, or Firm* — Shih IP Law Group, PLLC

(57) ABSTRACT

There is provided a technique including: a merging candidate constructor structured to construct a merging candidate list including merging candidates having a maximum number of merging candidates including spatial merging candidates; a normal merging candidate selector structured to select a normal merging candidate that is uni-prediction or bi-prediction from the merging candidate list based on a merge index; and a triangle merging candidate selector structured to select a first triangle merging candidate that is uni-prediction from the merging candidate list based on a first triangle merge index and select a second triangle merging candidate that is uni-prediction based on a second (Continued)

triangle merge index, in which a first maximum number of triangle merging candidates regarding the first triangle merge index is the same as the maximum number of merging candidates.

6 Claims, 48 Drawing Sheets

Related U.S. Application Data continuation of application No. PCT/JP2020/009772, filed on Mar. 6, 2020.

(56) References Cited

FOREIGN PATENT DOCUMENTS

| | | | |
|---|---|---|---|
| JP | 7554986 | B2 | 9/2024 |
| WO | 2020/073896 | A1 | 10/2019 |

OTHER PUBLICATIONS

Extended European Search Report from EP Application No. 24186017.0 mailed Oct. 21, 2024, 10 pages.
X. Wang, et al., "Non-CE10: Triangle Prediction Merge List Construction", Joint Video Experts Tean (JVET) of ITU-T SG 16 WP 3 and ISO/IEC JTC 1/SC 29/ WG 11 13th Meeting: Marrakech, MA, Jan. 9-18, 2019., 3 pages.
International Search Report from PCT Application No. PCT/JP2020/009772 mailed Jun. 2, 2020, 6 pages.
International Preliminary Report on Patentability with Written Opinion from PCT Application No. PCT/JP2020/009772 mailed Jun. 17, 2021, 14 pages.
T. Solovyev, et al., "Non-CE4: Simplifications for Triangular Prediction Mode", International Search Report for the corresponding PCT Application No. PCT/JP2020/009772 with English translation Joint Video Experts Team (JVET) of ITU-T SG 16 WP3 and ISO/IEC JTC 1/SC 29/WG 11, 13th Meeting: Marrakech, MA, Jan. 9-18, 2019, Document No. JVET-M0286-v2, 7 pages.
X. Wang, et al., "CE4-Related: An Improved Method For Triangle Merge List Construction", Joint Video Experts Team (JVET) of ITU-T SG 16 WP3 and ISO/IEC JTC 1/SC 29/WG 11,14th Meeting: Geneva, CH, Mar. 19-27, 2019, Document: JVET-N0340_rl, 4 pages.
Extended European Search Report from EP Application No. 20769207.0 dated May 9, 2022, 11 pages.
H. Yang, et al. "Description of Core Experiment 4 (CE4): Inter prediction and motion vector coding", Joint Video Expert Team (JVET) of ITU-T SG 16 WP-3 and ISO/IEC JTC 1/SC 29/WG 11, 13th Meeting: Marrakech, MA , Jan. 9-18, 2019, JVET-M1024-v1, 15 pages.
R. Liao, et al. "CE-10-related: Simplification of Triangular Prediction Unit Mode", Joint Video Expert Team (JVET) of ITU-T SG 16 WP-3 and ISO/IEC JTC 1/SC 29/WG 11, 13th Meeting: Marrakech, MA , Jan. 9-18, 2019, JVET-M0317-r3, 6 pages.
T. Chaung, et al. " CE4-4.1: Simplification of Triangle Merging Candidate List Derivation", Joint Video Expert Team (JVET) of ITU-T SG 16 WP-3 and ISO/IEC JTC 1/SC 29/WG 11, 14th Meeting: Geneva, CH—Mar. 19-27, 2019, JVET-N0083-v1, 5 pages.

* cited by examiner

FIG.9

```
coding_quadtree() {
    qt_split
    if(qt_split) {
        coding_quadtree(0)
        coding_quadtree(1)
        coding_quadtree(2)
        coding_quadtree(3)
    }
    else {
        multi_type_tree()
    }
}
```

```
multi_type_tree() {
    mtt_split
    if(mtt_split) {
        mtt_split_vertical
        mtt_split_binary
        if(mtt_split_binary) {
          multi_type_tree(0, mtt_split_vertical)
          multi_type_tree(1, mtt_split_vertical)
        } else {
          multi_type_tree(0, mtt_split_vertical)
          multi_type_tree(1, mtt_split_vertical)
          multi_type_tree(2, mtt_split_vertical)
        }
    } else {
        // end split
    }
}
```

FIG.12A

```
coding_unit() {
    pred_mode_flag
    if( MODE_INTRA ) {
      intra_pred_mode
    }
    else { // MODE_INTER
        merge_flag
        if( merge_flag ) {
            merge_data()
        } else {
            inter_affine_flag
            if( inter_affine_flag ) {
                cu_affine_type_flag
            }
        }
    }
}
```

FIG.12B

```
merge_data() {
    merge_subblock_flag
    if( merge_subblock_flag ) {
        merge_subblock_idx
    } else {
        merge_triangle_flag
        if( merge_triangle_flag ) {
            merge_triangle_split_dir
            merge_triangle_idx0
            merge_triangle_idx1
        }
        else {
            merge_idx
        }
    }
}
```

| merge_flag | inter_affine_flag | merge_subblock_flag | merge_triangle_flag | Selected Mode |
|---|---|---|---|---|
| 0 | 0 | N/A | N/A | Inter Pred Mode |
| 0 | 1 | N/A | N/A | Inter Affine Mode |
| 1 | N/A | 0 | 0 | Merge Mode |
| 1 | N/A | 0 | 0 | Triangle Merge Mode |
| 1 | N/A | 1 | N/A | Affine Merge Mode |

FIG.13

FIG.38A

| | | | |
|---|---|---|---|
| BI | UNI 0 | UNI 0 | UNI 0 |
| UNI 1 | BI | UNI 0 | UNI 0 |
| UNI 1 | UNI 1 | BI | UNI 0 |
| UNI 1 | UNI 1 | UNI 1 | BI |

FIG.38B

| | | | |
|---|---|---|---|
| UNI 0 | UNI 0 | UNI 0 | BI |
| UNI 0 | UNI 0 | BI | UNI 1 |
| UNI 0 | BI | UNI 1 | UNI 1 |
| BI | UNI 1 | UNI 1 | UNI 1 |

| MERGE INDEX | INTER PREDICTION MODE | L0 | L1 |
|---|---|---|---|
| 0 | Bi | MV0_L0 | MV0_L1 |
| 1 | Uni | MV1_L0 | |
| 2 | Uni | | MV2_L1 |
| 3 | Bi | MV3_L0 | MV3_L1 |
| 4 | Uni | MV4_L0 | |

FIG. 43A

FIG. 43B

| MERGE TRIANGLE INDEX 0 | MOTION INFORMATION |
|---|---|
| 0 | MV0_L0 |
| 1 | MV1_L0 |
| 2 | MV3_L0 |
| 3 | MV4_L0 |
| 4 | MV3_L1 |

| MERGE TRIANGLE INDEX 1 | MOTION INFORMATION |
|---|---|
| 0 | MV0_L1 |
| 1 | MV2_L1 |
| 2 | MV3_L1 |
| 3 | MV4_L0 |
| 4 | MV3_L0 |

FIG. 46A

| MERGE INDEX | INTER PREDICTION MODE | L0 | L1 |
|---|---|---|---|
| 0 | Bi | MV0_L0 | MV0_L1 |
| 1 | Uni | MV1_L0 | |
| 2 | Uni | | MV2_L1 |
| 3 | Bi | MV3_L0 | MV3_L1 |
| 4 | Uni | MV4_L0 | |

FIG. 46B

| MERGE TRIANGLE INDEX 0 | MOTION INFORMATION |
|---|---|
| 0 | MV0_L0 |
| 1 | MV1_L0 |
| 2 | MV3_L0 |
| 3 | MV4_L0 |
| 4 | MV0_L1 |

| MERGE TRIANGLE INDEX 1 | MOTION INFORMATION |
|---|---|
| 0 | MV3_L1 |
| 1 | MV2_L1 |
| 2 | MV0_L1 |
| 3 | MV4_L0 |
| 4 | MV3_L0 |

PICTURE CODING DEVICE, PICTURE CODING METHOD, PICTURE CODING PROGRAM, PICTURE DECODING DEVICE, PICTURE DECODING METHOD, AND PICTURE DECODING PROGRAM

CROSS-REFERENCE TO RELATED APPLICATION

This application is a Continuation of U.S. Ser. No. 17/468,763, filed Sep. 8, 2021; which is a continuation of PCT Application No. PCT/JP2020/009772 filed on Mar. 6, 2020; and which claims the benefit of priority from prior Japanese Application No.: 2019-042580, filed Mar. 8, 2019, the entire contents of which are incorporated herein by reference.

BACKGROUND OF THE INVENTION

1. Field of the Invention

The present invention relates to picture coding and decoding techniques in which a picture is split into blocks and prediction is performed.

2. Description of the Related Art

In coding and decoding of a picture, a target picture is split into blocks, each of which being a group of a predetermined number of samples, and processing is performed in units of blocks. Splitting a picture into appropriate blocks with appropriate settings of intra prediction and inter prediction enables improvement of coding efficiency.

Coding/decoding of a moving picture uses inter prediction that performs prediction from a coded/decoded picture, thereby improving coding efficiency. Patent Literature 1 describes a technique of applying an affine transform at the time of inter prediction. Moving pictures often involve object deformation such as enlargement/reduction or rotation, and thus, application of the technique in Patent Literature 1 enables efficient coding.

[Patent Literature 1] JP 9-172644 A.

SUMMARY OF THE INVENTION

Unfortunately, however, the technique of Patent Literature 1 involves picture transform, leading to a problem of heavy processing load. The present invention has been made in view of the above problem, and provides a low load and efficient coding technique.

In one aspect of the present invention to solve the above problem, there is provided a technique including: a merging candidate constructor structured to construct a merging candidate list including merging candidates having a maximum number of merging candidates including spatial merging candidates; a normal merging candidate selector structured to select a normal merging candidate being either uni-prediction or bi-prediction from the merging candidate list based on a merge index; and a triangle merging candidate selector structured to select a first triangle merging candidate being uni-prediction from the merging candidate list based on a first triangle merge index and select a second triangle merging candidate being uni-prediction based on a second triangle merge index, in which a first maximum number of triangle merging candidates regarding the first triangle merge index is the same as the maximum number of merging candidates.

According to the present invention, it is possible to achieve highly efficient and low load picture coding/decoding process.

BRIEF DESCRIPTION OF THE DRAWINGS

FIG. 9 is syntax for expressing the shape of block split.

FIG. 12A is syntax for expressing a coding block prediction mode.

FIG. 12B is syntax for expressing a coding block prediction mode.

FIG. 13 is a diagram illustrating a correspondence between syntax elements and modes related to inter prediction.

FIG. 38A is a diagram illustrating prediction in a triangle merge mode.

FIG. 38B is a diagram illustrating prediction in a triangle merge mode.

FIG. 43A is a diagram illustrating an example of the motion information of the triangle merging candidate according to the first embodiment.

FIG. 43B is a diagram illustrating an example of the motion information of the triangle merging candidate according to the first embodiment.

FIG. 46A is a diagram illustrating an example of the motion information of the triangle merging candidate according to the second embodiment.

FIG. 46B is a diagram illustrating an example of the motion information of the triangle merging candidate according to the second embodiment.

DETAILED DESCRIPTION OF THE INVENTION

Technologies and technical terms used in the present embodiment will be defined.

Tree Block

Figure 4:
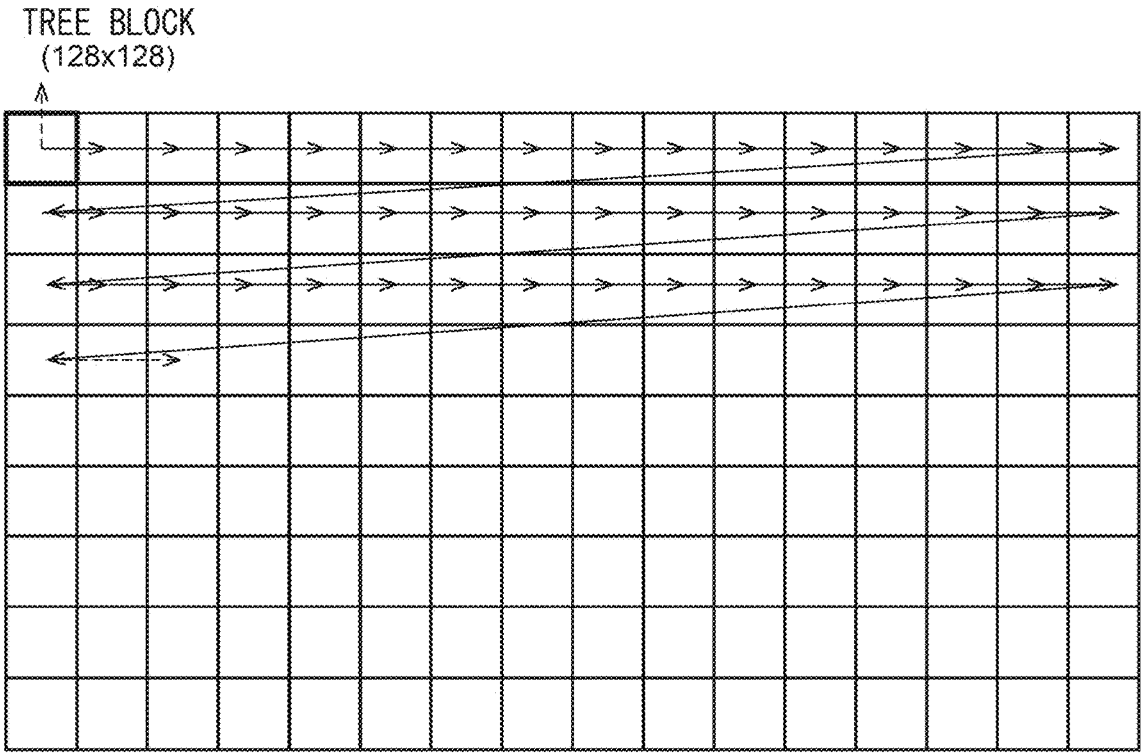
FIG. 4 is a diagram illustrating a state of splitting an input picture into tree blocks.

In the embodiment, a coding/decoding target picture is equally split into a predetermined size. This unit is defined as a tree block. While FIG. 4 sets the size of the tree block to 128×128 samples, the size of the tree block is not limited to this and may be set to any size. The target tree block (corresponding to a coding target in the coding process and a decoding target in the decoding process) is switched in raster scan order, that is, in order from left to right and from top to bottom. The interior of each tree block can be further recursively split. A coding/decoding block as a result of recursive split of the tree block is defined as a coding block. A tree block and a coding block are collectively defined as a block. Execution of appropriate block split enables efficient coding. The size of the tree block may be a fixed value determined in advance by the coding device and the decoding device, or it is possible to adopt a configuration in which the size of the tree block determined by the coding device is transmitted to the decoding device. Here, the maximum size of the tree block is 128×128 samples, and the minimum size of the tree block is 16×16 samples. The maximum size of the coding block is 64×64 samples, and the minimum size of the coding block is 4×4 samples.

Prediction Mode

Switching is performed between intra prediction (MODE_INTRA) of performing prediction from a processed picture signal of a target picture and inter prediction (MODE_INTER) of performing prediction from a picture signal of a processed picture in units of target coding blocks.

The processed picture is used, in the coding process, for a picture obtained by decoding a coded signal, a picture signal, a tree block, a block, a coding block, or the like. The processed picture is used, in the decoding process, for a decoded picture, picture signal, a tree block, a block, a coding block, or the like.

A mode of identifying the intra prediction (MODE_INTRA) and the inter prediction (MODE_INTER) is defined as a prediction mode (PredMode). The prediction mode (PredMode) has intra prediction (MODE_INTRA) or inter prediction (MODE_INTER) as a value.

Inter Prediction

In inter prediction in which prediction is performed from a picture signal of a processed picture, it is possible to use a plurality of processed pictures as reference pictures. In order to manage a plurality of reference pictures, two types of reference lists L0 (reference list 0) and L1 (reference list 1) are defined. A reference picture is specified using a reference index in each of the lists. In the P slice, L0-prediction (Pred_L0) is usable. In the B slice, L0-prediction (Pred_L0), L1-prediction (Pred_L1), and bi-prediction (Pred_BI) is usable. L0-prediction (Pred_L0) is inter prediction that refers to a reference picture managed by L0, while L1-prediction (Pred_L1) is inter prediction that refers to a reference picture managed by L1. Bi-prediction (Pred_BI) is inter prediction in which both L0-prediction and L1-prediction are performed and one reference picture managed in each of L0 and L1 is referred to. Information specifying L0-prediction, L1-prediction, and bi-prediction is defined as an inter prediction mode. In the following processing, it is assumed that processing will be performed for each of L0 and L1 for constants and variables including a suffix LX in an output.

Motion Vector Predictor Mode

The motion vector predictor mode is a mode of transmitting an index for specifying a motion vector predictor, a motion vector difference, an inter prediction mode, and a reference index, and determining inter prediction information of a target block. The motion vector predictor is derived from a motion vector predictor candidate derived from a processed block in the neighbor of the target block or a block belonging to the processed picture and located at the same position as or in the neighborhood (vicinity) of the target block, and from an index to specify the motion vector predictor.

Merge Mode

The merge mode is a mode that derives inter prediction information of the target block from inter prediction information of a processed block in the neighbor of the target block, or a block belonging to a processed picture and located at the same position as the target block or in the neighborhood (vicinity) of the target block, without transmit a motion vector difference or a reference index.

Figure 11:
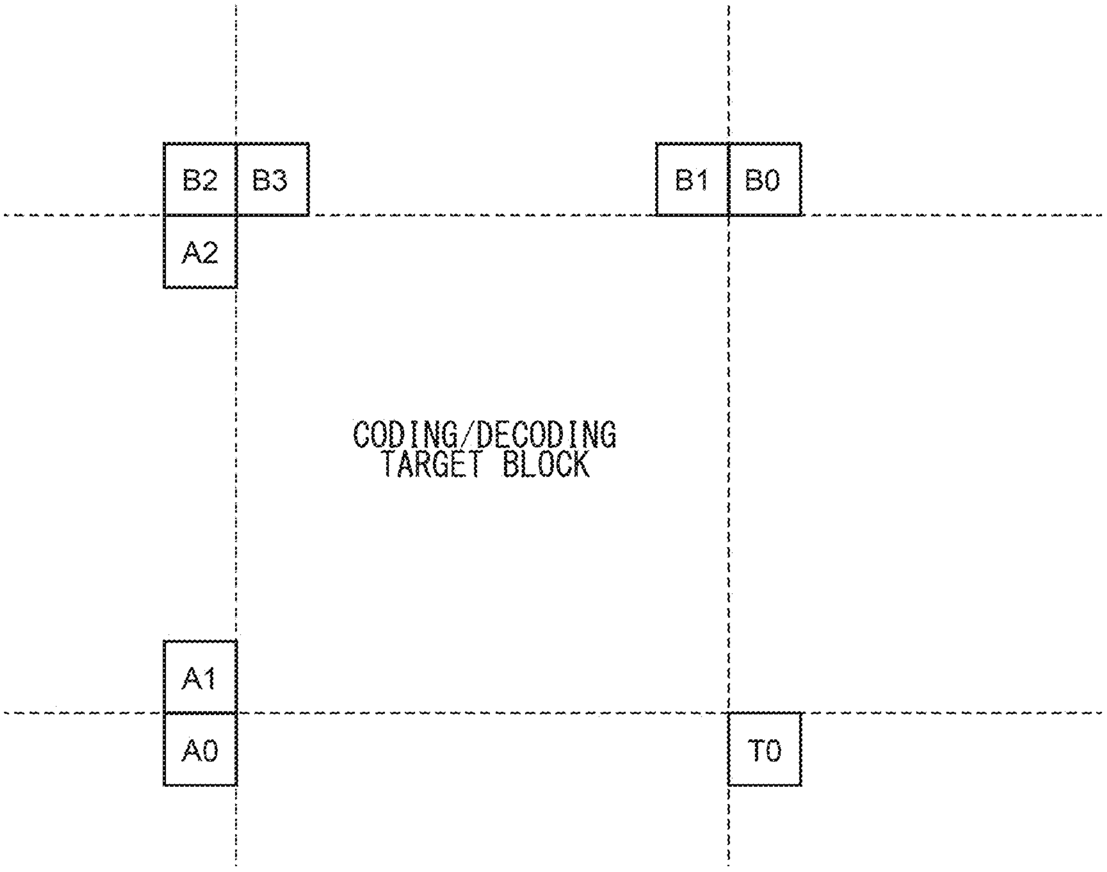
FIG. 11 is a diagram illustrating reference blocks for inter prediction.

A processed block in the neighbor of the target block and inter prediction information of the processed block are defined as spatial merging candidates. Blocks belonging to the processed picture and located at the same position as the target block or in the neighborhood (vicinity) of the target block, and inter prediction information derived from the inter prediction information of the block are defined as temporal merging candidates. Each of merging candidates is added in a merging candidate list. A merging candidate to be used for prediction of a target block is specified by a merge index. Neighboring Block FIG. 11 is a diagram illustrating reference blocks to be referred to for deriving inter prediction information in the motion vector predictor mode and the merge mode. A0, A1, A2, B0, B1, B2, and B3 are processed blocks in the neighbor of the target block. TO is a block belonging to the processed picture and located at the same position as the target block or in the neighborhood (vicinity) of the target block, in the target picture.

A1 and A2 are blocks located on the left side of the target coding block and in the neighbor of the target coding block. B1 and B3 are blocks located above the target coding block and in the neighbor of the target coding block. A0, B0, and B2 are blocks respectively located at the lower left, the upper right, and the upper left of the target coding block.

Details of how neighboring blocks are handled in the motion vector predictor mode and the merge mode will be described below.

Affine Motion Compensation

The affine motion compensation first splits a coding block into subblocks of a predetermined unit and then individually determines a motion vector for each of the split subblocks to perform motion compensation. The motion vector of each of subblocks is derived on the basis of one or more control points derived from the inter prediction information of a processed block in the neighbor of the target block, or a block belonging to the processed picture and located at the same position as or in the neighborhood (vicinity) of the target block. While the present embodiment sets the size of the subblock to 4×4 samples, the size of the subblock is not limited to this, and a motion vector may be derived in units of samples.

Figure 14:
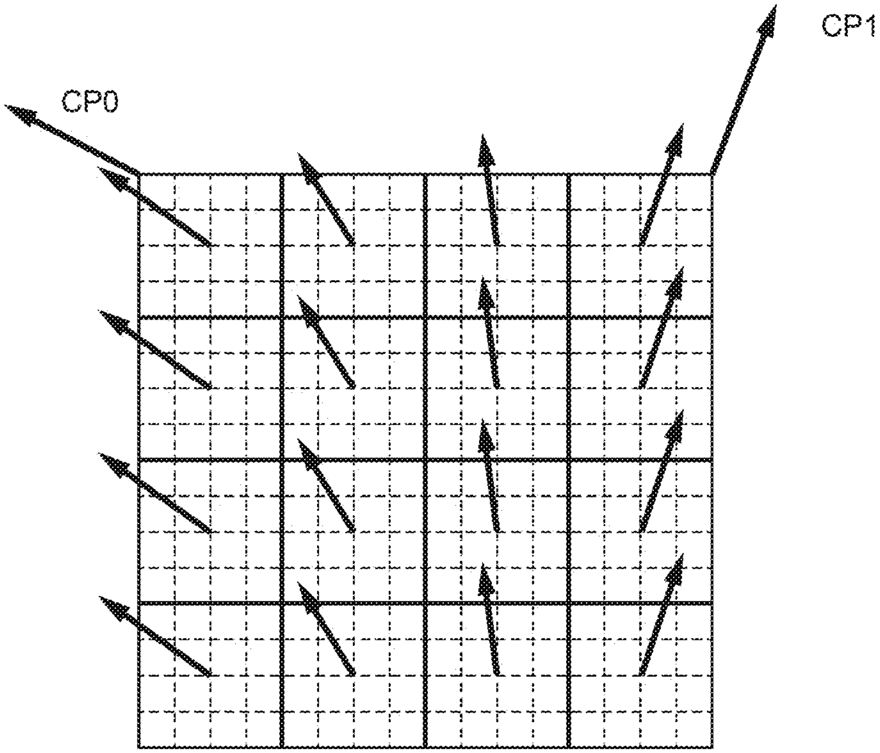
FIG. 14 is a diagram illustrating affine motion compensation at two control points.

FIG. 14 illustrates an example of affine motion compensation in a case where there are two control points. In this case, each of the two control points has two parameters, that is, a horizontal component and a vertical component. Accordingly, the affine transform having two control points is referred to as four-parameter affine transform. CP1 and CP2 in FIG. 14 are control points.

Figure 15:
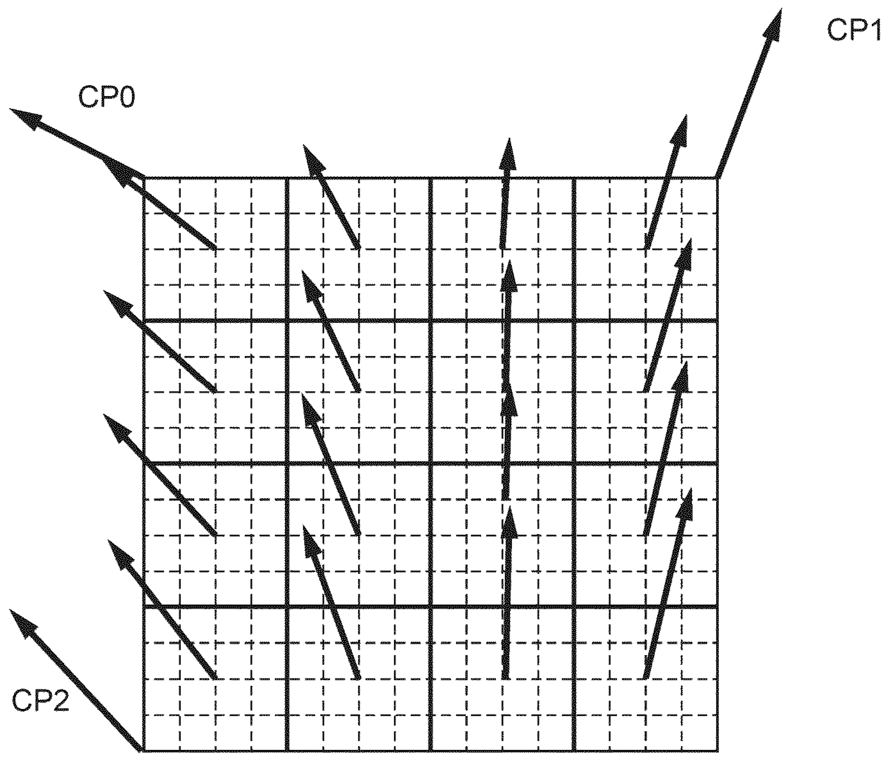
FIG. 15 is a diagram illustrating affine motion compensation at three control points.

FIG. 15 illustrates an example of affine motion compensation in a case where there are three control points. In this case, each of the three control points has two parameters, that is, a horizontal component and a vertical component. Accordingly, the affine transform having three control points is referred to as six-parameter affine transform. CP1, CP2, and CP3 in FIG. 15 are control points.

The affine motion compensation is usable in any of the motion vector predictor mode and the merge mode. A mode of applying the affine motion compensation in the motion vector predictor mode is defined as a subblock motion vector predictor mode. A mode of applying the affine motion compensation in the merge mode is defined as a subblock merge mode.

Syntax of Coding Block

The syntax for expressing the prediction mode of the coding block will be described with reference to FIGS. 12A, 12B, and 13. The pred_mode_flag in FIG. 12A is a flag indicating whether the mode is inter prediction. Setting of pred_mode_flag 0 indicates inter prediction while setting of pred_mode_flag 1 indicates intra prediction. Information of intra prediction intra_pred_mode is transmitted in the case of intra prediction, while merge_flag is transmitted in the case of inter prediction. merge_flag is a flag indicating whether the mode to use is the merge mode or the motion vector predictor mode. In the case of the motion vector predictor mode (merge_flag=0), a flag inter_affine_flag indicating whether to apply the subblock motion vector predictor mode is transmitted. In the case of applying the subblock motion vector predictor mode (inter_affine_flag=1), cu_affine_type_flag is transmitted. cu_affine_type_flag is a flag for determining the number of control points in the subblock motion vector predictor mode.

In contrast, in the case of the merge mode (merge_flag=1), the merge_subblock_flag of FIG. 12B is transmitted. merge_subblock_flag is a flag indicating whether to apply the subblock merge mode. In the case of the subblock merge mode (merge_subblock_flag=1), a merge index merge_subblock_idx is transmitted. Conversely, in a case where the mode is not the subblock merge mode (merge_subblock_flag=0), a flag merge_triangle_flag indicating whether to apply the triangle merge mode is transmitted. In the case of applying the triangle merge mode (merge_triangle_flag=1), merge triangle indexes merge_triangle_idx0 and merge_triangle_idx1 are transmitted for each of the block splitting directions merge_triangle_split_dir, and for each of the two split partitions. In the case of not applying the triangle merge mode, (merge_triangle_flag=0), a merge index merge_idx is transmitted.

FIG. 13 illustrates the value of each of syntax elements and the corresponding prediction mode. merge_flag=0 and inter_affine_flag=0 correspond to the normal motion vector predictor mode (Inter Pred Mode). merge_flag=0 and inter_affine_flag=1 correspond to a subblock motion vector predictor mode (Inter Affine Mode). merge_flag=1, merge_subblock_flag=0, and merge_trianlge_flag=0 correspond to a normal merge mode (Merge Mode). merge_flag=1, merge_subblock_flag=0, and merge_trianlge_flag=1 correspond to a triangle merge mode (Triangle Merge Mode). merge_flag=1, merge_subblock_flag=1 correspond to a subblock merge mode (Affine Merge Mode).

POC

A Picture Order Count (POC) is a variable associated with the picture to be coded, and is set to a value that increments by one in accordance with picture output order. The POC value makes it possible to discriminate whether the pictures are the same, discriminate inter-picture sequential relationship in the output order, or derive the distance between the pictures. For example, it is possible to determine that two pictures having a same POC value are identical pictures. In a case where the POCs of the two pictures have different values, the picture with the smaller POC value can be determined to be the picture that is output earlier. The difference between the POCs of the two pictures indicates the distance between the pictures in the time axis direction.

First Embodiment

A picture coding device 100 and a picture decoding device 200 according to a first embodiment of the present invention will be described.

Figure 1:
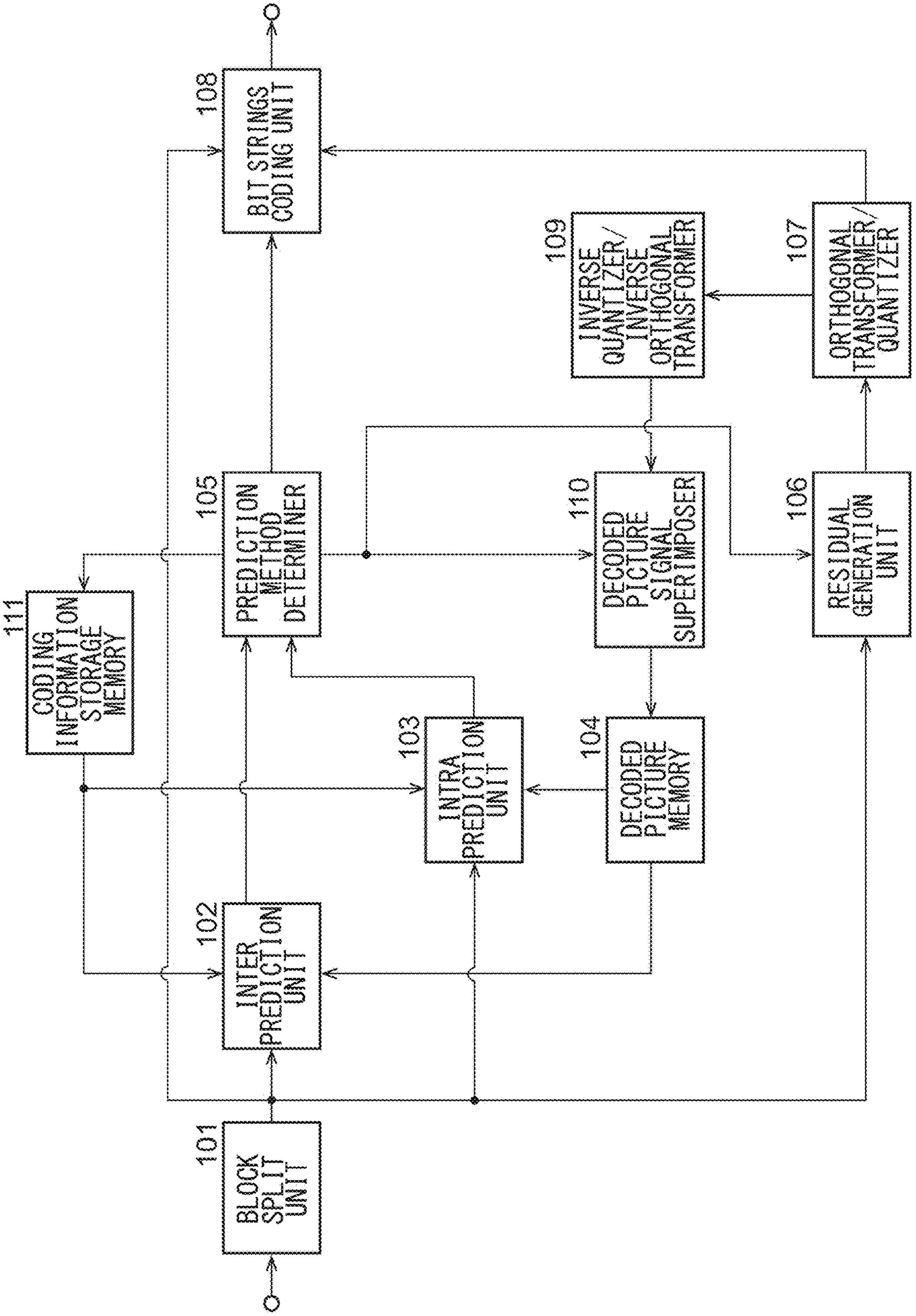
FIG. 1 is a block diagram of a picture coding device according to an embodiment of the present invention.

FIG. 1 is a block diagram of the picture coding device 100 according to the first embodiment. The picture coding device 100 according to an embodiment includes a block split unit 101, an inter prediction unit 102, an intra prediction unit 103, decoded picture memory 104, a prediction method determiner 105, a residual generation unit 106, an orthogonal transformer/quantizer 107, a bit strings coding unit 108, an inverse quantizer/inverse orthogonal transformer 109, a decoded picture signal superimposer 110, and coding information storage memory 111.

The block split unit 101 recursively splits an input picture to construct a coding block. The block split unit 101 includes: a quad split unit that splits a split target block in both the horizontal direction and the vertical direction; and a binary-ternary split unit that splits a split target block in either the horizontal direction or the vertical direction. The block split unit 101 sets the constructed coding block as a target coding block, and supplies a picture signal of the target coding block to the inter prediction unit 102, the intra prediction unit 103, and the residual generation unit 106. Furthermore, the block split unit 101 supplies information indicating the determined recursive split structure to the bit strings coding unit 108. Detailed operation of the block split unit 101 will be described below.

The inter prediction unit 102 performs inter prediction of the target coding block. The inter prediction unit 102 derives a plurality of inter prediction information candidates from the inter prediction information stored in the coding information storage memory 111 and the decoded picture signal stored in the decoded picture memory 104, selects a suitable inter prediction mode from the plurality of derived candidates, and supplies the selected inter prediction mode and a predicted picture signal corresponding to the selected inter prediction mode to the prediction method determiner 105. Detailed configuration and operation of the inter prediction unit 102 will be described below.

The intra prediction unit 103 performs intra prediction on the target coding block. The intra prediction unit 103 refers to the decoded picture signal stored in the decoded picture memory 104 as a reference sample, and performs intra prediction based on coding information such as an intra prediction mode stored in the coding information storage memory 111 and thereby generates a predicted picture signal. In the intra prediction, the intra prediction unit 103 selects a suitable intra prediction mode from a plurality of intra prediction modes, and supplies the selected intra prediction mode and the selected predicted picture signal corresponding to the selected intra prediction mode to the prediction method determiner 105.

Figure 10A:
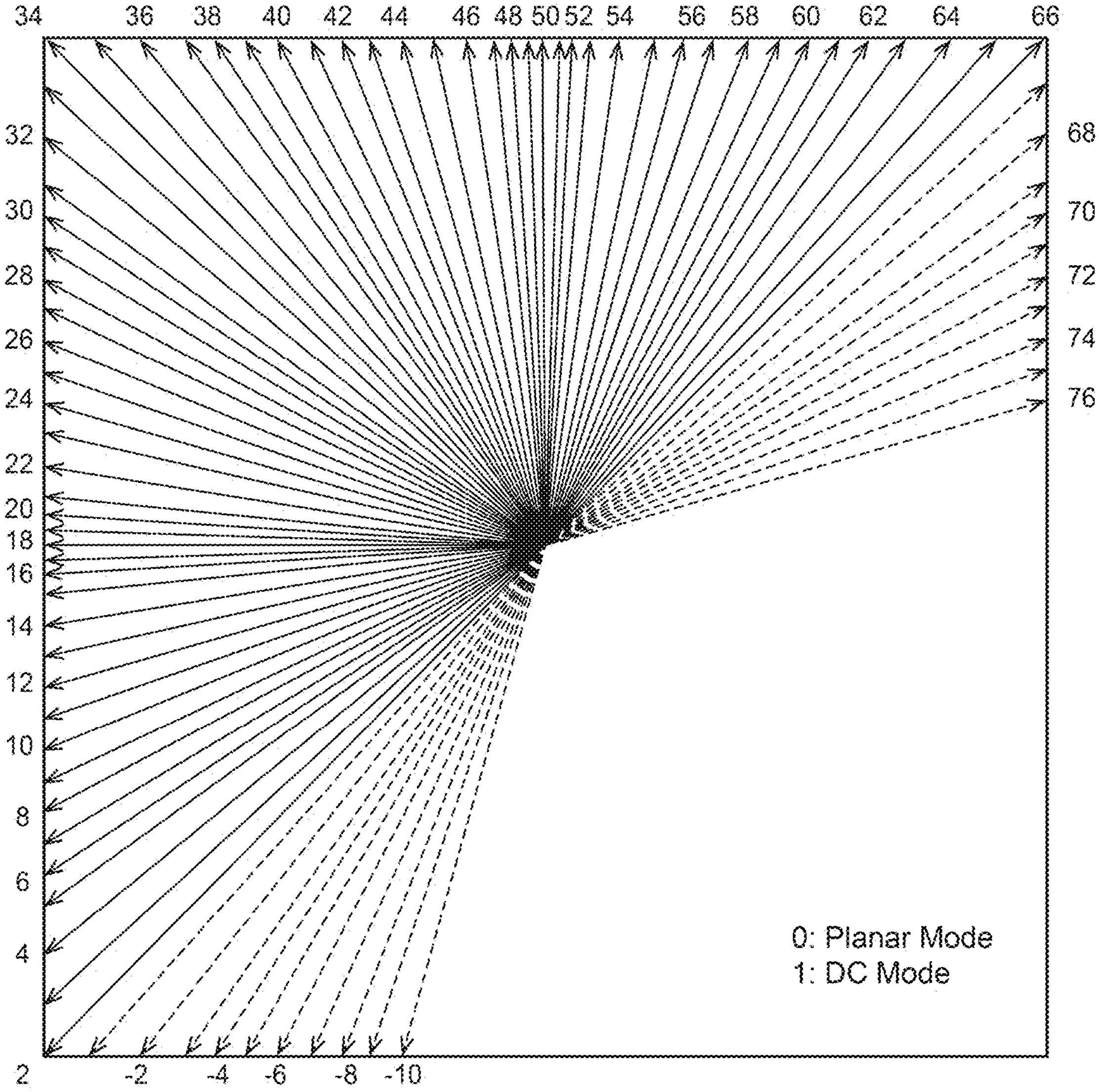
FIG. 10A is a diagram illustrating intra prediction.
Figure 10B:
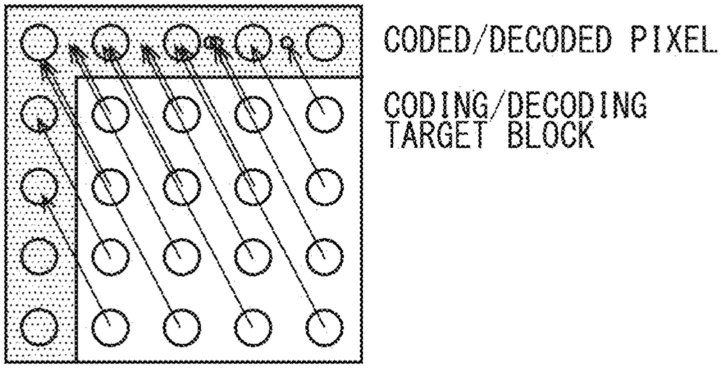
FIG. 10B is a diagram illustrating intra prediction.

FIGS. 10A and 10B illustrate examples of intra prediction. FIG. 10A illustrates a correspondence between the prediction direction of intra prediction and the intra prediction mode number. For example, an intra prediction mode 50 copies reference samples in the vertical direction and thereby constructs an intra prediction picture. Intra prediction mode 1 is a DC mode in which all sample values of a target block are set to an average value of reference samples. Intra prediction mode 0 is a Planar mode in which a two-dimensional intra prediction picture is created from reference samples in the vertical and horizontal directions. FIG. 10B is an example of constructing an intra prediction picture in the case of an intra prediction mode 40. The intra prediction unit 103 copies, for each of samples of the target block, the value of the reference sample in the direction indicated by the intra prediction mode. In a case where the reference sample in the intra prediction mode is not at an integer position, the intra prediction unit 103 determines a reference sample value by interpolation from reference sample values at neighboring integer positions.

The decoded picture memory 104 stores the decoded picture constructed by the decoded picture signal superimposer 110. The decoded picture memory 104 supplies the stored decoded picture to the inter prediction unit 102 and the intra prediction unit 103.

The prediction method determiner 105 evaluates each of the intra prediction and the inter prediction using the coding information, the code amount of the residual, the distortion amount between the predicted picture signal and the target picture signal, or the like, and thereby determines an optimal prediction mode. In the case of intra prediction, the prediction method determiner 105 supplies intra prediction information such as an intra prediction mode to the bit strings coding unit 108 as coding information. In the case of the merge mode of the inter prediction, the prediction method determiner 105 supplies inter prediction information such as a merge index and information (subblock merge flag) indicating whether the mode is the subblock merge mode to the bit strings coding unit 108 as coding information. In the case of the motion vector predictor mode of the inter prediction, the prediction method determiner 105 supplies inter prediction information such as the inter prediction mode, the motion vector predictor index, the reference index of L0 or L1, the motion vector difference, or information indicating whether the mode is a subblock motion vector predictor mode (subblock motion vector predictor flag) to the bit strings coding unit 108 as coding information. The prediction method determiner 105 further supplies the determined coding information to the coding information storage memory 111. The prediction method determiner 105 supplies the predicted picture signal to the residual generation unit 106 and the decoded picture signal superimposer 110.

The residual generation unit 106 constructs a residual by subtracting the predicted picture signal from the target picture signal, and supplies the constructed residual to the orthogonal transformer/quantizer 107.

The orthogonal transformer/quantizer 107 performs orthogonal transform and quantization on the residual according to the quantization parameter and thereby constructs an orthogonally transformed and quantized residual, and then supplies the constructed residual to the bit strings coding unit 108 and the inverse quantizer/inverse orthogonal transformer 109.

The bit strings coding unit 108 codes, in addition to the sequences, pictures, slices, and information in units of coding blocks, the bit strings coding unit 108 encodes coding information corresponding to the prediction method determined by the prediction method determiner 105 for each of coding blocks. Specifically, the bit strings coding unit 108 encodes a prediction mode PredMode for each of coding blocks. In a case where the prediction mode is inter prediction (MODE_INTER), the bit strings coding unit 108 encodes coding information (inter prediction information) such as a flag to determine whether the mode is the merge mode, a subblock merge flag, a merge index in the merge mode, an inter prediction mode in non-merge modes, a motion vector predictor index, information related to motion vector differences, and a subblock motion vector predictor flag, on the bases of a prescribed syntax (syntax rule of a bit string) and thereby constructs a first bit string. In a case where the prediction mode is intra prediction (MODE_INTRA), coding information (intra prediction information) such as the intra prediction mode is coded according to a prescribed syntax (bit string syntax rules) to construct a first bit string. In addition, the bit strings coding unit 108 performs entropy coding on the orthogonally transformed and quantized residual on the basis of a prescribed syntax and thereby constructs a second bit string. The bit strings coding unit 108 multiplexes the first bit string and the second bit string on the basis of a prescribed syntax, and outputs the bitstream.

The inverse quantizer/inverse orthogonal transformer 109 performs inverse quantization and inverse orthogonal transform on the orthogonally transformed/quantized residual supplied from the orthogonal transformer/quantizer 107 and thereby calculates the residual, and then supplies the calculated residual to the decoded picture signal superimposer 110.

The decoded picture signal superimposer 110 superimposes the predicted picture signal according to the determination of the prediction method determiner 105 with the residual that has undergone the inverse quantization/inverse orthogonal transform by the inverse quantizer/inverse orthogonal transformer 109, thereby constructs a decoded picture, and stores the constructed decoded picture in the decoded picture memory 104. The decoded picture signal superimposer 110 may perform filtering processing of reducing distortion such as block distortion due to coding on the decoded picture, and may thereafter store the decoded picture in the decoded picture memory 104.

The coding information storage memory 111 stores coding information such as a prediction mode (inter prediction or intra prediction) determined by the prediction method determiner 105. In the case of inter prediction, the coding information stored in the coding information storage memory 111 includes inter prediction information such as the determined motion vector, reference indexes of the reference lists L0 and L1, and a history-based motion vector predictor candidate list. In the case of the inter prediction merge mode, the coding information stored in the coding information storage memory 111 includes, in addition to the above-described information, a merge index and inter prediction information including information indicating whether the mode is a subblock merge mode (a subblock merge flag). In the case of the motion vector predictor mode of the inter prediction, the coding information stored in the coding information storage memory 111 includes, in addition to the above information, inter prediction information such as an inter prediction mode, a motion vector predictor index, a motion vector difference, and information indicating whether the mode is a subblock motion vector predictor mode (subblock motion vector predictor flag). In the case of intra prediction, the coding information stored in the coding information storage memory 111 includes intra prediction information such as the determined intra prediction mode.

Figure 2:
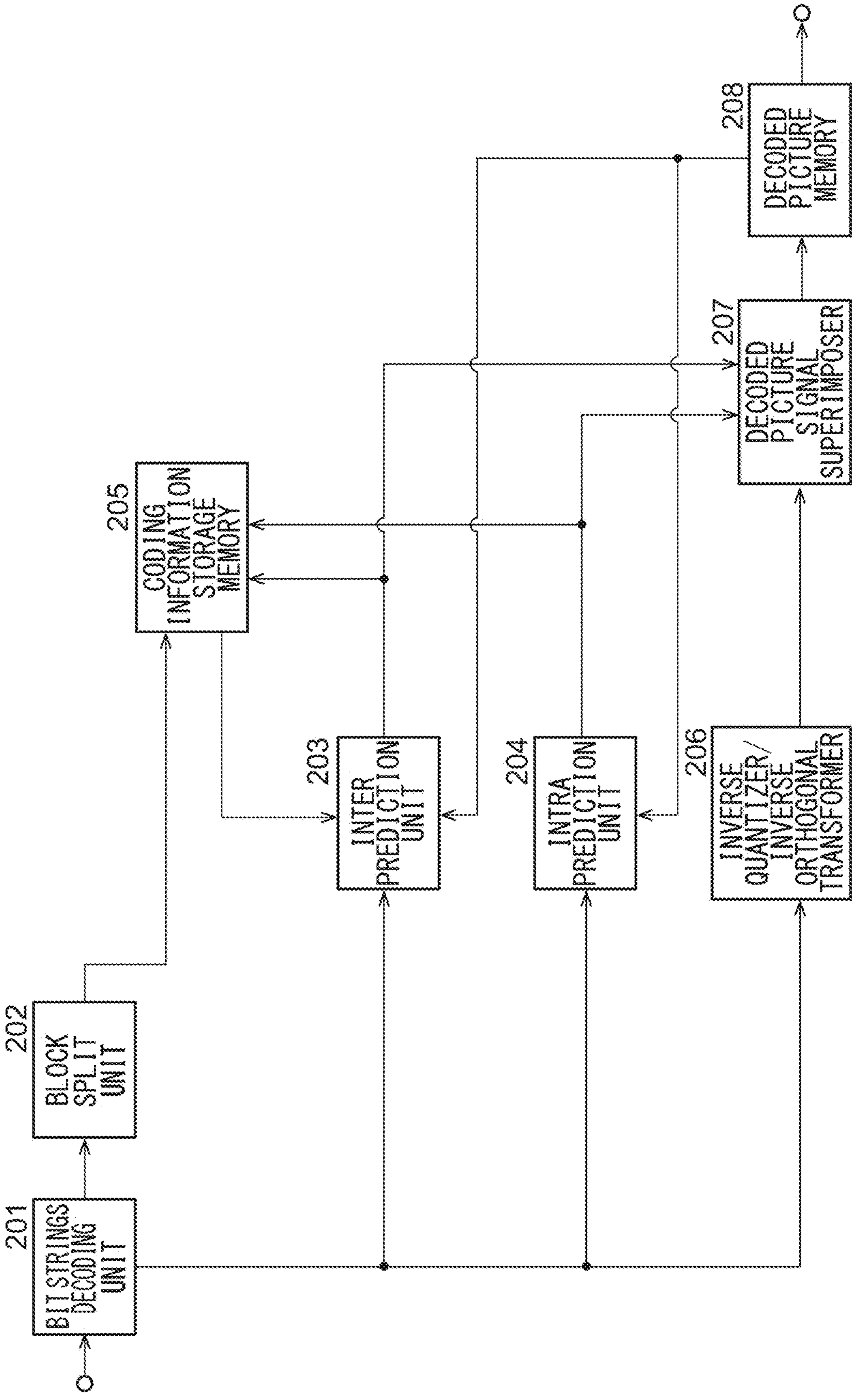
FIG. 2 is a block diagram of a picture decoding device according to an embodiment of the present invention.

FIG. 2 is a block diagram illustrating a configuration of a picture decoding device according to an embodiment of the present invention corresponding to the picture coding device of FIG. 1. The picture decoding device according to the embodiment includes a bit strings decoding unit 201, a block split unit 202, an inter prediction unit 203, an intra prediction unit 204, coding information storage memory 205, an inverse quantizer/inverse orthogonal transformer 206, and a decoded picture signal superimposer 207, and decoded picture memory 208.

Since the decoding process of the picture decoding device in FIG. 2 corresponds to the decoding process provided inside the picture coding device in FIG. 1. Accordingly, each of configurations of the coding information storage memory 205, the inverse quantizer/inverse orthogonal transformer 206, the decoded picture signal superimposer 207, and the decoded picture memory 208 in FIG. 2 respectively has a function corresponding to each of the configurations of the coding information storage memory 111, the inverse quantizer/inverse orthogonal transformer 109, the decoded picture signal superimposer 110, and the decoded picture memory 104 of the picture coding device in FIG. 1.

The bitstream supplied to the bit strings decoding unit 201 is separated on the basis of a prescribed syntax rule. The bit strings decoding unit 201 decodes the separated first bit string, and thereby obtains sequence, a picture, a slice, information in units of coding blocks, and coding information in units of coding blocks. Specifically, the bit strings decoding unit 201 decodes a prediction mode PredMode that discriminates whether the prediction is inter prediction (MODE_INTER) or intra prediction (MODE_INTRA) in units of coding block. In a case where the prediction mode is the inter prediction (MODE_INTER), the bit strings decoding unit 201 decodes coding information (inter prediction information) related to the flag that discriminates whether the mode is the merge mode, the merge index in the case of the merge mode, the subblock merge flag, and the inter prediction in the case of the motion vector predictor mode, the motion vector predictor index, motion vector difference, the subblock motion vector predictor flag or the like according to a prescribed syntax, and then, supplies the coding information (inter prediction information) to the coding information storage memory 205 via the inter prediction unit 203 and the block split unit 202. In a case where the prediction mode is intra prediction (MODE_INTRA), the bit strings decoding unit 201 decodes coding information (intra prediction information) such as the intra prediction mode according to a prescribed syntax, and then supplies the decoded coding information (intra prediction information) to the coding information storage memory 205 via the inter prediction unit 203 or the intra prediction unit 204, and via the block split unit 202. The bit strings decoding unit 201 decodes the separated second bit string and calculates an orthogonally transformed/quantized residual, and then, supplies the orthogonally transformed/quantized residual to the inverse quantizer/inverse orthogonal transformer 206.

When the prediction mode PredMode of the target coding block is the inter prediction (MODE_INTER) and the motion vector predictor mode, the inter prediction unit 203 uses the coding information of the already decoded picture signal stored in the coding information storage memory 205 to derive a plurality of motion vector predictor candidates and adds candidates of the derived plurality of motion vector predictor to a motion vector predictor candidate list described below. The inter prediction unit 203 selects a motion vector predictor corresponding to the motion vector predictor index to be decoded and supplied by the bit strings decoding unit 201 from among the plurality of motion vector predictor candidates added in the motion vector predictor candidate list. The inter prediction unit 203 then calculates a motion vector on the basis of the motion vector difference decoded by the bit strings decoding unit 201 and the selected motion vector predictor, and stores the calculated motion vector in the coding information storage memory 205 together with other coding information. Here, the coding information of the coding block to be supplied and stored includes the prediction mode PredMode, flags predFlagL0[*x*P][yP] and predFlagL1[*x*P][yP] indicating whether to use L0-prediction and L1-prediction, reference indexes refIdxL0[*x*P][yP] and refIdxL1[*x*P][yP] of L0 and L1; and motion vectors mvL0[*x*P][yP] and mvL1[*x*P][yP] of L0 and L1. Here, xP and yP are indexes indicating the position of the upper left sample of the coding block within the picture. In a case where the prediction mode PredMode is inter prediction (MODE_INTER) and the inter prediction mode is L0-prediction (Pred_L0), the flag predFlagL0 indicating whether to use L0-prediction is set to 1 and the flag predFlagL1 indicating whether to use L1-prediction is set to 0. In a case where the inter prediction mode is L1-prediction (Pred_L1), a flag predFlagL0 indicating whether to use L0-prediction is set to 0 and a flag predFlagL1 indicating whether to use L1-prediction is set to 1. In a case where the inter prediction mode is bi-prediction (Pred_BI), both the flag predFlagL0 indicating whether to use L0-prediction and the flag predFlagL1 indicating whether to use L1-prediction are set to 1. Furthermore, when the prediction mode PredMode of the target coding block is in the inter prediction (MODE_INTER) and the merge mode, a merging candidate is derived. Using the coding information of the already-decoded coding block stored in the coding information storage memory 205, a plurality of merging candidates is derived and added in a merging candidate list described below. Subsequently, a merging candidate corresponding to the merge index that is decoded by the bit strings decoding unit 201 and supplied is selected from among the plurality of merging candidates added in the merging candidate list, and then, inter prediction information such as flags predFlagL0[*x*P][yP] and predFlagL1[*x*P][yP] indicating whether to use the L0-prediction and L1-prediction of the selected merging candidate, reference indexes refIdxL0[*x*P][yP] and refIdxL1[*x*P][yP] of L0 and L1, and motion vectors mvL0[*x*P][yP] and mvL1[*x*P][yP] of L0 and L1 are to be stored in the coding information storage memory 205. Here, XP and yP are indexes indicating the position of the upper left sample of the coding block within the picture. Detailed configuration and operation of the inter prediction unit 203 will be described below.

The intra prediction unit 204 performs intra prediction when the prediction mode PredMode of the target coding block is intra prediction (MODE_INTRA). The coding information decoded by the bit strings decoding unit 201 includes an intra prediction mode. The intra prediction unit 204 generates a predicted picture signal by intra prediction from the decoded picture signal stored in the decoded picture memory 208 in accordance with the intra prediction mode included in the coding information decoded by the bit strings decoding unit 201. The intra prediction unit 204 then supplies the generated predicted picture signal to the decoded picture signal superimposer 207. The intra prediction unit 204 corresponds to the intra prediction unit 103 of the picture coding device 100, and thus performs the processing similar to the processing of the intra prediction unit 103.

The inverse quantizer/inverse orthogonal transformer 206 performs inverse orthogonal transform/inverse quantization on the orthogonal transformed/quantized residual decoded in the bit strings decoding unit 201, and thereby obtains inversely orthogonally transformed/inversely quantized residual.

The decoded picture signal superimposer 207 superimposes a predicted picture signal inter-predicted by the inter prediction unit 203 or a prediction picture signal intra-predicted by the intra prediction unit 204 with the residual that has been inversely orthogonally transformed/inversely quantized residual by the inverse quantizer/inverse orthogonal transformer 206, thereby decoding the decoded picture signal. The decoded picture signal superimposer 207 then stores the decoded picture signal that has been decoded, in the decoded picture memory 208. When storing the decoded picture in the decoded picture memory 208, the decoded picture signal superimposer 207 may perform filtering processing on the decoded picture to reduce block distortion or the like due to coding, and may thereafter store the decoded picture in the decoded picture memory 208.

Figure 3:
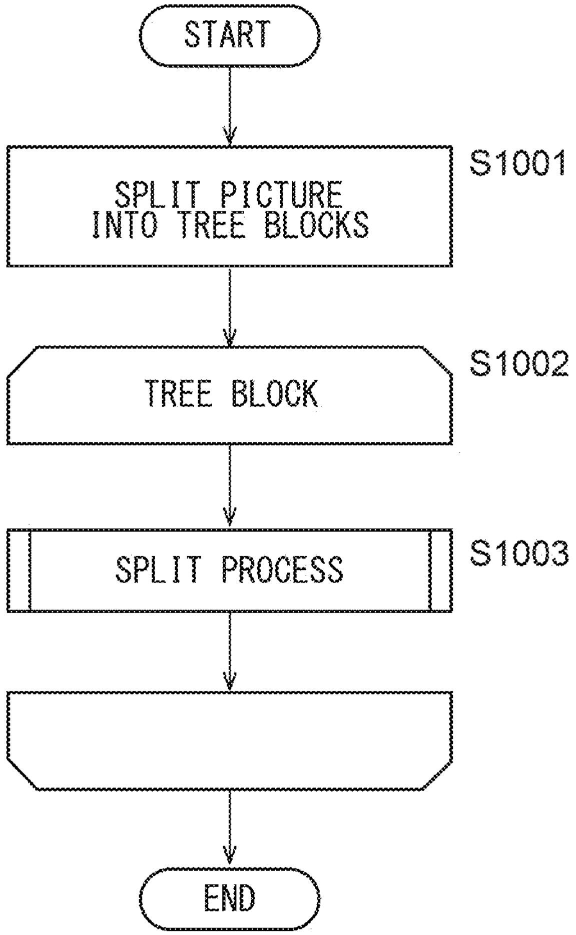
FIG. 3 is a flowchart illustrating operation of splitting a tree block.

Next, operation of the block split unit 101 in the picture coding device 100 will be described. FIG. 3 is a flowchart illustrating operation of splitting a picture into tree blocks and further splitting each of the tree blocks. First, an input picture is split into tree blocks of a predetermined size (step S1001). Each of the tree blocks is scanned in a predetermined order, that is, in a raster scan order (step S1002), and a target tree block is internally split (step S1003).

Figure 7:
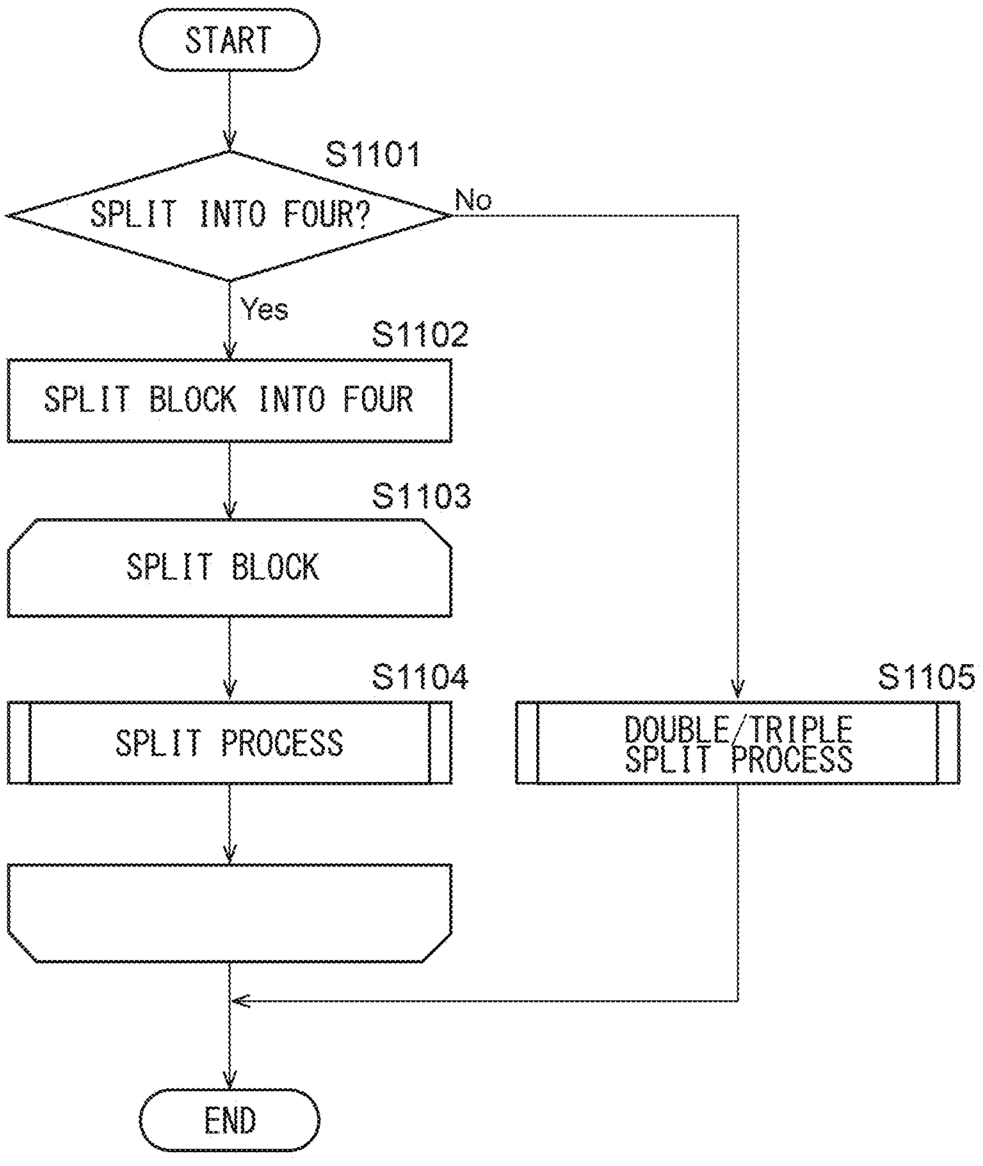
FIG. 7 is a flowchart illustrating operation of splitting a block into four.

FIG. 7 is a flowchart illustrating detailed operation of the split process in step S1003. First, it is determined whether to split the target block into four (step S1101).

Figure 5:
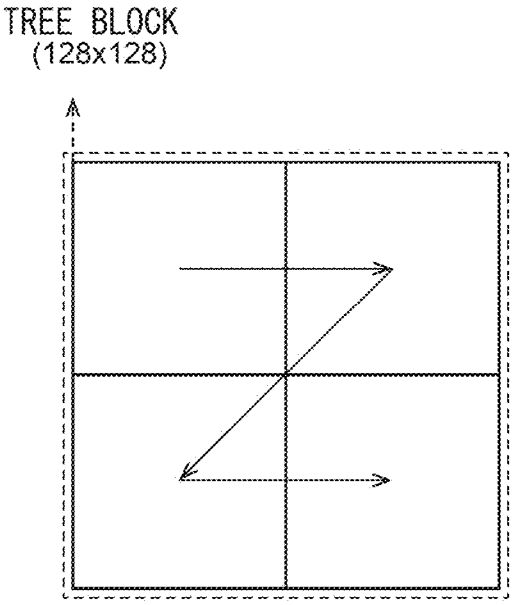
FIG. 5 is a diagram illustrating z-scan.
Figure 6A:
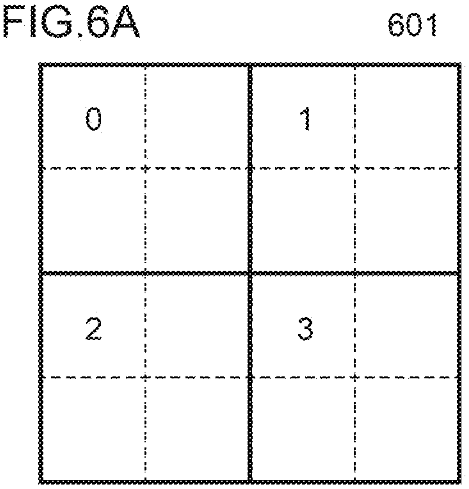
FIG. 6A is a diagram illustrating a split shape of a block.

In a case where it is determined that the target block is to be split into four, the target block will be split into four (step S1102). Each of blocks obtained by splitting the target block is scanned in the Z-scan order, that is, in the order of upper left, upper right, lower left, and lower right (step S1103). FIG. 5 illustrates an example of the Z-scan order, and 601 in FIG. 6A illustrates an example in which the target block is split into four. Numbers 0 to 3 of 601 in FIG. 6A indicate the order of processing. Subsequently, the split process of FIG. 7 is recursively executed for each of blocks split in step S1101 (step S1104).

In a case where it is determined that the target block is not to be split into four, the target block will be split into two or three, namely, binary-ternary split (step S1105).

Figure 8:
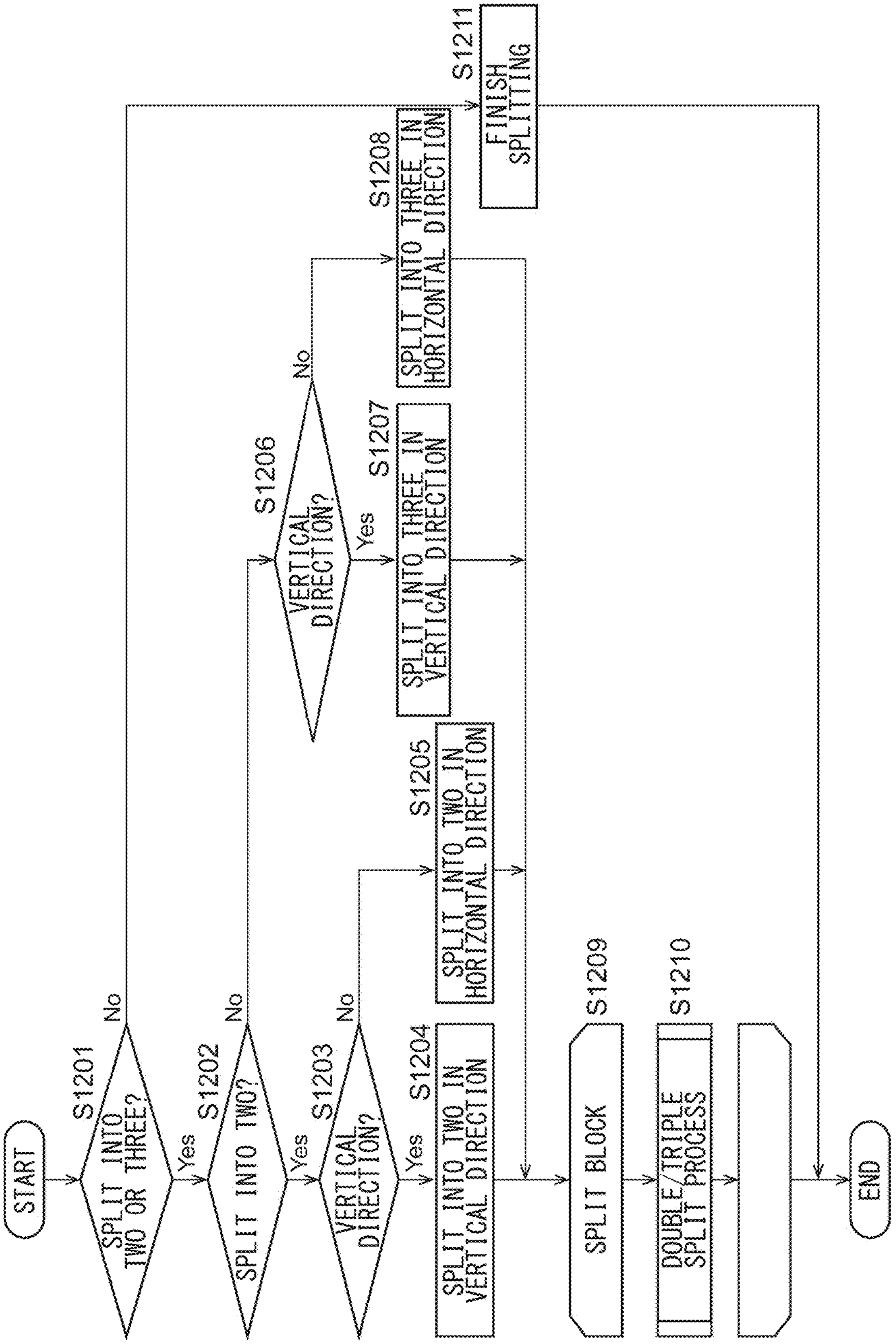
FIG. 8 is a flowchart illustrating operation of splitting a block into two or three.

FIG. 8 is a flowchart illustrating detailed operation of the binary-ternary split process in step S1105. First, it is determined whether binary-ternary split is going to be performed on the target block, that is, whether any of binary split or ternary split is to be performed (step S1201).

In a case where it is not determined that binary-ternary split is to be performed on the target block, that is, in a case where it is determined not to split the target block, the split is finished (step S1211). That is, further recursive split process is not to be performed on the block that has been split by the recursive split process.

In a case where it is determined that binary-ternary split is going to be performed on the target block, it is further determined whether to split the target block into two (step S1202).

Figure 6B:
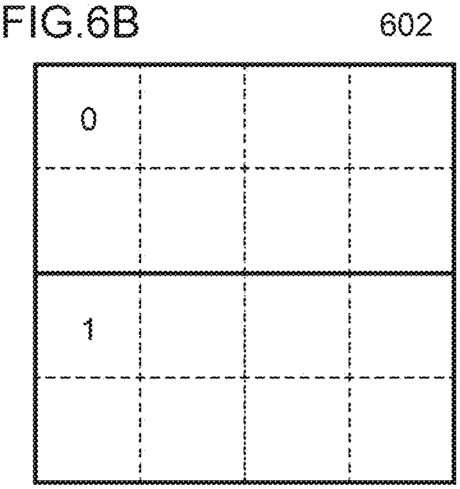
FIG. 6B is a diagram illustrating a split shape of a block.
Figure 6C:
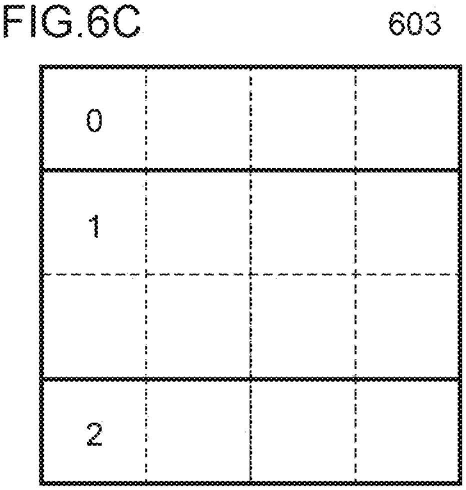
FIG. 6C is a diagram illustrating a split shape of a block.
Figure 6D:
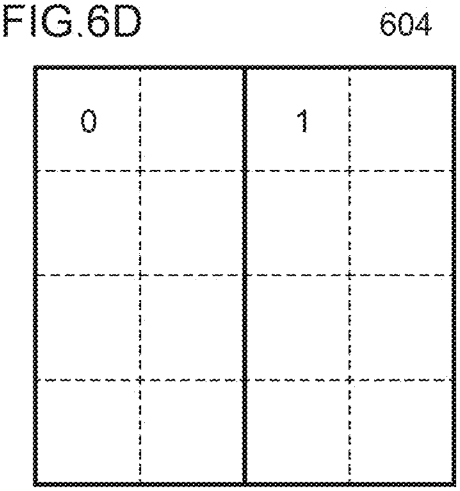
FIG. 6D is a diagram illustrating a split shape of a block.

In a case where it is determined that the target block is to be split into two, it is further determined whether to split the target block in upper-lower (vertical) direction (step S1203), and then based on the result, the target block will be binary split in upper-lower (vertical) direction (step S1204), or the target block will be binary split in left-right (horizontal) direction (step S1205). As a result of step S1204, the target block is binary split in upper-lower direction (vertical direction) as illustrated in 602 of FIG. 6B. As a result of step S1205, the target block is binary split in right-left (horizontal direction) as illustrated in 604 of FIG. 6D.

Figure 6E:
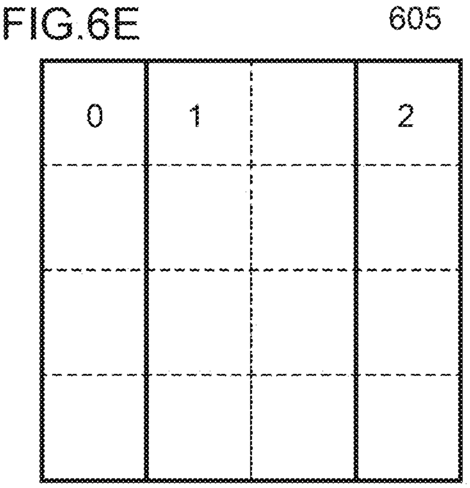
FIG. 6E is a diagram illustrating a split shape of a block.

In step S1202, in a case where it is not determined that the target block is to be split into two, that is, in a case where it is determined that the target block is to be split into three, it is further determined whether to split the target block into three as upper, middle, lower portions (vertical direction) (step S1206). Based on the result, the target block is split into three as either upper, middle and lower portions (vertical direction) (step S1207), or left, middle, and right portions (horizontal direction) (step S1208). As a result of step S1207, the target block is split into three as upper, middle, and lower portions (vertical direction) as illustrated in 603 of FIG. 6C. As a result of step S1208, the target block is split into three as left, middle, and right (horizontal direction) as illustrated in 605 of FIG. 6E.

After execution of one of steps S1204, S1205, S1207, or S1208, each of blocks obtained by splitting the target block is scanned in order from left to right and from top to bottom (step S1209). The numbers 0 to 2 of 602 to 605 in FIGS. 6B to 6E indicate the order of processing. For each of split blocks, the binary-ternary split process in FIG. 8 is recursively executed (step S1210).

In the recursive block split described here, the propriety of split may be limited on the basis of the number of splits, the size of the target block, or the like. The information that restricts the propriety of split may be realized in a configuration in which information is not transmitted by making a preliminary agreement between the coding device and the decoding device, or in a configuration in which the coding device determines information for restricting the propriety of split and record the information to bit strings, thereby transmitting the information to the decoding device.

When a certain block is split, a block before split is referred to as a parent block, and each of blocks after split is referred to as a child block.

Next, operation of the block split unit 202 in the picture decoding device 200 will be described. The block split unit 202 splits a tree block using a processing procedure similar to case of the block split unit 101 of the picture coding device 100. Note that there is a difference that although the block split unit 101 of the picture coding device 100 determines an optimal block split shape by applying an optimization method such as estimation of an optimal shape by picture recognition or distortion rate optimization, the block split unit 202 of the picture decoding device 200 determines the block split shape by decoding block split information recorded in the bit string.

FIG. 9 illustrates syntax (syntax rules of a bit string) related to block split according to the first embodiment. coding_quadtree( ) represents the syntax for quad split process of the block. multi_type_tree( ) represents the syntax for the process of splitting the block into two or three. qt_split is a flag indicating whether to split a block into four. In the case of splitting the block into four, the setting would be qt_split=1. In the case of not splitting the block into four, the setting would be qt_split=0. In the case of splitting the block into four (qt_split=1), a quad split process will be performed recursively on each of blocks split (coding_quadtree(0), coding_quadtree(1), coding_quadtree(2), coding_quadtree(3), in which arguments 0 to 3 correspond to numbers of 601 in FIG. 6A). In a case where the quad split is not to be performed (qt_split=0), the subsequent split is determined according to multi_type_tree( ). mtt_split is a flag indicating whether to perform further split. In the case where further splitting is to be performed (mtt_split=1), transmission of mtt_split_vertical which is a flag indicating whether to perform split in vertical or horizontal direction and mtt_split_binary which is a flag that determines whether to perform binary split or ternary split on the block. mtt_split_vertical=1 indicates split in the vertical direction, and mtt_split_vertical=0 indicates split in the horizontal direction. mtt_split_binary=1 indicates that the block is binary split, and mtt_split_binary=0 indicates that the block is ternary split. In a case where the block is to be binary split (mtt_split_binary=1), the split process is performed recursively on each of the two split blocks (multi_type_tree(0) and multi_type_tree(1) in which arguments 0 to 1 correspond to numbers in 602 or 604 of FIGS. 6B to 6D). In the case where the block is to be ternary split (mtt_split_binary=0), the split process is performed recursively on each of the three split blocks (multi_type_tree(0), multi_type_tree (1), and multi_type_tree(2), in which 0 to 2 correspond to numbers in 603 of FIG. 6B or 605 of FIG. 6E). Recursively calling multi_type_tree until mtt_split=0 will achieve hierarchical block split.

Inter Prediction

The inter prediction method according to an embodiment is implemented in the inter prediction unit 102 of the picture coding device in FIG. 1 and the inter prediction unit 203 of the picture decoding device in FIG. 2.

An inter prediction method according to an embodiment will be described with reference to the drawings. The inter prediction method is implemented in any of the coding and decoding processes in units of coding blocks.

Inter Prediction Unit 102 on Coding Side

Figure 16:
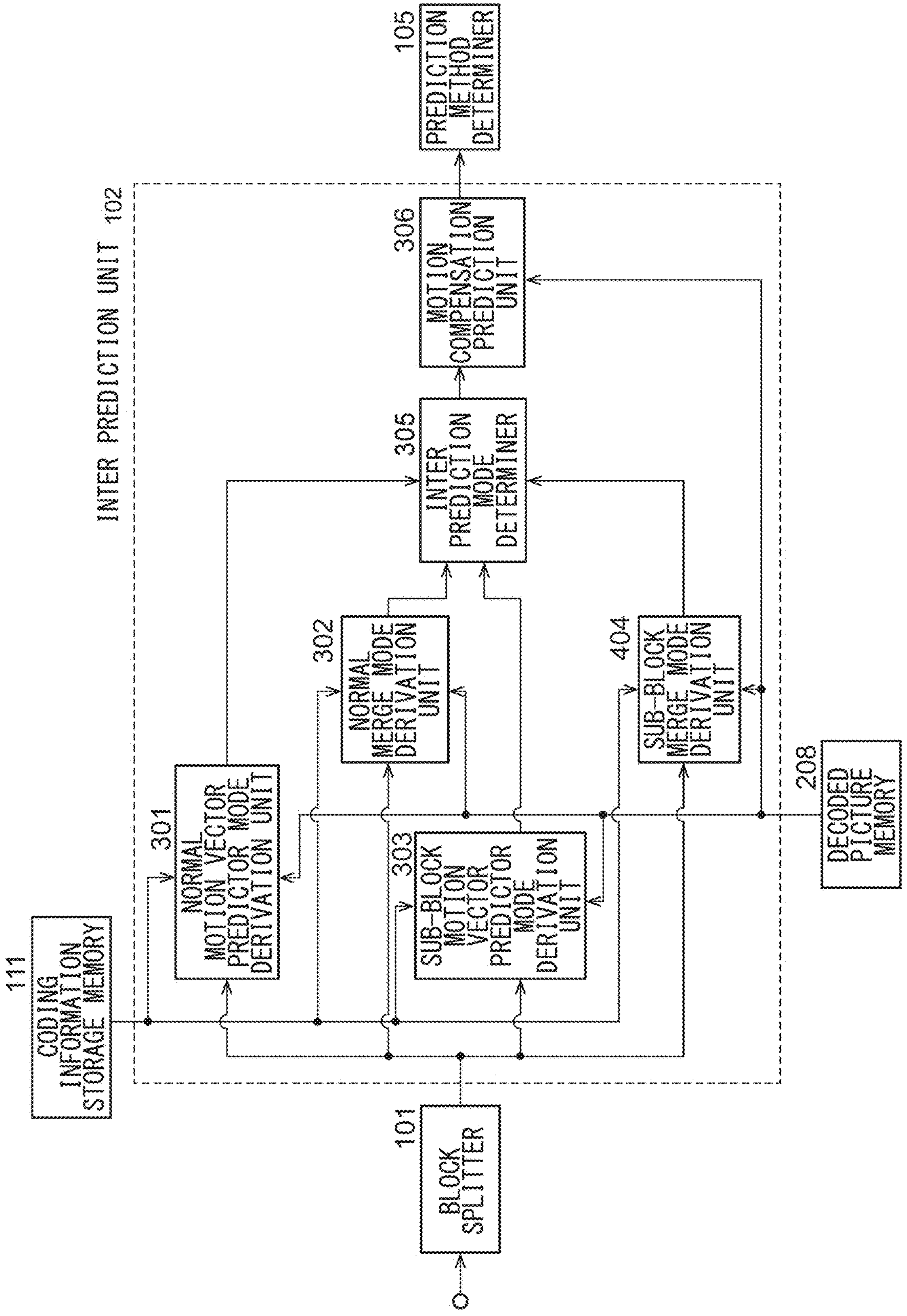
FIG. 16 is a block diagram of a detailed configuration of an inter prediction unit 102 in FIG. 1.

FIG. 16 is a diagram illustrating a detailed configuration of the inter prediction unit 102 of the picture coding device in FIG. 1. The normal motion vector predictor mode derivation unit 301 derives a plurality of normal motion vector predictor candidates, selects a motion vector predictor, and calculates a motion vector difference between the selected motion vector predictor and the detected motion vector. The detected inter prediction mode, reference index, motion vector, and calculated motion vector difference will be inter prediction information of the normal motion vector predictor mode. This inter prediction information is supplied to an inter prediction mode determiner 305. Detailed configuration and processing of the normal motion vector predictor mode derivation unit 301 will be described below.

The normal merge mode derivation unit 302 derives a plurality of normal merging candidates, selects a normal merging candidate, and obtains inter prediction information of the normal merge mode. This inter prediction information is supplied to an inter prediction mode determiner 305. Detailed configuration and processing of the normal merge mode derivation unit 302 will be described below.

The subblock motion vector predictor mode derivation unit 303 derives a plurality of subblock motion vector predictor candidates, selects a subblock motion vector predictor, and calculates a motion vector difference between the selected subblock motion vector predictor and the detected motion vector. The detected inter prediction mode, reference index, motion vector, and calculated motion vector difference will be inter prediction information of the subblock motion vector predictor mode. This inter prediction information is supplied to an inter prediction mode determiner 305.

The subblock merge mode derivation unit 304 derives a plurality of subblock merging candidates, selects a subblock merging candidate, and obtains inter prediction information of the subblock merge mode. This inter prediction information is supplied to an inter prediction mode determiner 305.

In the inter prediction mode determiner 305 determines inter prediction information on the basis of the inter prediction information supplied from the normal motion vector predictor mode derivation unit 301, the normal merge mode derivation unit 302, the subblock motion vector predictor mode derivation unit 303, and the subblock merge mode derivation unit 304. Inter prediction information according to the determination result is supplied from the inter prediction mode determiner 305 to a motion compensation prediction unit 306.

The motion compensation prediction unit 306 performs inter prediction on the reference picture signal stored in the decoded picture memory 104 on the basis of the determined inter prediction information. Detailed configuration and processing of the motion compensation prediction unit 306 will be described below.

Inter Prediction Unit 203 on Decoding Side

Figure 22:
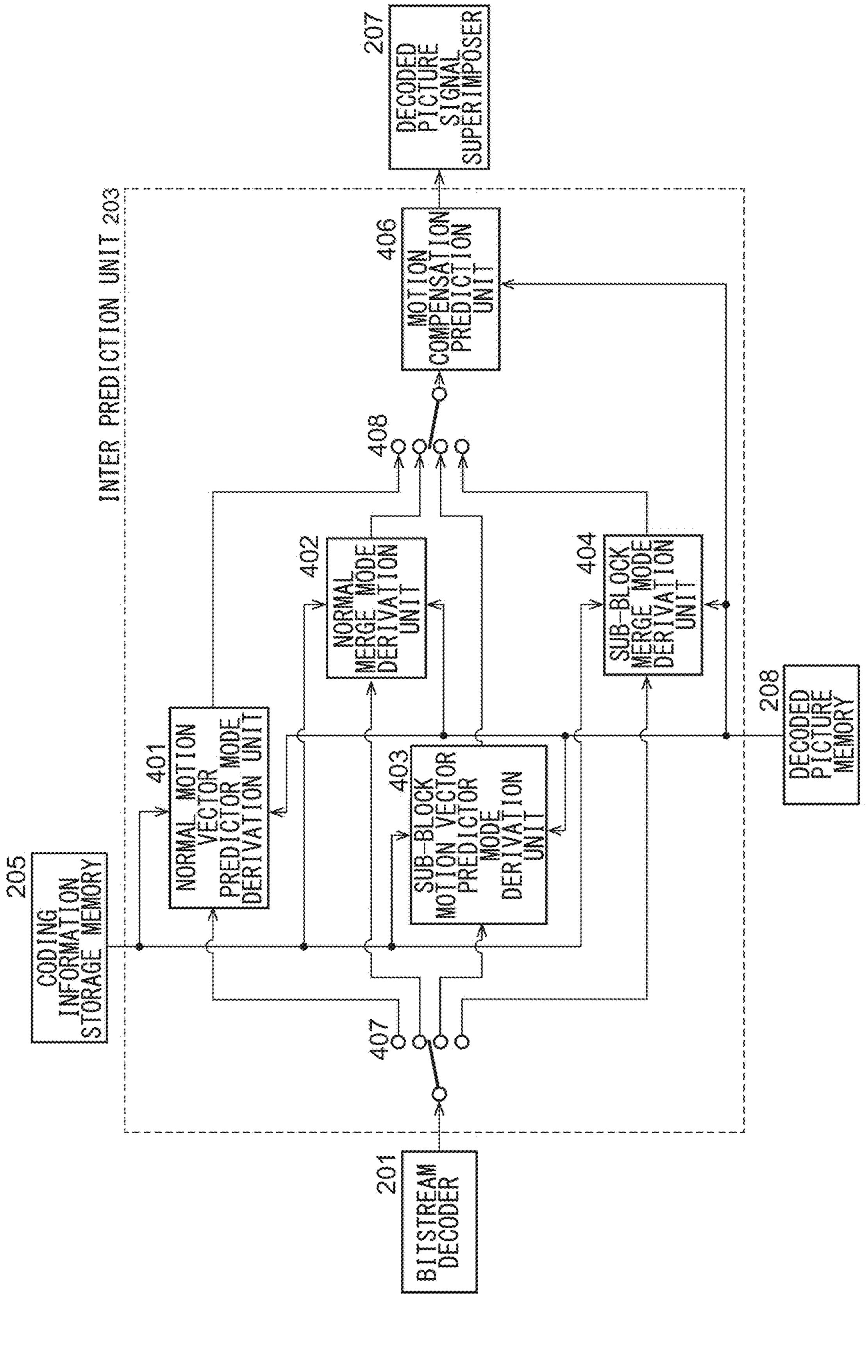
FIG. 22 is a block diagram of a detailed configuration of an inter prediction unit 203 in FIG. 2.

FIG. 22 is a diagram illustrating a detailed configuration of the inter prediction unit 203 of the picture decoding device in FIG. 2.

The normal motion vector predictor mode derivation unit 401 derives a plurality of normal motion vector predictor candidates, selects a motion vector predictor, calculates an added value obtained by adding the selected motion vector predictor and the decoded motion vector difference, and sets this added value as a motion vector. The decoded inter prediction mode, reference index, motion vector will be inter prediction information of the normal motion vector predictor mode. This inter prediction information is supplied to a motion compensation prediction unit 406 via a switch 408. Detailed configuration and processing of the normal motion vector predictor mode derivation unit 401 will be described below.

The normal merge mode derivation unit 402 derives a plurality of normal merging candidates, selects a normal merging candidate, and obtains inter prediction information of the normal merge mode. This inter prediction information is supplied to a motion compensation prediction unit 406 via a switch 408. Detailed configuration and processing of the normal merge mode derivation unit 402 will be described below.

A subblock motion vector predictor mode derivation unit 403 derives a plurality of subblock motion vector predictor candidates, selects a subblock motion vector predictor, and calculates an added value obtained by adding the selected subblock motion vector predictor and the decoded motion vector difference, and sets this added value as a motion vector. The decoded inter prediction mode, reference index, and motion vector will be the inter prediction information of the subblock motion vector predictor mode. This inter prediction information is supplied to a motion compensation prediction unit 406 via a switch 408.

A subblock merge mode derivation unit 404 derives a plurality of subblock merging candidates, selects a subblock merging candidate, and obtains inter prediction information of the subblock merge mode. This inter prediction information is supplied to a motion compensation prediction unit 406 via a switch 408.

The motion compensation prediction unit 406 performs inter prediction on the reference picture signal stored in the decoded picture memory 208 on the basis of the determined inter prediction information. Detailed configuration and processing of the motion compensation prediction unit 406 are similar to the motion compensation prediction unit 306 on the coding side.

Normal Motion Vector Predictor Mode Derivation Unit (Normal AMVP)

Figure 17:
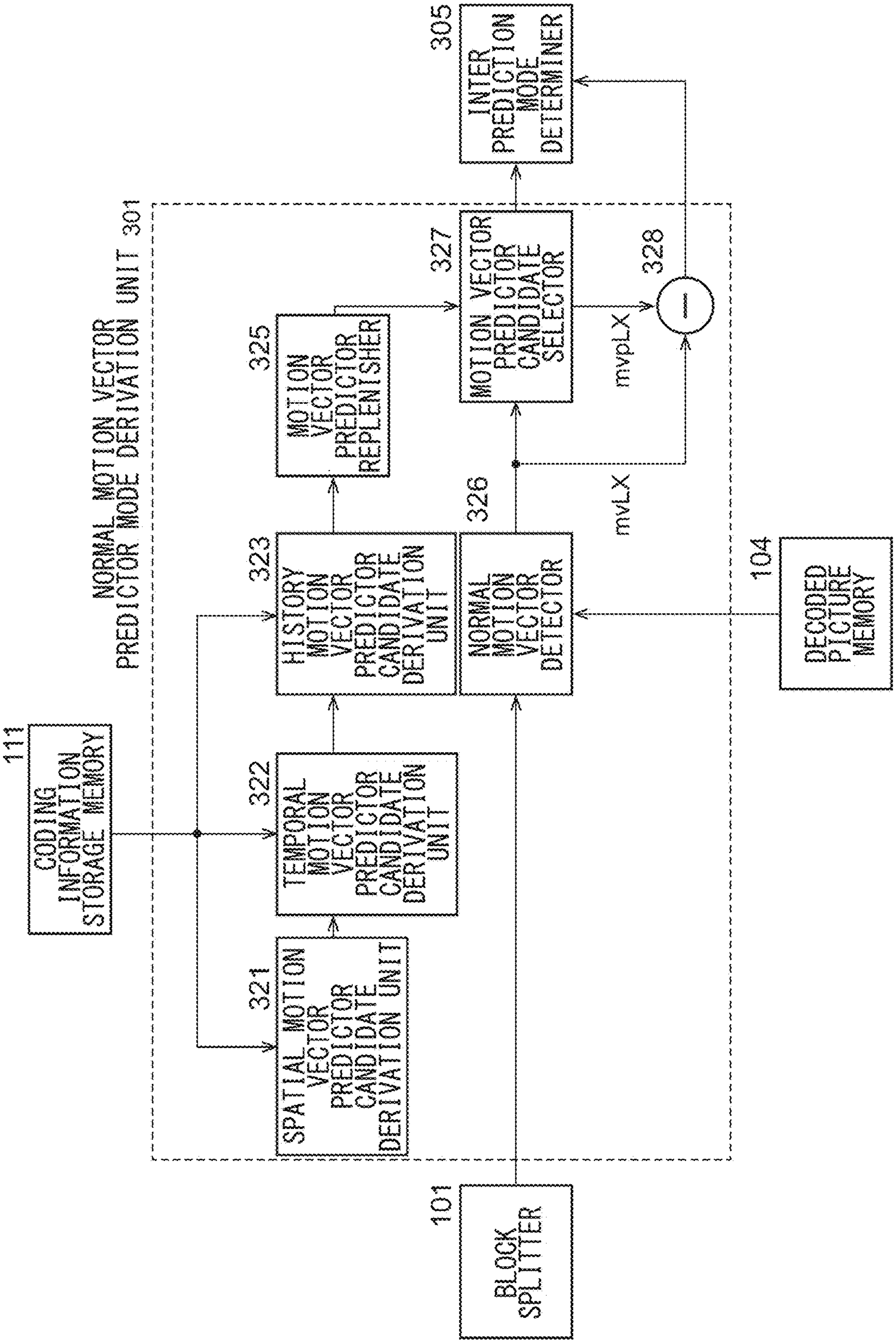
FIG. 17 is a block diagram of a detailed configuration of a normal motion vector predictor mode derivation unit 301 in FIG. 16.

The normal motion vector predictor mode derivation unit 301 of FIG. 17 includes a spatial motion vector predictor candidate derivation unit 321, a temporal motion vector predictor candidate derivation unit 322, a history-based motion vector predictor candidate derivation unit 323, a motion vector predictor candidate replenisher 325, a normal motion vector detector 326, a motion vector predictor candidate selector 327, and a motion vector subtractor 328.

Figure 23:
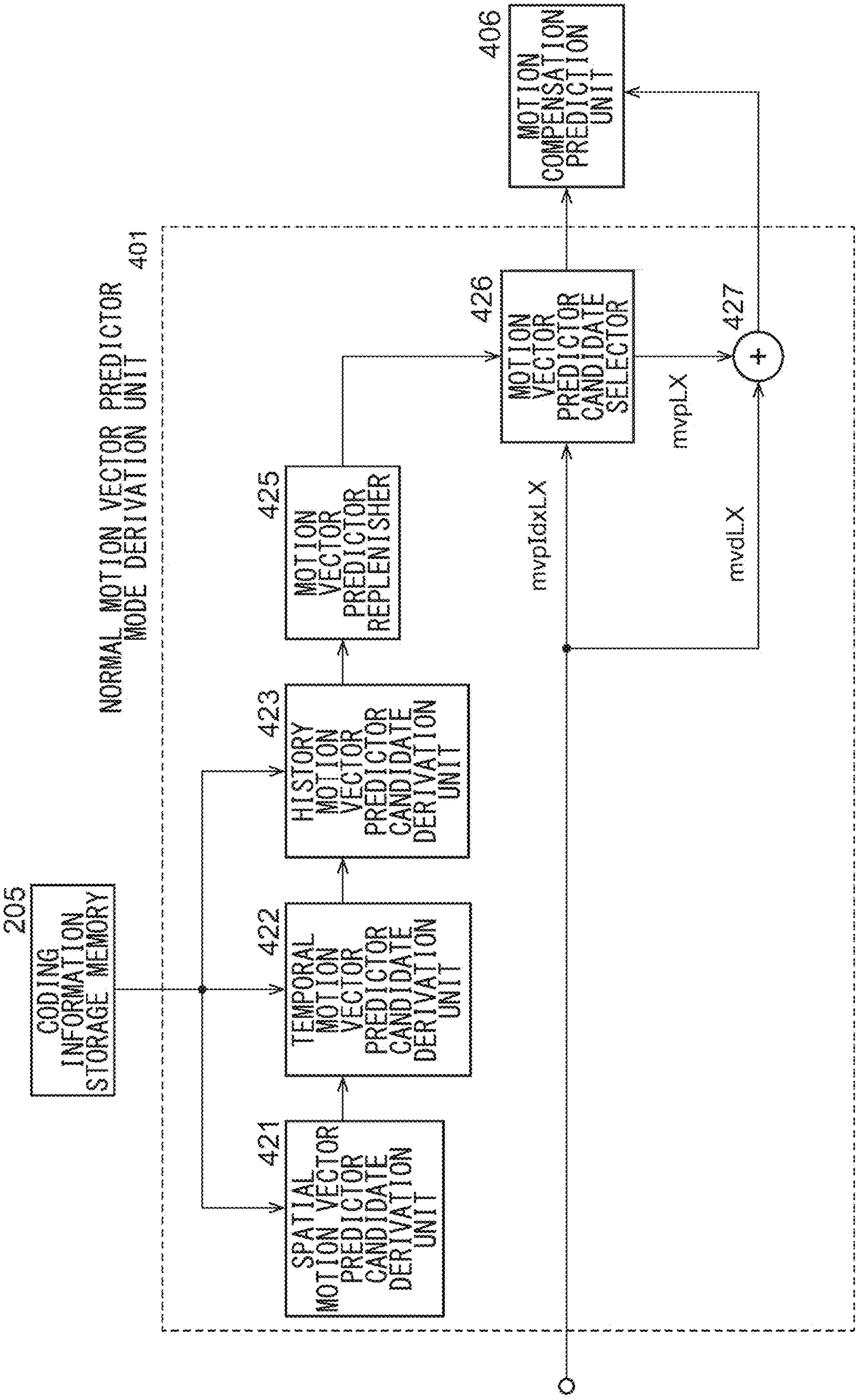
FIG. 23 is a block diagram of a detailed configuration of a normal motion vector predictor mode derivation unit 401 in FIG. 22.

The normal motion vector predictor mode derivation unit 401 in FIG. 23 includes a spatial motion vector predictor candidate derivation unit 421, a temporal motion vector predictor candidate derivation unit 422, a history-based motion vector predictor candidate derivation unit 423, a motion vector predictor candidate replenisher 425, a motion vector predictor candidate selector 426, and a motion vector adder 427.

Figure 25:
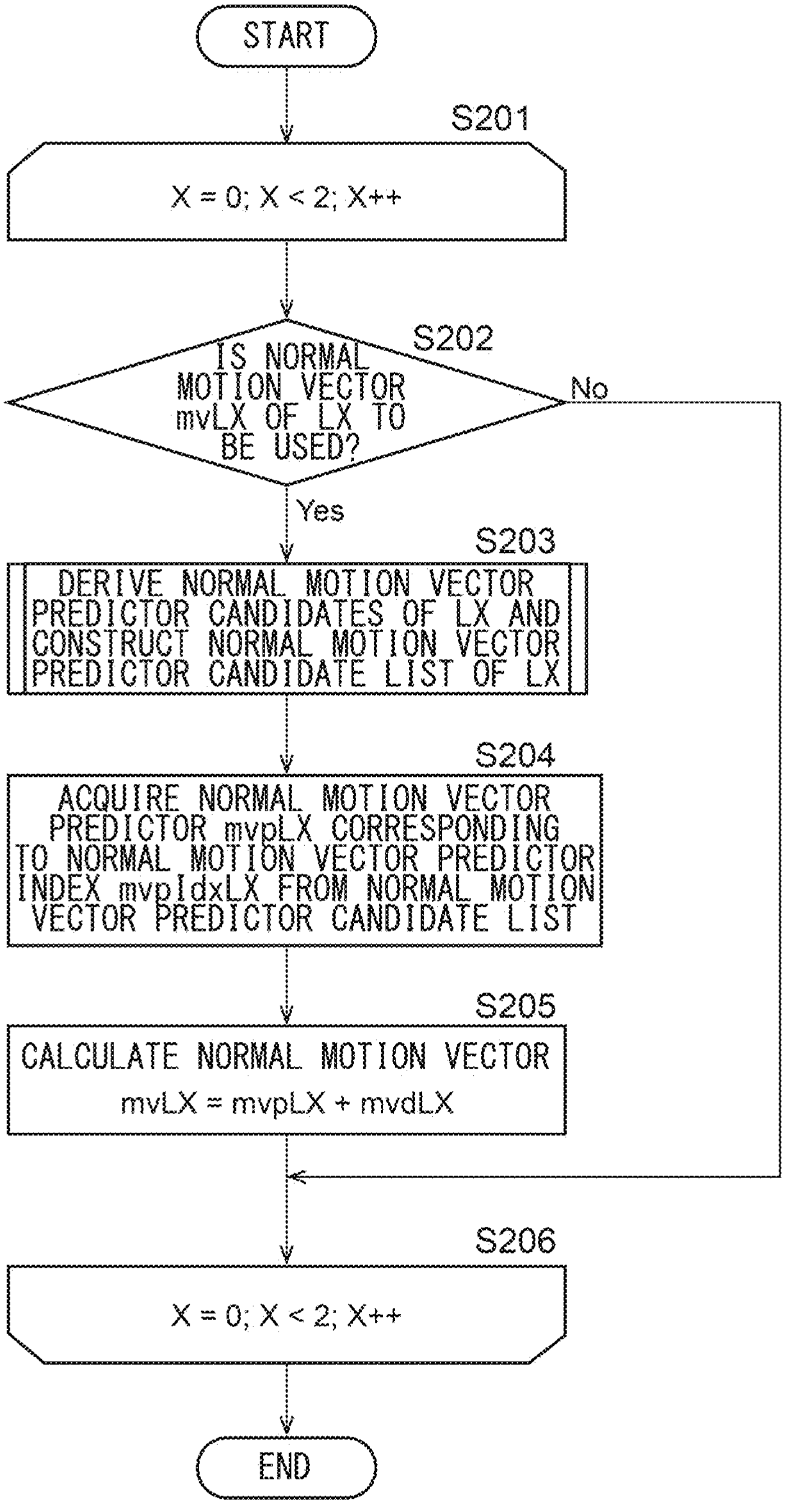
FIG. 25 is a flowchart illustrating a normal motion vector predictor mode derivation process of a normal motion vector predictor mode derivation unit 401 in FIG. 22.

Processing procedures of the normal motion vector predictor mode derivation unit 301 on the coding side and the normal motion vector predictor mode derivation unit 401 on the decoding side will be described with reference to the flowcharts in FIGS. 19 and 25, respectively. 19 is a flowchart illustrating a normal motion vector predictor mode derivation processing procedure performed by the normal motion vector mode derivation unit 301 on the coding side. FIG. 25 is a flowchart illustrating a normal motion vector predictor mode derivation processing procedure performed by the normal motion vector mode derivation unit 401 on the decoding side.

Normal Motion Vector Predictor Mode Derivation Unit (Normal AMVP): Coding Side

The normal motion vector predictor mode derivation processing procedure on the coding side will be described with reference to FIG. 19. In the description of the processing procedure in FIG. 19, the word "normal" illustrated in FIG. 19 will be omitted in some cases.

Figure 19:
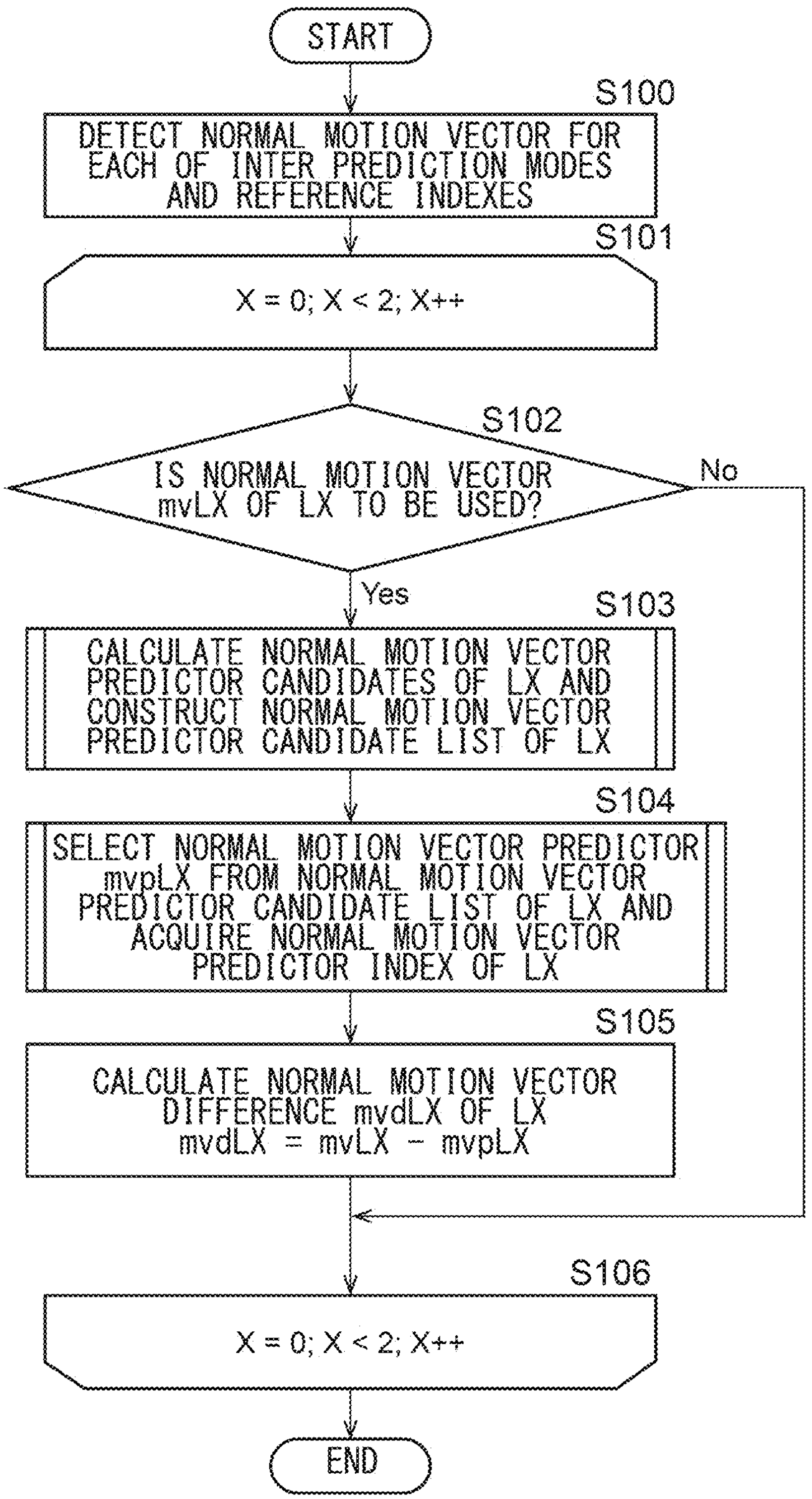
FIG. 19 is a flowchart illustrating a normal motion vector predictor mode derivation process of the normal motion vector predictor mode derivation unit 301 in FIG. 16.

First, the normal motion vector detector 326 detects a normal motion vector for each of inter prediction modes and reference indexes (step S100 in FIG. 19).

Subsequently, a motion vector difference of a motion vector used in inter prediction in the normal motion vector predictor mode is calculated for each of L0 and L1 (steps S101 to S106 in FIG. 19) in the spatial motion vector predictor candidate derivation unit 321, the temporal motion vector predictor candidate derivation unit 322, the history-based motion vector predictor candidate derivation unit 323, the motion vector predictor candidate replenisher 325, the motion vector predictor candidate selector 327, and the motion vector subtractor 328. Specifically, in a case where the prediction mode PredMode of the target block is inter prediction (MODE_INTER) and the inter prediction mode is L0-prediction (Pred_L0), the motion vector predictor candidate list mvpListL0 of L0 is calculated. Subsequently, the motion vector predictor mvpL0 is selected, and then, a motion vector difference mvdL0 of the motion vector mvL0 of L0 is calculated. In a case where the inter prediction mode of the target block is L1-prediction (Pred_L1), a motion vector predictor candidate list mvpListL1 of L1 is calculated. Subsequently, a motion vector predictor mvpL1 is selected, and then a motion vector difference mvdL1 of a motion vector mvL1 of L1 is calculated. In a case where the inter prediction mode of the target block is bi-prediction (Pred_BI), L0-prediction and L1-prediction are both performed. A motion vector predictor candidate list mvpListL0 of L0 is calculated and a motion vector predictor mvpL0 of L0 is selected, and then a motion vector difference mvdL0 of the motion vector mvL0 of L0 is calculated. Along with this calculation, a motion vector predictor candidate list mvpListL1 of L1 is calculated and a motion vector predictor mvpL1 of L1 is calculated, and then, a motion vector difference mvdL1 of a motion vector mvL1 of L1 is calculated.

The motion vector difference calculation process is performed for each of L0 and L1, in which the calculation process is a common process in both L0 and L1. Accordingly, L0 and L1 will be denoted as LX as a common procedure. In the process of calculating the motion vector difference of L0, X of LX is set to 0, while in the process of calculating the motion vector difference of L1, X of LX is set to 1. Additionally, in a case where information on the other list is referred to instead of one LX during the calculation process of the motion vector difference of the one LX, the other list will be represented as LY.

In a case where a motion vector mvLX of LX is used (step S102 in FIG. 19: YES), motion vector predictor candidates of LX are calculated, thereby constructing a motion vector predictor candidate list mvpListLX of LX (step S103 in FIG. 19). In the normal motion vector predictor mode derivation unit 301, the spatial motion vector predictor candidate derivation unit 321, the temporal motion vector predictor candidate derivation unit 322, the history-based motion vector predictor candidate derivation unit 323, and the motion vector predictor candidate replenisher 325 derive a plurality of motion vector predictor candidates and thereby constructs the motion vector predictor candidate list mvpListLX. The detailed processing procedure of step S103 in FIG. 19 will be described below using the flowchart in FIG. 20.

Subsequently, the motion vector predictor candidate selector 327 selects a motion vector predictor mvpLX of LX from the motion vector predictor candidate list mvpListLX of LX (step S104 in FIG. 19). Here, one element (the i-th element counted from 0) in the motion vector predictor candidate list mvpListLX is represented as mvpListLX[i]. The motion vector difference, which is a difference between the motion vector mvLX and each of the motion vector predictor candidates mvpListLX[i] stored in the motion vector predictor candidate list mvpListLX, is each calculated. A code amount at the time of coding these motion vector differences is calculated for each of elements (motion vector predictor candidates) of the motion vector predictor candidate list mvpListLX. Subsequently, the motion vector predictor candidate mvpListLX[i] that minimizes the code amount for each of motion vector predictor candidates among the individual elements added in the motion vector predictor candidate list mvpListLX is selected as the motion vector predictor mvpLX, and its index i is obtained. In a case where there is a plurality of the motion vector predictor candidates having the minimum generated code amount in the motion vector predictor candidate list mvpListLX, the motion vector predictor candidate mvpListLX[i] having the index i in the motion vector predictor candidate list mvpListLX represented by a small number is selected as the optimal motion vector predictor mvpLX, and its index i is obtained.

Subsequently, the motion vector subtractor 328 subtracts the selected motion vector predictor mvpLX of LX from the motion vector mvLX of LX and thereby calculates a motion vector difference mvdLX of LX as in:

$$mvdLX = mvLX - mvpLX$$

(step S105 in FIG. 19).

Normal Motion Vector Predictor Mode Derivation Unit (Normal AMVP): Decoding Side Next, a normal motion vector predictor mode processing procedure on the decoding side will be described with reference to FIG. 25. On the decoding side, the spatial motion vector predictor candidate derivation unit 421, the temporal motion vector predictor candidate derivation unit 422, the history-based motion vector predictor candidate derivation unit 423, and the motion vector predictor candidate replenisher 425 individually calculate motion vectors used in the inter prediction of the normal motion vector predictor mode for each of L0 and L1 (steps S201 to S206 in FIG. 25). Specifically, in a case where the prediction mode PredMode of the target block is inter prediction (MODE_INTER) and the inter prediction mode of the target block is L0-prediction (Pred_L0), the motion vector predictor candidate list mvpListL0 of L0 is calculated. Subsequently, the motion vector predictor mvpL0 is selected, and then, the motion vector mvL0 of L0 is calculated. In a case where the inter prediction mode of the target block is L1-prediction (Pred_L1), the L1 motion vector predictor candidate list mvpListL1 is calculated. Subsequently, the motion vector predictor mvpL1 is selected, and the L1 motion vector mvL1 is calculated. In a case where the inter prediction mode of the target block is bi-prediction (Pred_BI), L0-prediction and L1-prediction are both performed. A motion vector predictor candidate list mvpListL0 of L0 is calculated and a motion vector predictor mvpL0 of L0 is selected, and then the motion vector mvL0 of L0 is calculated. Along with this calculation, a motion vector predictor candidate list mvpListL1 of L1 is calculated and a motion vector predictor mvpL1 of L1 is calculated, and then, the motion vector mvL1 of L1 is calculated.

Similarly to the coding side, the decoding side performs the motion vector calculation processing for each of L0 and L1, in which the processing is a common process in both L0 and L1. Accordingly, L0 and L1 will be denoted as LX as a common procedure. LX represents an inter prediction mode used for inter prediction of a target coding block. X is 0 in the process of calculating the motion vector of L0, and X is 1 in the process of calculating the motion vector of L1. Additionally, in a case where information on the other reference list is referred to instead of the same reference list as the LX to be calculated during the calculation process of the motion vector of the LX, the other reference list will be represented as LY.

In a case where the motion vector mvLX of LX is used (step S202 in FIG. 25: YES), motion vector predictor candidates of LX are calculated to construct a motion vector predictor candidate list mvpListLX of LX (step S203 in FIG. 25). In the normal motion vector predictor mode derivation unit 401, the spatial motion vector predictor candidate derivation unit 421, the temporal motion vector predictor candidate derivation unit 422, the history-based motion vector predictor candidate derivation unit 423, and the motion vector predictor candidate replenisher 425 calculate a plurality of motion vector predictor candidates and thereby constructs the motion vector predictor candidate list mvpListLX. The detailed processing procedure of step S203 in FIG. 25 will be described below using the flowchart in FIG. 20.

Subsequently, the motion vector predictor candidate selector 426 extracts a motion vector predictor candidate mvpListLX [mvpIdxLX] corresponding to the motion vector predictor index mvpIdxLX decoded and supplied by the bit strings decoding unit 201 from the motion vector predictor candidate list mvpListLX, as the selected motion vector predictor mvpLX (step S204 in FIG. 25).

Subsequently, the motion vector adder 427 adds the motion vector difference mvdLX of LX and the motion vector predictor mvpLX of LX decoded and supplied by the bit strings decoding unit 201, and calculates the motion vector mvLX of LX as:

$$mvLX = mvpLX + mvdLX$$

(step S205 in FIG. 25).

Figure 20:
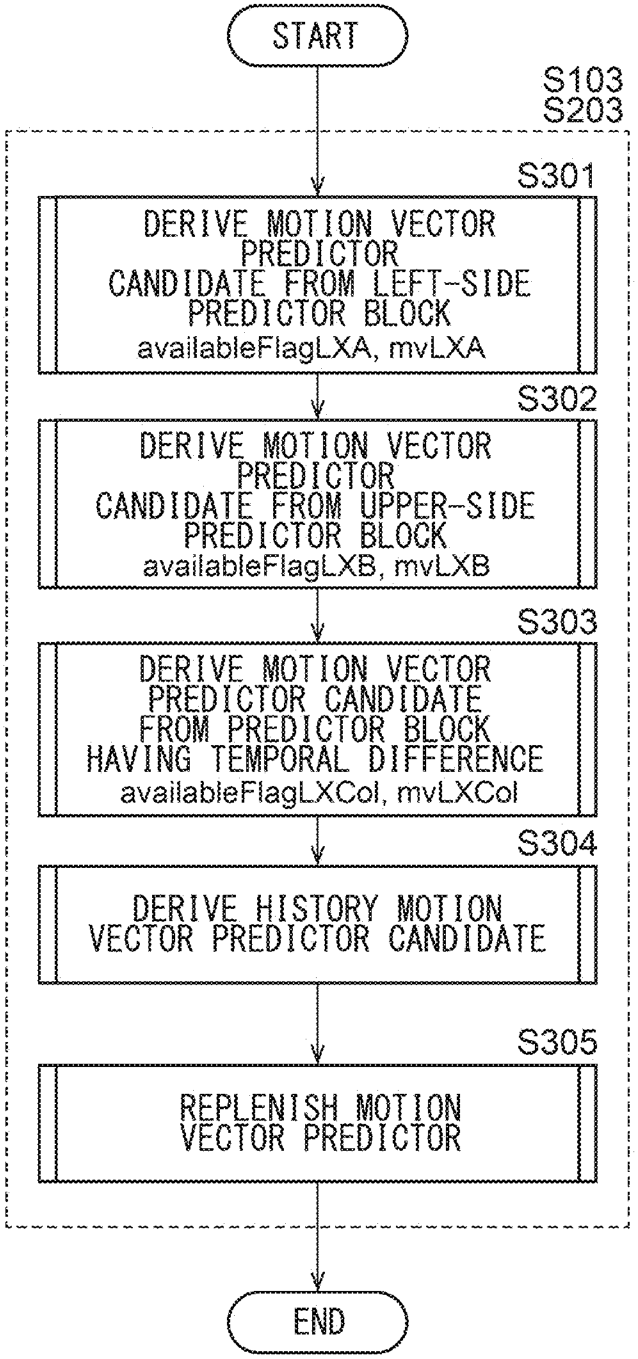
FIG. 20 is a flowchart illustrating a processing procedure of the normal motion vector predictor mode derivation process.

Normal Motion Vector Predictor Mode Derivation Unit (Normal AMVP): Motion Vector Prediction Method FIG. 20 is a flowchart illustrating a processing procedure of the normal motion vector predictor mode derivation process having a function common to the normal motion vector predictor mode derivation unit 301 of the picture coding device and the normal motion vector predictor mode derivation unit 401 of the picture decoding device according to the embodiment of the present invention.

Each of the normal motion vector predictor mode derivation unit 301 and the normal motion vector predictor mode derivation unit 401 includes a motion vector predictor candidate list mvpListLX. The motion vector predictor candidate list mvpListLX has a list structure, and includes a storage region that stores, as elements, a motion vector predictor index indicating a location in the motion vector predictor candidate list and a motion vector predictor candidate corresponding to the index. The number of the motion vector predictor index starts from 0, and motion vector predictor candidates are to be stored in the storage region of the motion vector predictor candidate list mvpListLX. In the present embodiment, it is assumed that the motion vector predictor candidate list mvpListLX can add at least two motion vector predictor candidates (as inter prediction information). Further, a variable numCurrMvpCand indicating the number of motion vector predictor candidates added in the motion vector predictor candidate list mvpListLX is set to 0.

Each of the spatial motion vector predictor candidate derivation units 321 and 421 derives a motion vector predictor candidate from blocks in the neighbor of the left side. This process derives a motion vector predictor mvLXA with reference to inter prediction information of the block in the neighbor of the left side (A0 or A1 in FIG. 11), namely, a flag indicating whether a motion vector predictor candidate is usable, a motion vector, a reference index, or the like, and adds the derived mvLXA to the motion vector predictor candidate list mvpListLX (step S301 in FIG. 20). Note that X is 0 in L0-prediction and X is 1 in L1-prediction (similar applies hereinafter). Subsequently, the spatial motion vector predictor candidate derivation units 321 and 421 derive the motion vector predictor candidates from an upper neighboring block. This process derives a motion vector predictor mvLXB with reference to inter prediction information of the upper neighboring block (B0, B1 or B2 in FIG. 11), namely, a flag indicating whether a motion vector predictor candidate is usable, a motion vector, a reference index, or the like, When the derived mvLXA and the derived mvLXB are not equal, mvLXB is added to the motion vector predictor candidate list mvpListLX (step S302 in FIG. 20). The processes in steps S301 and S302 in FIG. 20 are provided as a common process except that the positions and numbers of reference neighboring blocks are different, and a flag availableFlagLXN indicating whether a motion vector predictor candidate of a coding block is usable, and a motion vector mvLXN, a reference index refIdxN (N indicates A or B, similar applies hereinafter) will be derived in these processes.

Subsequently, each of the temporal motion vector predictor candidate derivation units 322 and 422 derives a motion vector predictor candidate from a block in a picture having a temporal difference from the target picture. This process derives a flag availableFlagLXCol indicating whether a motion vector predictor candidate of a coding block of a picture having a temporal difference is usable, and a motion vector mvLXCol, a reference index refIdxCol, and a reference list listCol, and adds mvLXCol to the motion vector predictor candidate list mvpListLX (step S303 in FIG. 20).

Note that it is assumed that the processes of the temporal motion vector predictor candidate derivation units 322 and 422 can be omitted in units of a sequence (SPS), a picture (PPS), or a slice.

Subsequently, the history-based motion vector predictor candidate derivation units 323 and 423 add the history-based motion vector predictor candidates added in a history-based motion vector predictor candidate list HmvpCandList to the motion vector predictor candidate list mvpListLX. (Step S304 in FIG. 20). Details of the registration processing procedure in step S304 will be described below with reference to the flowchart in FIG. 29.

Subsequently, the motion vector predictor candidate replenishers 325 and 425 add a motion vector predictor candidate having a predetermined value such as (0, 0) until the motion vector predictor candidate list mvpListLX is satisfied (S305 in FIG. 20).

Normal Merge Mode Derivation Unit (Normal Merge)

Figure 18:
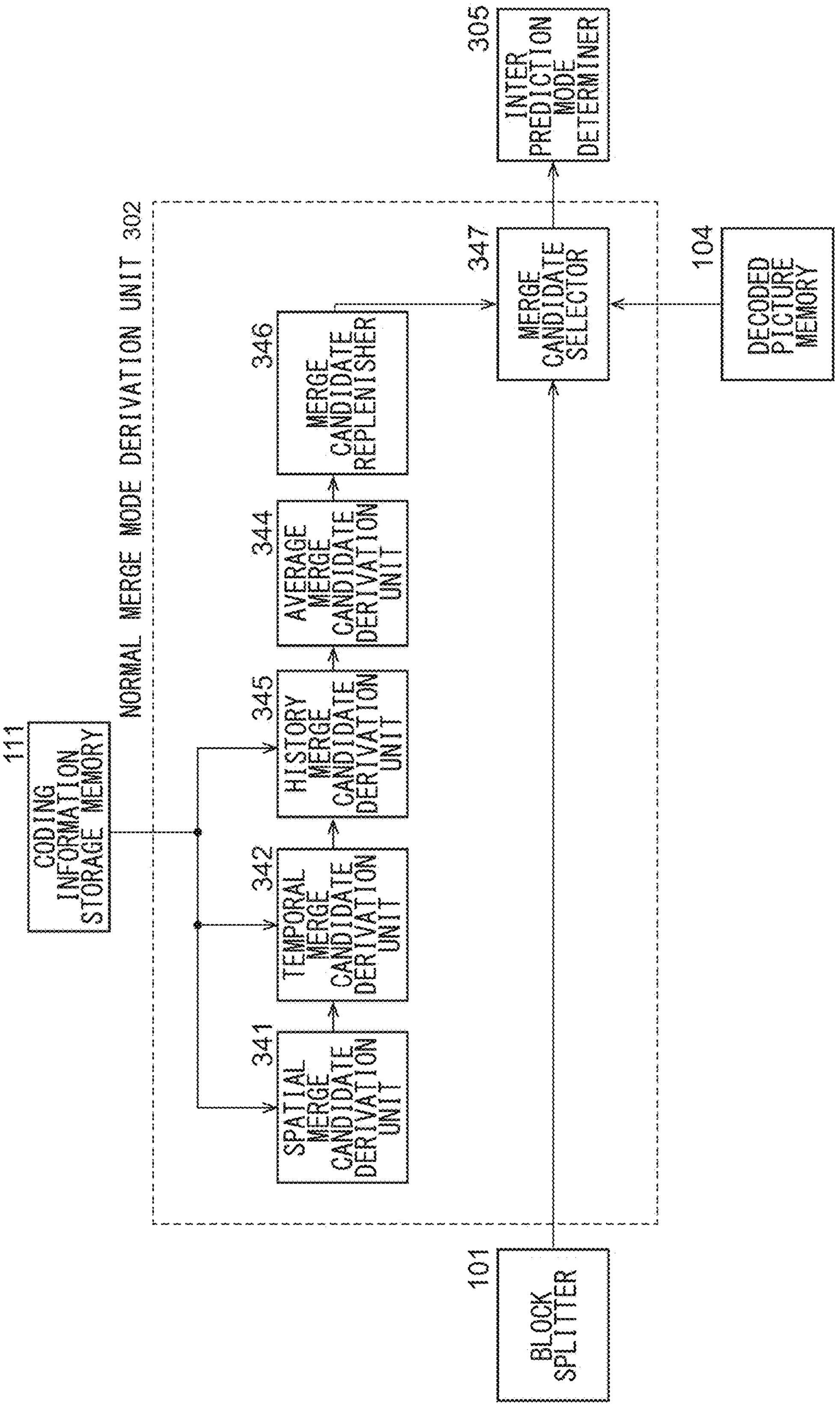
FIG. 18 is a block diagram of a detailed configuration of a normal merge mode derivation unit 302 in FIG. 16.

The normal merge mode derivation unit 302 in FIG. 18 includes a spatial merging candidate derivation unit 341, a temporal merging candidate derivation unit 342, an average merging candidate derivation unit 344, a history-based merging candidate derivation unit 345, a merging candidate replenisher 346, and a merging candidate selector 347.

Figure 24:
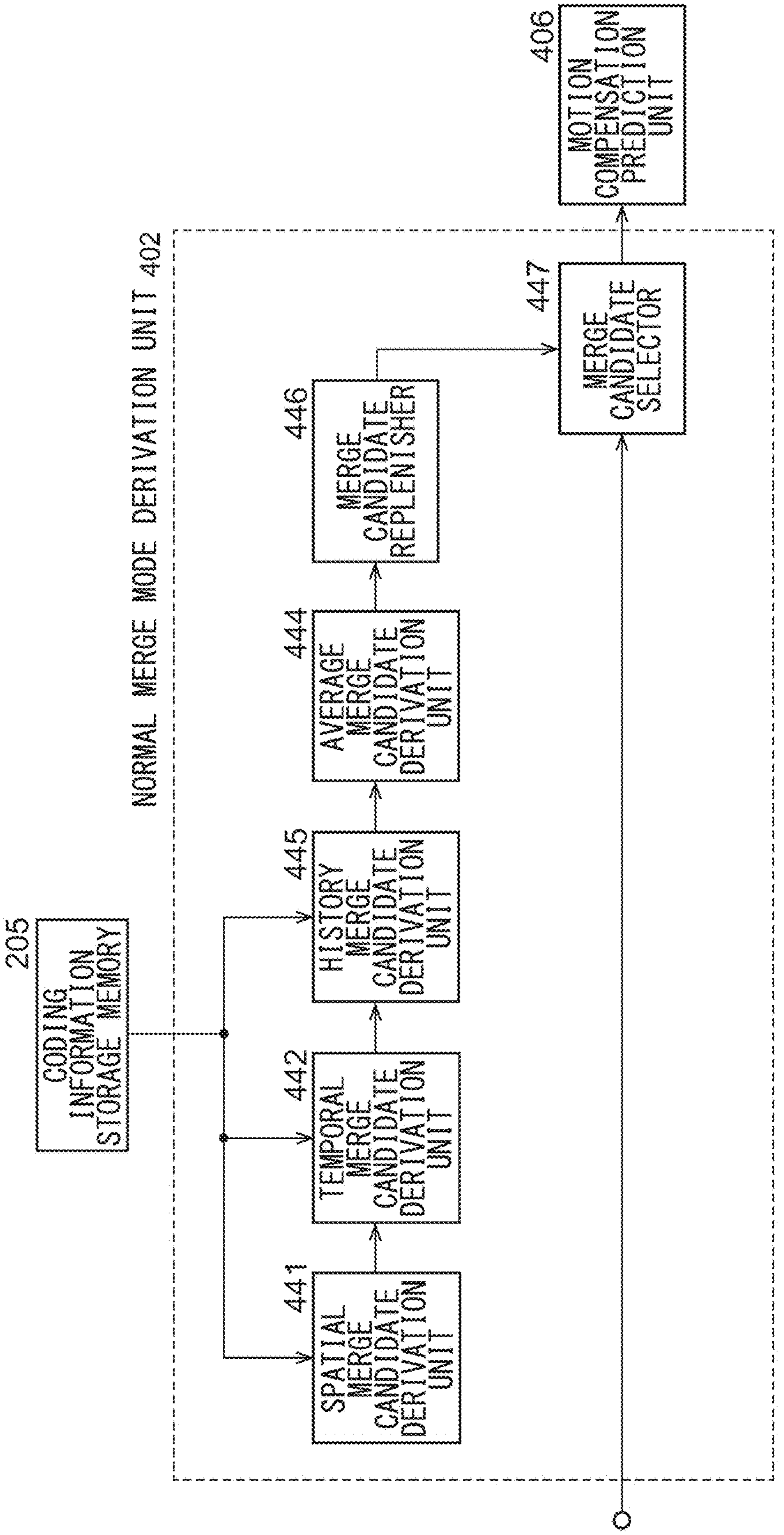
FIG. 24 is a block diagram of a detailed configuration of a normal merge mode derivation unit 402 in FIG. 22.

The normal merge mode derivation unit 402 in FIG. 24 includes a spatial merging candidate derivation unit 441, a temporal merging candidate derivation unit 442, an average merging candidate derivation unit 444, a history-based merging candidate derivation unit 445, a merging candidate replenisher 446, and a merging candidate selector 447.

Figure 21:
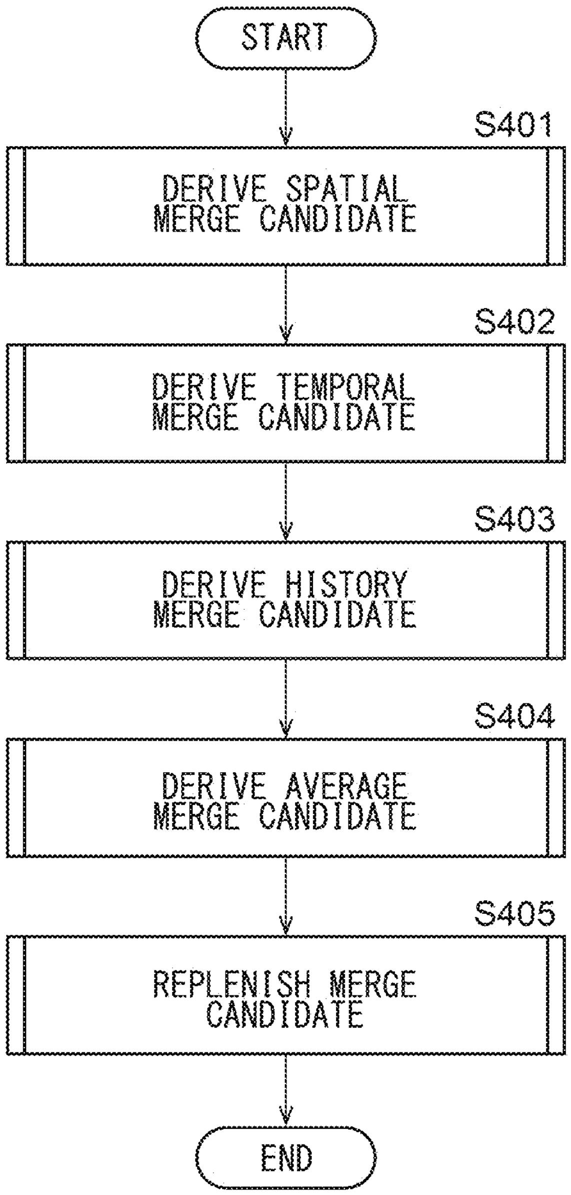
FIG. 21 is a flowchart illustrating a processing procedure of a normal merge mode derivation process.

FIG. 21 is a flowchart illustrating a procedure of a normal merge mode derivation process having a function common to the normal merge mode derivation unit 302 of the picture coding device and the normal merge mode derivation unit 402 of the picture decoding device according to the embodiment of the present invention.

Hereinafter, various processes will be described step by step. The following description is a case where the slice type slice_type is B slice unless otherwise specified. However, the present invention can also be applied to the case of P slice. Note that there is only L0-prediction (Pred_L0) as the inter prediction mode, with no L1-prediction (Pred_L1) or bi-prediction (Pred_BI) in the case where the slice type slice_type is P slice. Accordingly, it is possible to omit the process related to L1 in this case.

The normal merge mode derivation unit 302 and the normal merge mode derivation unit 402 include a merging candidate list mergeCandList. The merging candidate list mergeCandList has a list structure, and includes a storage region that stores, as elements, a merge index indicating a location in the merging candidate list and a merging candidate corresponding to the index. The number of the merge index starts from 0, and the merging candidate is stored in the storage region of the merging candidate list mergeCandList. In the subsequent processing, the merging candidate of the merge index i added in the merging candidate list mergeCandList will be represented by mergeCandList[i]. In the present embodiment, it is assumed that the merging candidate list mergeCandList can add at least six merging candidates (as inter prediction information). Furthermore, a variable numCurrMergeCand indicating the number of merging candidates added in the merging candidate list mergeCandList is set to 0.

The spatial merging candidate derivation unit 341 and the spatial merging candidate derivation unit 441 derive a spatial merging candidate of each of blocks (B1, A1, B0, A0, B2 in FIG. 11) in the neighbor of the target block in order of B1, A1, B0, A0, and B2, from the coding information stored either in the coding information storage memory 111 of the picture coding device or in the coding information storage memory 205 of the picture decoding device, and then, adds the derived spatial merging candidates to the merging candidate list mergeCandList (step S401 in FIG. 21). Here, N indicating one of B1, A1, B0, A0, B2 or the temporal merging candidate Col will be defined. Items to be derived include a flag availableFlagN indicating whether the inter prediction information of the block N is usable as a spatial merging candidate, a reference index refIdxL0N of L0 and a reference index refIdxL1N of L1 of the spatial merging candidate N, an L0-prediction flag predFlagL0N indicating whether L0-prediction is to be performed, an L1-prediction flag predFlagL1N indicating whether L1-prediction is to be performed, a motion vector mvL0N of L0, and a motion vector mvL1N of L1. However, since the merging candidate in the present embodiment is derived without reference to the inter prediction information of the block included in the target coding block, the spatial merging candidate using the inter prediction information of the block included in the target coding block will not be derived.

Subsequently, the temporal merging candidate derivation unit 342 and the temporal merging candidate derivation unit 442 derive temporal merging candidates from pictures having a temporal difference, and add the derived temporal merging candidates in a merging candidate list mergeCandList (step S402 in FIG. 21). Items to be derived include a flag availableFlagCol indicating whether the temporal merging candidate is usable, an L0-prediction flag predFlagL0Col indicating whether the L0-prediction of the time merging candidate is to be performed, an L1-prediction flag predFlagL1Col indicating whether the L1-prediction is to be performed, and a motion vector mvL0Col of L0, and a motion vector mvL1Col of L1.

Note that it is assumed that the processes of the temporal merging candidate derivation units 342 and 442 can be omitted in units of a sequence (SPS), a picture (PPS), or a slice.

Subsequently, the history-based merging candidate derivation unit 345 and the history-based merging candidate derivation unit 445 add the history-based motion vector predictor candidates added in the history-based motion vector predictor candidate list HmvpCandList, to the merging candidate list mergeCandList (step S403 in FIG. 21).

In a case where the number of merging candidates numCurrMergeCand added in the merging candidate list mergeCandList is smaller than the maximum number of merging candidates MaxNumMergeCand, the history-based merging candidate is derived with the number of merging candidates numCurrMergeCand added in the merging candidate list mergeCandList being limited to the maximum number of merging candidates MaxNumMergeCand, and then added to the merging candidate list mergeCandList.

Subsequently, the average merging candidate derivation unit 344 and the average merging candidate derivation unit 444 derive an average merging candidate from the merging candidate list mergeCandList, and add the derived average merging candidate to the merging candidate list mergeCandList (step S404 in FIG. 21).

In a case where the number of merging candidates numCurrMergeCand added in the merging candidate list mergeCandList is smaller than the maximum number of merging candidates MaxNumMergeCand, the average merging candidate is derived with the number of merging candidates numCurrMergeCand added in the merging candidate list mergeCandList being limited to the maximum number of merging candidates MaxNumMergeCand, and then added to the merging candidate list mergeCandList.

Here, the average merging candidate is a new merging candidate including a motion vector obtained by averaging the motion vectors of the first merging candidate and the second merging candidate added in the merging candidate list mergeCandList for each of L0-prediction and L1-prediction.

Subsequently, in the merging candidate replenisher 346 and the merging candidate replenisher 446, in a case where the number of merging candidates numCurrMergeCand added in the merging candidate list mergeCandList is smaller than the maximum number of merging candidates MaxNumMergeCand, an additional merging candidate is derived with the number of merging candidates num- CurrMergeCand added in the merging candidate list mergeCandList being limited to the maximum number of merging candidates MaxNumMergeCand, and then added to the merging candidate list mergeCandList (step S405 in FIG. 21). In the P slice, a merging candidate having the motion vector of a value (0, 0) and the prediction mode of L0-prediction (Pred_L0) is added with the maximum number of merging candidates MaxNumMergeCand as the upper limit. In the B slice, a merging candidate having the prediction mode of bi-prediction (Pred_BI) and the motion vector of a value (0, 0) is added. The reference index at the time of addition of a merging candidate is different from the reference index that has already been added.

Subsequently, the merging candidate selector 347 and the merging candidate selector 447 select a merging candidate from among the merging candidates added in the merging candidate list mergeCandList. The merging candidate selector 347 on the coding side calculates the code amount and the distortion amount, and thereby selects a merging candidate, and then, supplies a merge index indicating the selected merging candidate and inter prediction information of the merging candidate to the motion compensation prediction unit 306 via the inter prediction mode determiner 305. In contrast, the merging candidate selector 447 on the decoding side selects a merging candidate based on the decoded merge index, and supplies the selected merging candidate to the motion compensation prediction unit 406.

Updating History-based Motion Vector Predictor Candidate List

Figure 26:
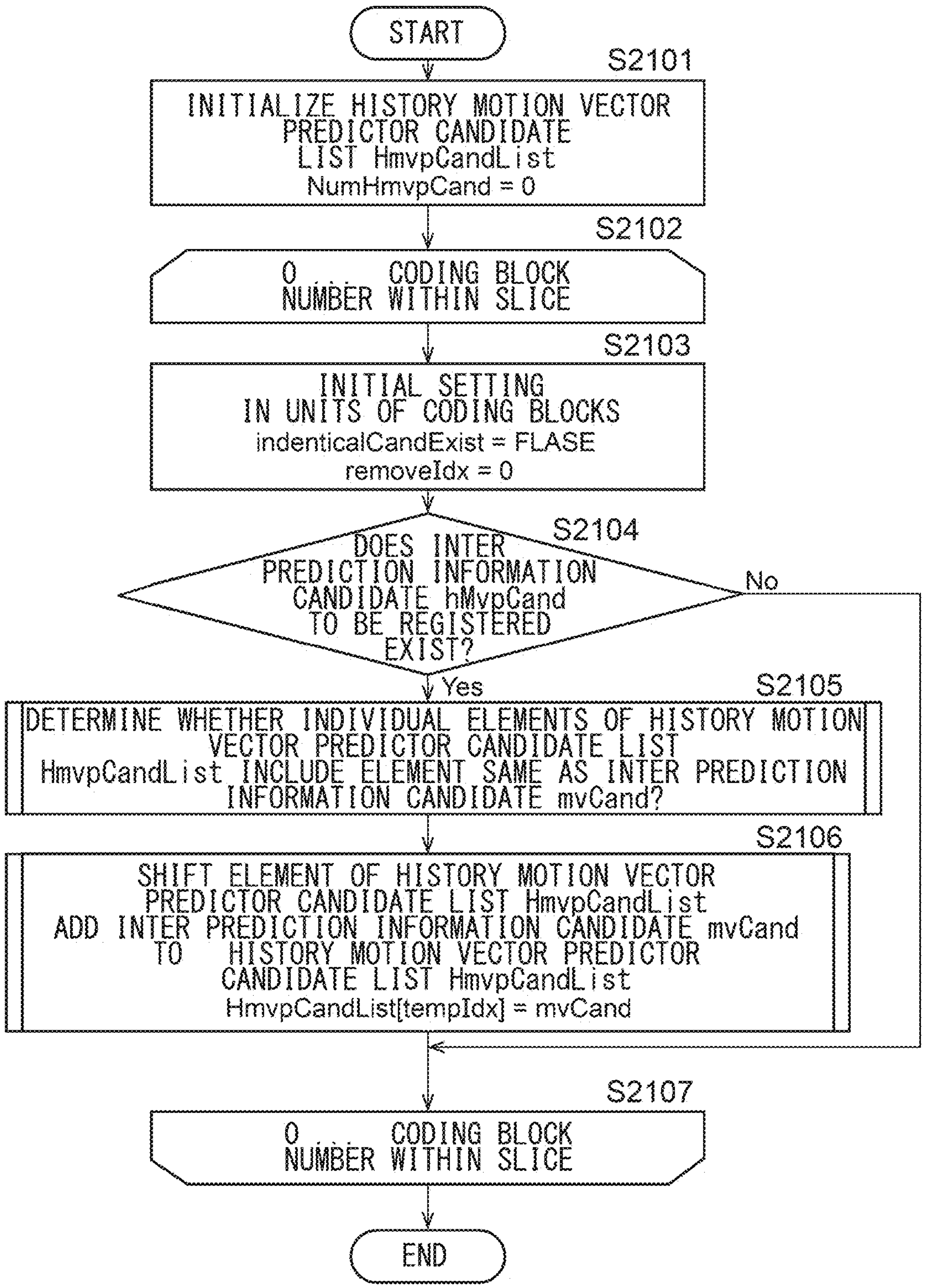
FIG. 26 is a diagram illustrating a history-based motion vector predictor candidate list initialization/update processing procedure.

Next, a method of initializing and updating the history-based motion vector predictor candidate list HmvpCandList provided in the coding information storage memory 111 on the coding side and the coding information storage memory 205 on the decoding side will be described in detail. FIG. 26 is a flowchart illustrating the history-based motion vector predictor candidate list initialization/update processing procedure.

In the present embodiment, the history-based motion vector predictor candidate list HmvpCandList is updated in the coding information storage memory 111 and the coding information storage memory 205. Alternatively, a history-based motion vector predictor candidate list updating unit may be provided in the inter prediction unit 102 and the inter prediction unit 203 to update the history-based motion vector predictor candidate list HmvpCandList.

Initial settings of the history-based motion vector predictor candidate list HmvpCandList are performed at the head of the slice. On the coding side, the history-based motion vector predictor candidate list HmvpCandList is updated in a case where the normal motion vector predictor mode or the normal merge mode is selected by the prediction method determiner 105. On the decoding side, the history-based motion vector predictor candidate list HmvpCandList is updated in a case where the prediction information decoded by the bit strings decoding unit 201 is the normal motion vector predictor mode or the normal merge mode.

The inter prediction information used at the time of performing the inter prediction in the normal motion vector predictor mode or the normal merge mode is to be added in the history-based motion vector predictor candidate list HmvpCandList, as an inter prediction information candidate hMvpCand. The inter prediction information candidate hMvpCand includes the reference index refIdxL0 of L0 and the reference index refIdxL1 of L1, the prediction flag predFlagL0 indicating whether L0-prediction is to be performed, the prediction flag predFlagL1 indicating whether L1-prediction is to be performed, the motion vector mvL0 of L0 and the motion vector mvL1 of L1.

In a case where there is inter prediction information having the same value as the inter prediction information candidate hMvpCand among the elements (that is, inter prediction information) added in the history-based motion vector predictor candidate list HmvpCandList provided in the coding information storage memory 111 on the coding side and the coding information storage memory 205 on the decoding side, the element will be deleted from the history-based motion vector predictor candidate list HmvpCandList. In contrast, in a case where there is no inter prediction information having the same value as the inter prediction information candidate hMvpCand, the head element of the history-based motion vector predictor candidate list HmvpCandList will be deleted, and the inter prediction information candidate hMvpCand will be added to the end of the history-based motion vector predictor candidate list HmvpCandList.

The number of elements of the history-based motion vector predictor candidate list HmvpCandList provided in the coding information storage memory 111 on the coding side and the coding information storage memory 205 on the decoding side of the present invention is set to six.

First, the history-based motion vector predictor candidate list HmvpCandList is initialized in units of slices (step S2101 in FIG. 26). All the elements of the history-based motion vector predictor candidate list HmvpCandList are emptied at the head of the slice, and the number NumHmvpCand (current number of candidates) of history-based motion vector predictor candidates added in the history-based motion vector predictor candidate list HmvpCandList is set to 0.

Although initialization of the history-based motion vector predictor candidate list HmvpCandList is to be performed in units of slices (first coding block of a slice), the initialization may be performed in units of pictures, tiles, or tree block rows.

Subsequently, the following process of updating the history-based motion vector predictor candidate list HmvpCandList is repeatedly performed for each of coding blocks in the slice (steps S2102 to S2107 in FIG. 26).

First, initial settings are performed in units of coding blocks. A flag "identicalCandExist" indicating whether an identical candidate exists is set to a value of FALSE (false), a deletion target index "removeIdx" indicating the deletion target candidate is set to 0 (step S2103 in FIG. 26).

It is determined whether there is an inter prediction information candidate hMvpCand to be added (step S2104 in FIG. 26). In a case where the prediction method determiner 105 on the coding side determines the normal motion vector predictor mode or the normal merge mode, or where the bit strings decoding unit 201 on the decoding side performs decoding as the normal motion vector predictor mode or the normal merge mode, the corresponding inter prediction information is set as an inter prediction information candidate hMvpCand to be added. In a case where the prediction method determiner 105 on the coding side determines the intra prediction mode, the subblock motion vector predictor mode or the subblock merge mode, or in a case where the bit strings decoding unit 201 on the decoding side performs decoding as the intra prediction mode, the subblock motion vector predictor mode, or the subblock merge mode, update process of the history-based motion vector predictor candidate list HmvpCandList will not be performed, and there will be no inter prediction information candidate hMvpCand to be added. In a case where there is no inter prediction information candidate hMvpCand to be added, steps S2105 to S2106 will be skipped (step S2104 in FIG. 26: NO). In a case where there is an inter prediction information candidate hMvpCand to be added, the process of step S2105 and later will be performed (step S2104 in FIG. 26: YES).

Figure 27:
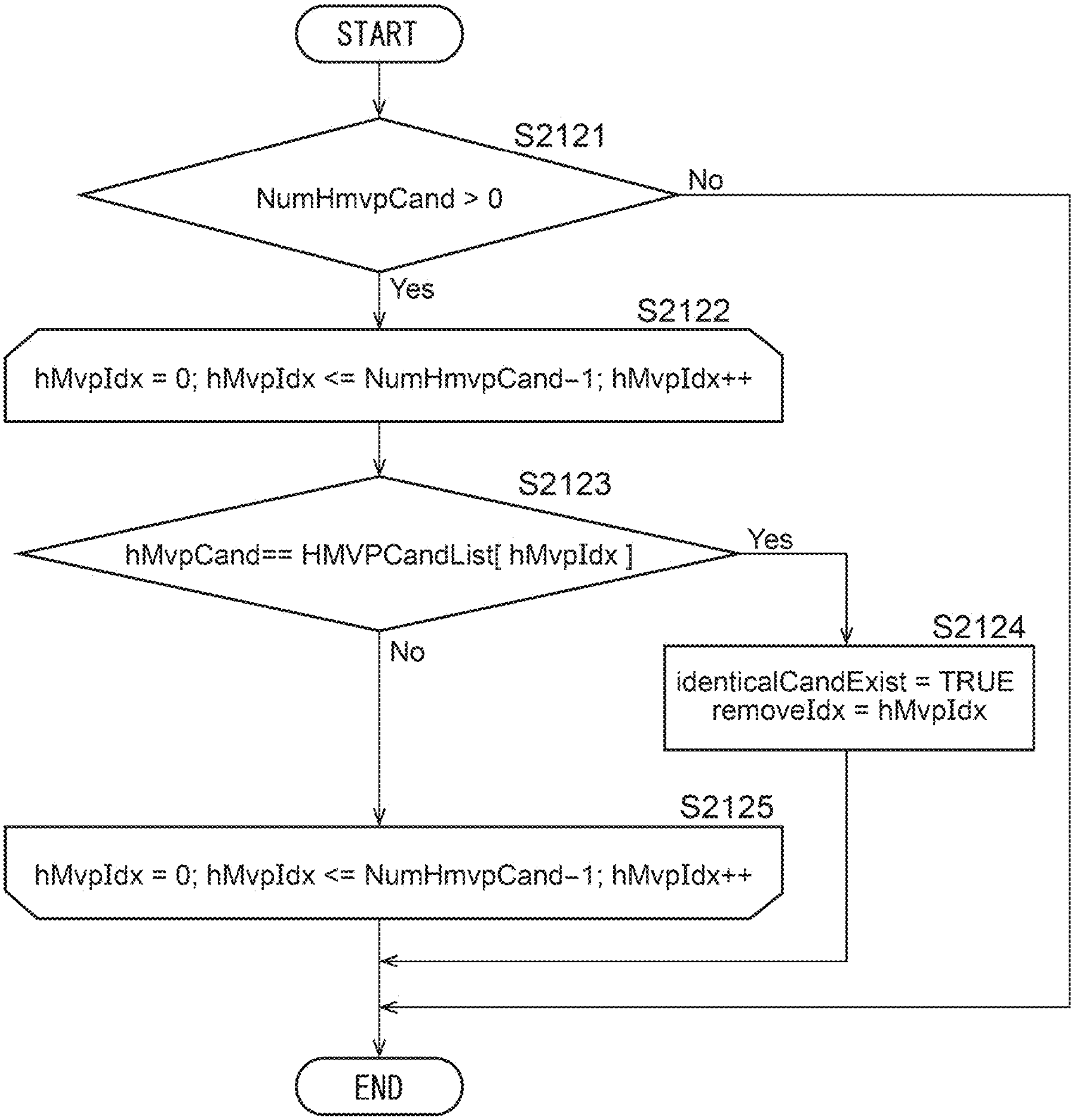
FIG. 27 is a flowchart of an identical element confirmation processing procedure in the history-based motion vector predictor candidate list initialization/update processing procedure.

Subsequently, it is determined whether individual elements of the history-based motion vector predictor candidate list HmvpCandList include an element (inter prediction information) having the same value as the inter prediction information candidate hMvpCand to be added, that is, whether the identical element exists (step S2105 in FIG. 26). FIG. 27 is a flowchart of the identical element confirmation processing procedure. In a case where the value of the number of history-based motion vector predictor candidates NumHmvpCand is 0 (step S2121 in FIG. 27: NO), the history-based motion vector predictor candidate list HmvpCandList is empty, and the identical candidate does not exist. Accordingly, steps S2122 to S2125 in FIG. 27 will be skipped, finishing the identical element confirmation processing procedure. In a case where the value of the number NumHmvpCand of the history-based motion vector predictor candidates is greater than 0 (YES in step S2121 in FIG. 27), the process of step S2123 will be repeated from a history-based motion vector predictor index hMvpIdx of 0 to NumHmvpCand−1 (steps S2122 to S2125 in FIG. 27). First, comparison is made as to whether the hMvpIdx-th element HmvpCandList [hMvpIdx] counted from 0 in the history-based motion vector predictor candidate list is identical to the inter prediction information candidate hMvpCand (step S2123 in FIG. 27). In a case where they are identical (step S2123 in FIG. 27: YES), the flag identicalCandExist indicating whether the identical candidate exists is set to a value of TRUE, and the deletion target index removeIdx indicating the position of the element to be deleted is set to a current value of the history-based motion vector predictor index hMvpIdx, and the identical element confirmation processing will be finished. In a case where they are not identical (step S2123 in FIG. 27: NO), hMvpIdx is incremented by one. In a case where the history-based motion vector predictor index hMvpIdx is smaller than or equal to NumHmvpCand−1, the processing of step S2123 and later is performed.

Figure 28:
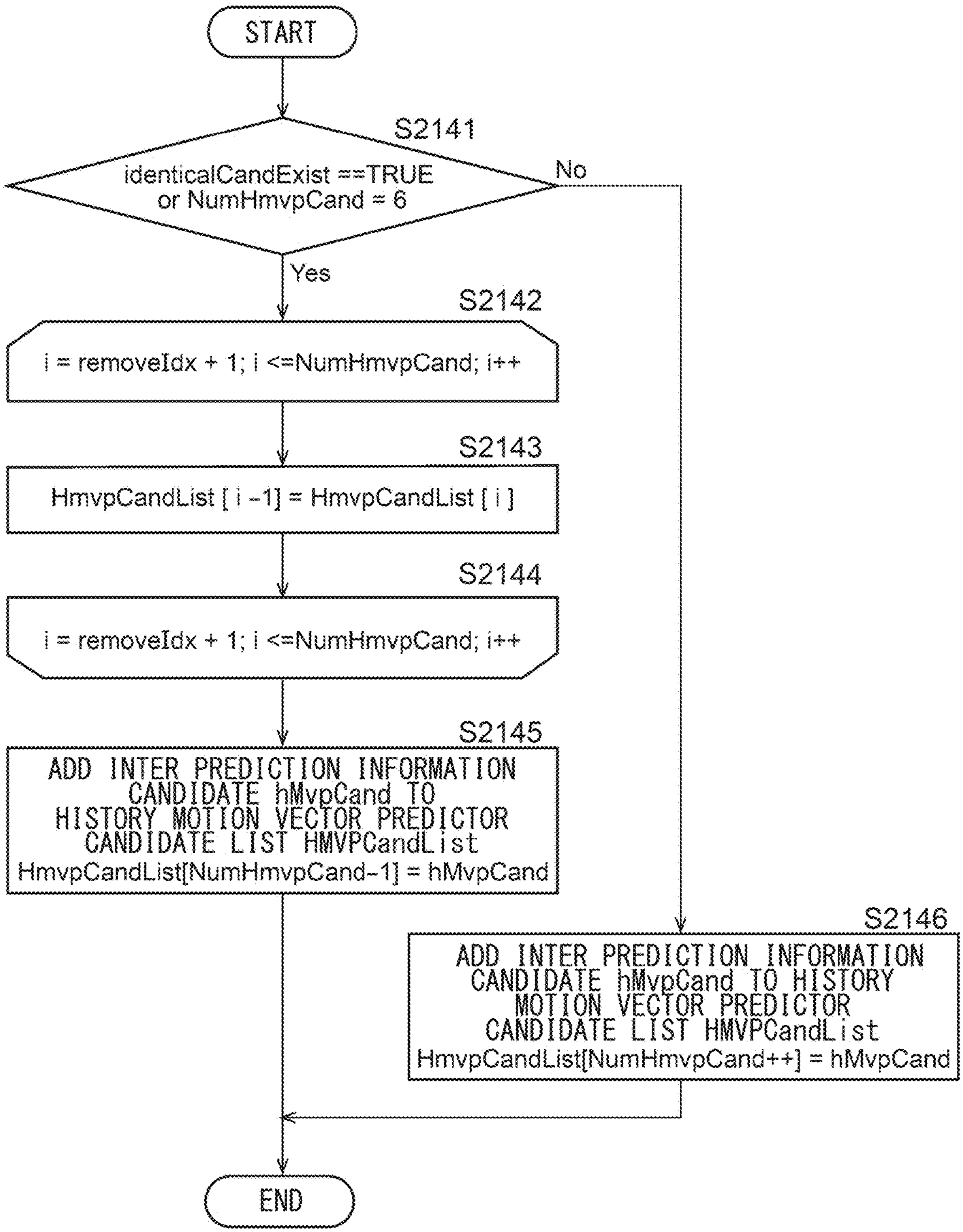
FIG. 28 is a flowchart of an element shift processing procedure in the history-based motion vector predictor candidate list initialization/update processing procedure.

Returning to the flowchart of FIG. 26, the process of shifting and adding elements of the history-based motion vector predictor candidate list HmvpCandList is performed (step S2106 in FIG. 26). FIG. 28 is a flowchart of the element shift/addition processing procedure of the history-based motion vector predictor candidate list HmvpCandList in step S2106 in FIG. 26. First, it is determined whether to add a new element after removing the element stored in the history-based motion vector predictor candidate list HmvpCandList, or to add a new element without removing the element. Specifically, a comparison is made as to whether the flag identicalCandExist indicating whether the identical candidate exists is TRUE, or whether NumHmvpCand is 6 (step S2141 in FIG. 28). In a case where one of the conditions that the flag identicalCandExist indicating whether the identical candidate exists is TRUE or that the current number of candidates NumHmvpCand is 6 is satisfied (step S2141 in FIG. 28: YES), the element stored in the history-based motion vector predictor candidate list HmvpCandList is removed and thereafter a new element will be added. An initial value of index i is set to a value of removeIdx+1. The element shift process of step S2143 is repeated from this initial value to NumHmvpCand. (Steps S2142 to S2144 in FIG. 28). By copying the elements of HmvpCandList [i] to HmvpCandList [i−1], the elements are shifted forward (step S2143 in FIG. 28), and i is incremented by one (steps S2142 to S2144 in FIG. 28). Subsequently, the inter prediction information candidate hMvpCand is added to the (NumHmvpCand−1)th HmvpCandList [NumHmvpCand−1] counting from 0 that corresponds to the end of the history-based motion vector predictor candidate list (step S2145 in FIG. 28), and the element shift/addition process of the history-based motion vector predictor candidate list HmvpCandList will be finished. In contrast, in a case where none of the conditions that the flag identicalCandExist indicating whether the identical candidate exists is TRUE and that NumHmvpCand is 6 are satisfied (step S2141 in FIG. 28: NO), the inter prediction information candidate hMvpCand will be added to the end of the history-based motion vector predictor candidate list without removing the element stored in the history-based motion vector predictor candidate list HmvpCandList (step S2146 in FIG. 28). Here, the end of the history-based motion vector predictor candidate list is the NumHmvpCand-th HmvpCandList [NumHmvpCand] counted from 0. Moreover, NumHmvpCand is incremented by one, and the element shift and addition process of the history-based motion vector predictor candidate list HmvpCandList are finished.

Figure 31A:
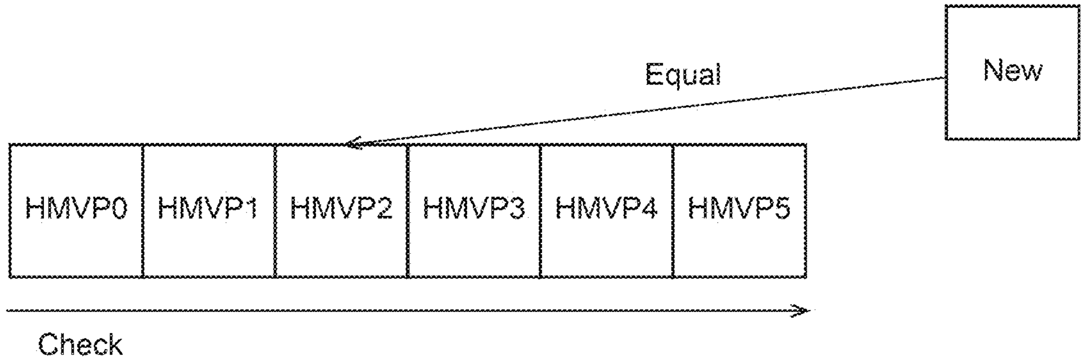
FIG. 31A is a diagram illustrating an example of a history-based motion vector predictor candidate list update process.
Figure 31B:
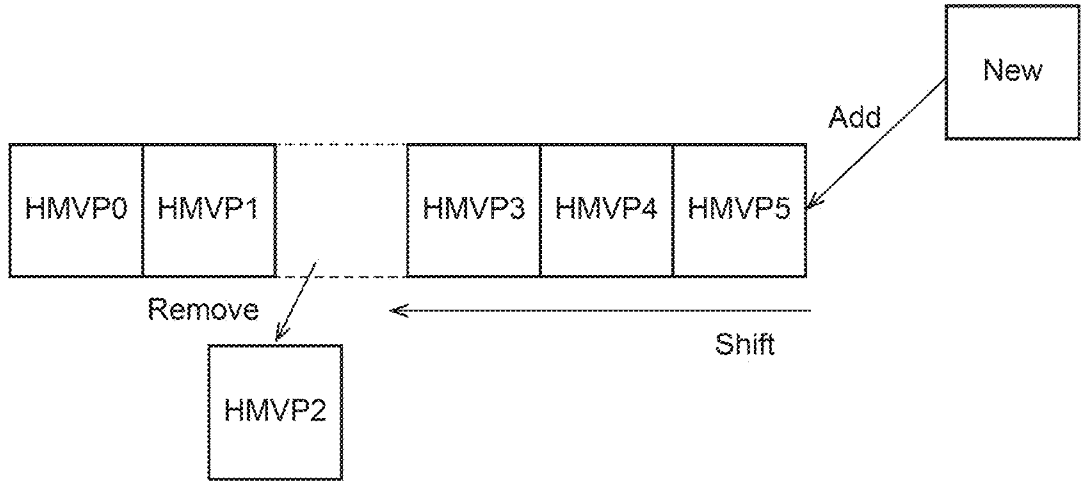
FIG. 31B is a diagram illustrating an example of a history-based motion vector predictor candidate list update process.
Figure 31C:
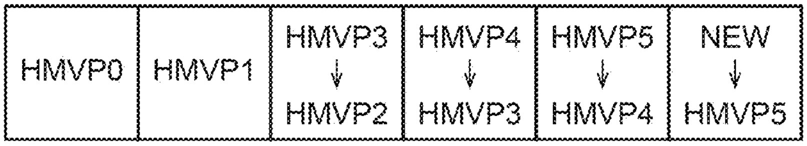
FIG. 31C is a diagram illustrating an example of a history-based motion vector predictor candidate list update process.

FIG. 31 is a view illustrating an example of a process of updating the history-based motion vector predictor candidate list. In a case where a new element is to be added to the history-based motion vector predictor candidate list HmvpCandList in which six elements (inter prediction information) have already been added, the history-based motion vector predictor candidate list HmvpCandList is compared with new inter prediction information in order from the head element (FIG. 31A). When the new element has the same value as the third element HMVP2 from the head of the history-based motion vector predictor candidate list HmvpCandList, the element HMVP2 is deleted from the history-based motion vector predictor candidate list HmvpCandList and elements HMVP3 to HMVP5 are shifted (copied) one by one forward, and a new element is added to the end of the history-based motion vector predictor candidate list HmvpCandList (FIG. 31B) to complete the update of the history-based motion vector predictor candidate list HmvpCandList (FIG. 31C).

History-Based Motion Vector Predictor Candidate Derivation Process

Figure 29:
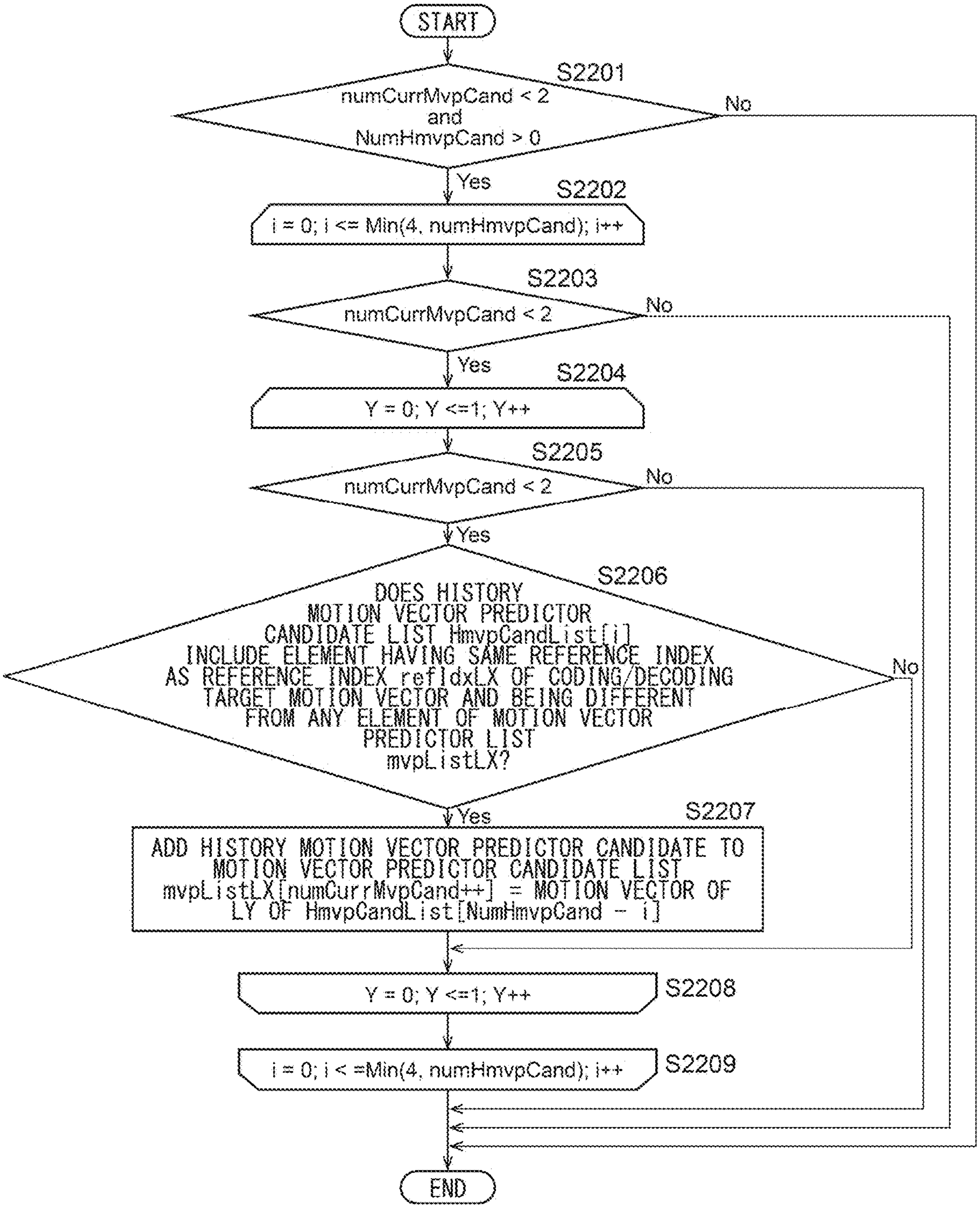
FIG. 29 is a flowchart illustrating a history-based motion vector predictor candidate derivation processing procedure.

Next, a method of deriving a history-based motion vector predictor candidate from the history-based motion vector predictor candidate list HmvpCandList will be described in detail. This corresponds to a processing procedure of step S304 in FIG. 20 concerning common processing performed by the history-based motion vector predictor candidate derivation unit 323 of the normal motion vector predictor mode derivation unit 301 on the coding side and the history-based motion vector predictor candidate derivation unit 423 of the normal motion vector predictor mode derivation unit 401 on the decoding side. FIG. 29 is a flowchart illustrating a history-based motion vector predictor candidate derivation processing procedure.

In a case where the current number of motion vector predictor candidates numCurrMvpCand is larger than or equal to the maximum number of elements of the motion vector predictor candidate list mvpListLX (here, 2), or the number of history-based motion vector predictor candidates NumHmvpCand is 0 (step S2201: NO in FIG. 29), the process of steps S2202 to S2209 of FIG. 29 will be omitted, and the history-based motion vector predictor candidate derivation processing procedure will be finished. In a case where the number numCurrMvpCand of the current motion vector predictor candidates is smaller than 2, which is the maximum number of elements of the motion vector predictor candidate list mvpListLX, and in a case where the value of the number NumHmvpCand of the history-based motion vector predictor candidates is greater than 0 (step S2201 in FIG. 29) YES), the process of steps S2202 to S2209 in FIG. 29 will be performed.

Subsequently, the process of steps S2203 to S2208 in FIG. 29 is repeated until the index i is from 1 to a smaller value out of 4 or the number of history-based motion vector predictor candidates numCheckedHMVPCand (steps S2202 to S2209 in FIG. 29). In a case where the current number of motion vector predictor candidates numCurrMvpCand is larger than or equal to 2, which is the maximum number of elements of the motion vector predictor candidate list mvpListLX (step S2203 in FIG. 29: NO), the process from steps S2204 to S2209 in FIG. 29 will be omitted and the history-based motion vector predictor candidate derivation processing procedure will be finished. In a case where the current number of motion vector predictor candidates numCurrMvpCand is smaller than 2 which is the maximum number of elements in the motion vector predictor candidate list mvpListLX (step S2203 in FIG. 29: YES), the process in step S2204 and later in FIG. 29 will be performed.

Subsequently, the process in steps S2205 to S2207 is performed for cases where Y is 0 and Y is 1 (L0 and L1) (steps S2204 to S2208 in FIG. 29). In a case where the current number of motion vector predictor candidates numCurrMvpCand is larger than or equal to 2, which is the maximum number of elements of the motion vector predictor candidate list mvpListLX (step S2205 in FIG. 29: NO), the process from steps S2206 to S2209 in FIG. 29 will be omitted and the history-based motion vector predictor candidate derivation processing procedure will be finished. In a case where the current number of motion vector predictor candidates numCurrMvpCand is smaller than 2 which is the maximum number of elements in the motion vector predictor candidate list mvpListLX (step S2205 in FIG. 29: YES), the process in step S2206 and later in FIG. 29 will be performed.

Next, in a case where the history-based motion vector predictor candidate list HmvpCandList includes an element having the same reference index as the reference index refIdxLX of the coding/decoding target motion vector and being different from any element of the motion vector predictor list mvpListLX (step S2206: YES in FIG. 29), a motion vector of LY of the history-based motion vector predictor candidate HmvpCandList [NumHmvpCand−i] is added to the numCurrMvpCand-th element mvpListLX [numCurrMvpCand] counting from 0 in the motion vector predictor candidate list (step S2207 in FIG. 29), and the number numCurrMvpCand of the current motion vector predictor candidates is incremented by one. In a case where there is no element in the history-based motion vector predictor candidate list HmvpCandList that has the same reference index as the reference index refIdxLX of the coding/decoding target motion vector and is different from any element of the motion vector predictor list mvpListLX (step S2206: NO in FIG. 29), the additional process in step S2207 will be skipped.

The process of steps S2205 to S2207 in FIG. 29 is performed for both L0 and L1 (steps S2204 to S2208 in FIG. 29). The index i is incremented by one, and when the index i is smaller than or equal to any of smaller value of 4 or the number of history-based motion vector predictor candidates NumHmvpCand, the process of step S2203 and later will be performed again (steps S2202 to S2209 in FIG. 29).

History-Based Merging Candidate Derivation Process

Figure 30:
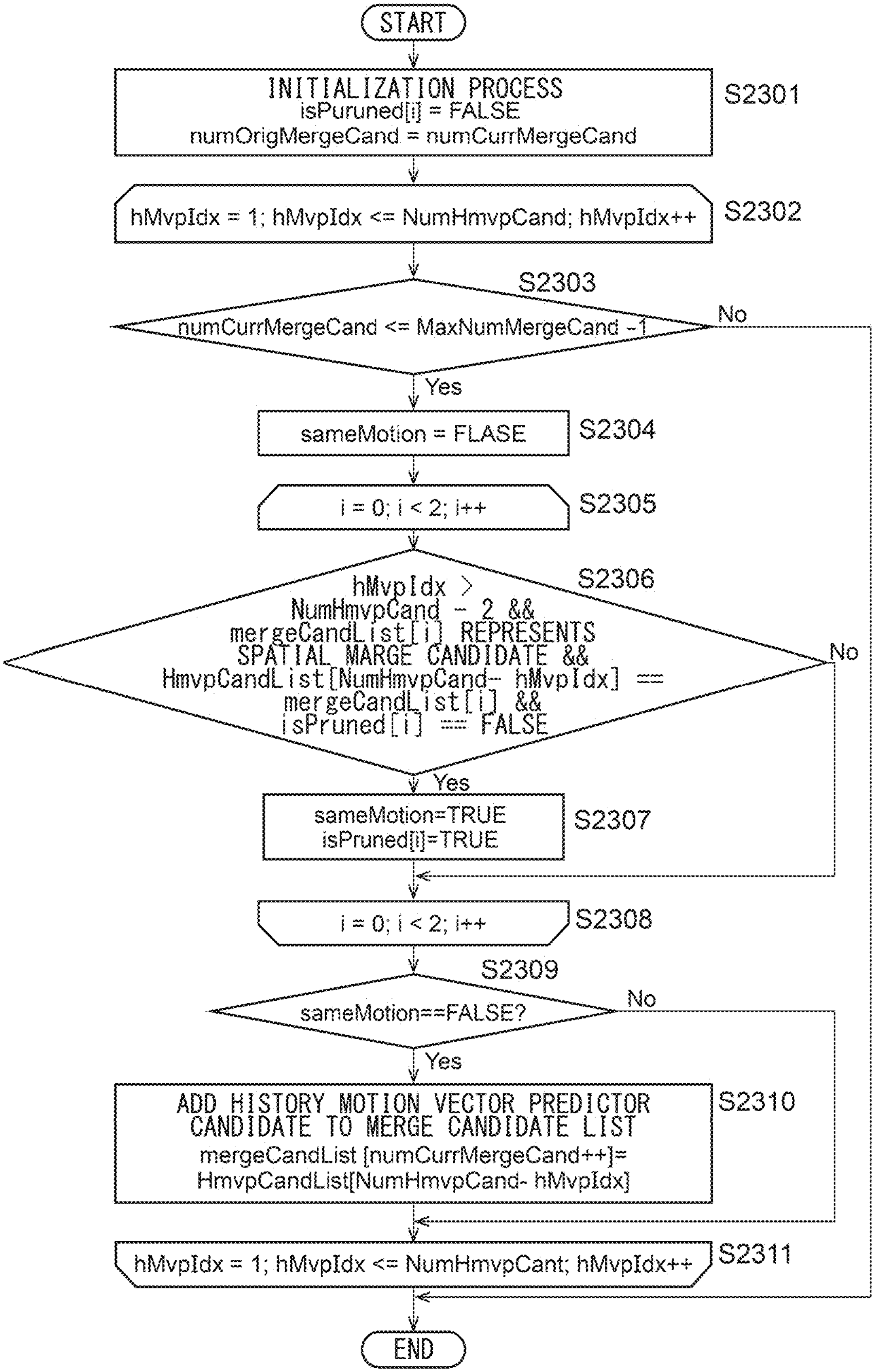
FIG. 30 is a flowchart illustrating a history-based merging candidate derivation processing procedure.

The following is a detailed description of a method of deriving a history-based merging candidate from the history-based merging candidate list HmvpCandList, a processing procedure of step S404 in FIG. 21, which is a common process of the history-based merging candidate derivation unit 345 of the normal merge mode derivation unit 302 on the coding side and the history-based merging candidate derivation unit 445 of the normal merge mode derivation unit 402 on the decoding side. FIG. 30 is a flowchart illustrating a history-based merging candidate derivation processing procedure.

First, an initialization process is performed (step S2301 in FIG. 30). Each of elements from 0 to (numCurrMergeCand−1) of isPruned[i] is set to the value of FALSE, and the variable numOrigMergeCand is set to the number numCurrMergeCand of the number of elements added in the current merging candidate list.

Subsequently, the initial value of the index hMvpIdx is set to 1, and the additional process from step S2303 to step S2310 in FIG. 30 is repeated from this initial value to NumHmvpCand (steps S2302 to S2311 in FIG. 30). When the number numCurrMergeCand of the elements added in the current merging candidate list is not smaller than or equal to (the maximum number of merging candidates MaxNumMergeCand−1), the merging candidates have been added to all the elements in the merging candidate list. Accordingly, the history-based merging candidate derivation process will be finished (NO in step S2303 in FIG. 30). In a case where the number numCurrMergeCand of the elements added in the current merging candidate list is smaller than or equal to (the maximum number of merging candidates MaxNumMergeCand−1), the process of step S2304 and later will be performed. sameMotion is set to a value of FALSE (step S2304 in FIG. 30). Subsequently, the initial value of the index i is set to 0, and the process of steps S2306 and S2307 in FIG. 30 is performed from this initial value to numOrigMergeCand−1 (S2305 to S2308 in FIG. 30). Comparison is performed as to whether the (NumHmvpCand−hMvpIdx)-th element HmvpCandList [NumHmvpCand-hMvpIdx] counting from 0 in the history-based motion vector prediction candidate list is the same value as the i-th element mergeCandList[i] counting from 0 in the merging candidate list (step S2306 in FIG. 30).

The merging candidates is determined to have the same value in a case where all the constituent elements (inter prediction mode, reference index, motion vector) of the merging candidate have the same value. In a case where the merging candidates have the same value and isPruned[i] is set to FALSE (YES in step S2306 in FIG. 30), both sameMotion and isPruned[i] will be set to TRUE (step S2307 in FIG. 30). In a case where the values are not the same (NO in step S2306 in FIG. 30), the process in step S2307 will be skipped. After completion of the repetition processing from step S2305 to step S2308 in FIG. 30, comparison is made as to whether the sameMotion is FALSE (step S2309 in FIG. 30). In a case where the sameMotion is FALSE (YES in step S2309 in FIG. 30), that is, the (NumHmvpCand−hMvpIdx)-th element HmvpCandList [NumHmvpCand−hMvpIdx] counting from 0 in the history-based motion vector predictor candidate list does not exist in mergeCandList, and thus, the element HmvpCandList [NumHmvpCand−hMvpIdx] that is (NumHmvpCand−hMvpIdx)th element counted from 0 of the history-based motion vector predictor candidate list is added to mergeCandList[numCurrMergeCand] that is numCurrMergeCand-th in the merging candidate list, and numCurrMergeCand is incremented by one (step S2310 in FIG. 30). The index hMvpIdx is incremented by one (step S2302 in FIG. 30), and the process of steps S2302 to S2311 in FIG. 30 is repeated.

After completion of confirmation of all the elements in the history-based motion vector predictor candidate list or completion of addition of merging candidates to all elements in the merging candidate list, the history-based merging candidate derivation process is completed.

Average Merging Candidate Derivation Process

Figure 39:
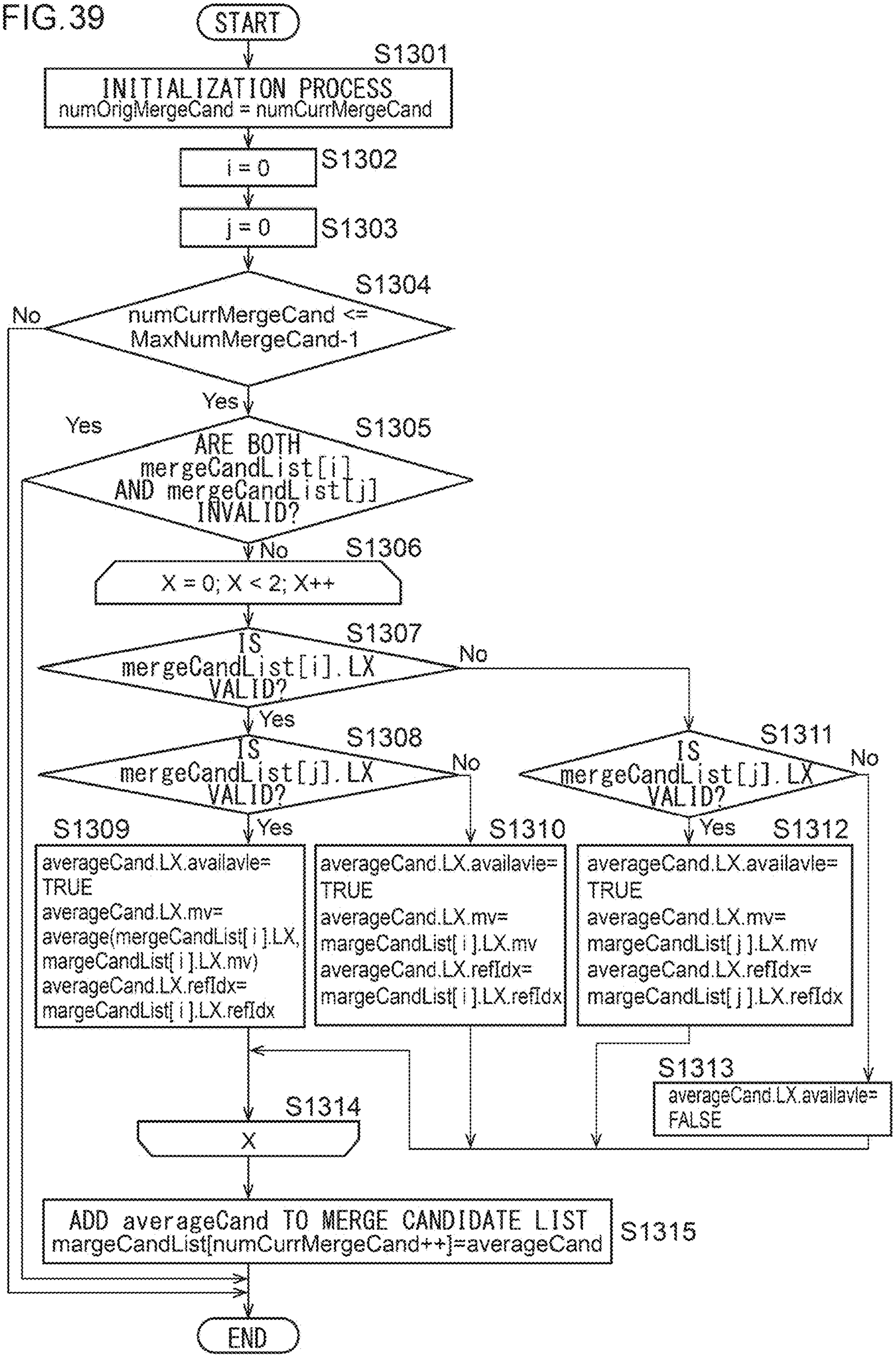
FIG. 39 is a flowchart illustrating an average merging candidate derivation processing procedure.

The following is a detailed description of a method of deriving an average merging candidate, a procedure of the process of step S403 in FIG. 21, which is a common process of the average merging candidate derivation unit 344 of the normal merge mode derivation unit 302 on the coding side and the average merging candidate derivation unit 444 of the normal merge mode derivation unit 402 on the decoding side. FIG. 39 is a flowchart illustrating an average merging candidate derivation processing procedure.

First, an initialization process is performed (step S1301 in FIG. 39). The variable numOrigMergeCand is set to the number of elements numCurrMergeCand added in the current merging candidate list.

Subsequently, scanning is performed sequentially from the top of the merging candidate list to determine two pieces of motion information. Index i indicating the first motion information is set such that index i=0, and index j indicating the second motion information is set such that index j=1. (Steps S1302 to S1303 in FIG. 39). When the number numCurrMergeCand of the elements added in the current merging candidate list is not smaller than or equal to (the maximum number of merging candidates MaxNumMergeCand−1), the merging candidates have been added to all the elements in the merging candidate list. Accordingly, the history-based merging candidate derivation process will be finished (step S1304 in FIG. 39). In a case where the number numCurrMergeCand of the elements added in the current merging candidate list is smaller than or equal to (the maximum number of merging candidates MaxNumMergeCand−1), the process of step S1305 and later will be performed.

Determination is made as to whether both the i-th motion information mergeCandList[i] of the merging candidate list and the j-th motion information mergeCandList[j] of the merging candidate list are invalid (step S1305 in FIG. 39). In a case where both are invalid, the process proceeds to the next element without deriving an average merging candidate of mergeCandList[i] and mergeCandList[j]. In a case where the condition that both mergeCandList[i] and mergeCandList[j] are invalid is not satisfied, the following process is repeated with X set to 0 and 1 (steps S1306 to S1314 in FIG. 39).

Determination is made as to whether the LX prediction of mergeCandList[i] is valid (step S1307 in FIG. 39). In a case where the LX prediction of mergeCandList[i] is valid, determination is made as to whether the LX prediction of mergeCandList[j] is valid (step S1308 in FIG. 39). In a case where the LX prediction of mergeCandList[j] is valid, that is, in a case where both the LX prediction of mergeCandList[i] and the LX prediction of mergeCandList[j] are valid, a motion vector of LX prediction obtained by averaging the motion vector of LX prediction of mergeCandList[i] and the motion vector of LX prediction of mergeCandList[j] will be derived, and an average merging candidate of LX prediction having a reference index of LX prediction of mergeCandList[i] will be derived, so as to be set as LX prediction of averageCand, and the LX prediction of averageCand will be validated (step S1309 in FIG. 39). In step S1308 of FIG. 39, in a case where LX prediction of mergeCandList[j] is not valid, that is, in a case where LX prediction of mergeCandList[i] is valid and LX prediction of mergeCandList[j] is invalid, a motion vector of LX prediction of mergeCandList[i] and an average merging candidate of LX prediction having a reference index will be derived, so as to be set as LX prediction of averageCand, and the LX prediction of averageCand will be validated (step S1310 in FIG. 39). In a case where the LX prediction of mergeCandList[i] is not valid in step S1307 of FIG. 39, determination is made as to whether the LX prediction of mergeCandList[j] is valid (step S1311 of FIG. 39). In a case where LX prediction of mergeCandList[j] is valid, that is, in a case where LX prediction of mergeCandList[i] is invalid and LX prediction of mergeCandList[j] is valid, a motion vector of LX prediction of mergeCandList[j] and an average merging candidate of LX prediction having a reference index will be derived, so as to be set as LX prediction of averageCand, and the LX prediction of averageCand will be validated (step S1312 in FIG. 39). In step S1311 of FIG. 39, in a case where LX prediction of mergeCandList[j] is not valid, that is, in a case where LX prediction of mergeCandList[i] and LX prediction of mergeCandList[j] are both invalid, LX prediction of averageCand will be invalidated. (step S1312 in FIG. 39).

The average merging candidate averageCand of L0-prediction, L1-prediction or BI prediction constructed as described above is added to the numCurrMergeCand-th mergeCandList[numCurrMergeCand] of the merging candidate list, and numCurrMergeCand is incremented by one (step S1315 in FIG. 39). This completes the average merging candidate derivation process.

The average merging candidate is obtained by averaging in each of the horizontal component of the motion vector and the vertical component of the motion vector.

Motion Compensation Prediction Process

The motion compensation prediction unit 306 acquires the position and size of a block that is currently subjected to prediction processing in coding. Furthermore, the motion compensation prediction unit 306 acquires inter prediction information from the inter prediction mode determiner 305. A reference index and a motion vector are derived from the acquired inter prediction information, and the reference picture specified by the reference index in the decoded picture memory 104 is shifted from the same position as a picture signal of the block that is subjected to prediction processing by the amount of the motion vector. The picture signal of that position after the shift is acquired and thereafter a prediction signal is generated.

In a case where prediction is made from a signal reference picture, such as when the inter prediction mode in the inter prediction is L0-prediction or L1-prediction, a prediction signal acquired from one reference picture is set as a motion compensation prediction signal. In a case where prediction is made from two reference pictures, such as when the inter prediction mode is BI prediction, a weighted average of prediction signals acquired from the two reference pictures is set as the motion compensation prediction signal. The acquired motion compensation prediction signal is supplied to the prediction method determiner 105. Here, the weighted average ratio in the bi-prediction is set to 1:1. Alternatively, the weighted average may use another ratio. For example, the weighting ratio may be set such that the shorter the picture interval between the prediction target picture and the reference picture, the higher the weighting ratio. The calculation of the weighting ratio may also be performed using a correspondence table between the combination of the picture intervals and the weighting ratios.

The motion compensation prediction unit 406 has function similar to the motion compensation prediction unit 306 on the coding side. The motion compensation prediction unit 406 acquires inter prediction information from the normal motion vector predictor mode derivation unit 401, the normal merge mode derivation unit 402, the subblock motion vector predictor mode derivation unit 403, and the subblock merge mode derivation unit 404, via the switch 408. The motion compensation prediction unit 406 supplies the obtained motion compensation prediction signal to the decoded picture signal superimposer 207.

Inter Prediction Mode

The process of performing prediction from a single reference picture is defined as uni-prediction. Uni-prediction performs prediction of L0-prediction or L1-prediction using one of the two reference pictures added in the reference lists L0 or L1.

Figure 32:
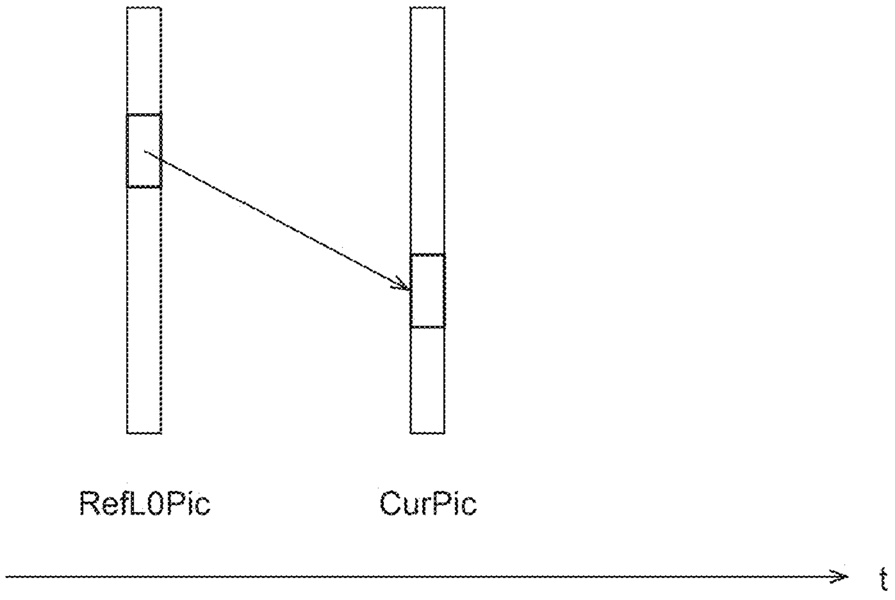
FIG. 32 is a diagram illustrating motion compensation prediction in a case where L0-prediction is performed and a reference picture (RefL0Pic) of L0 is at a time before a target picture (CurPic).
Figure 33:
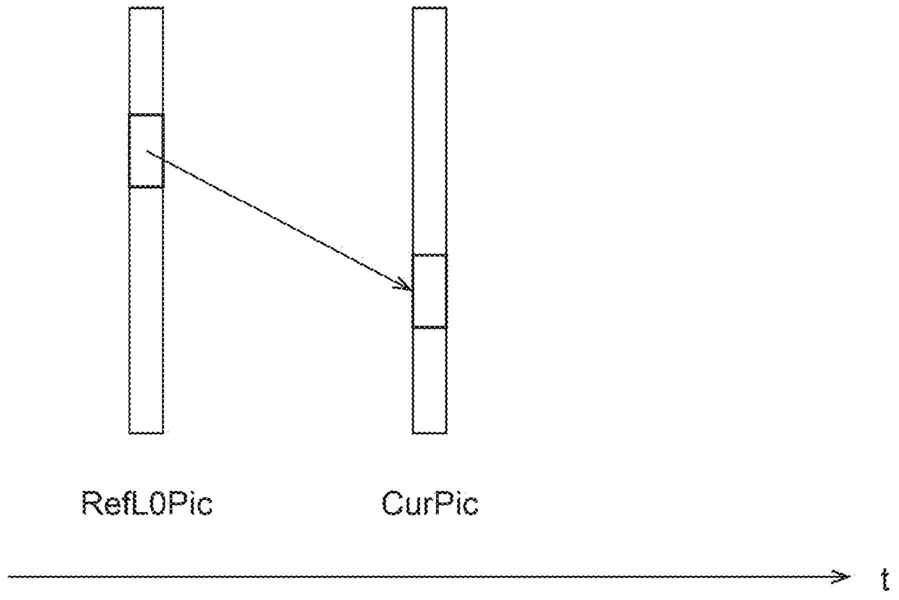
FIG. 33 is a diagram illustrating motion compensation prediction in a case where L0-prediction is performed and a reference picture of L0-prediction is at a time after the target picture.

FIG. 32 illustrates a case of uni-prediction in which the reference picture (RefL0Pic) of L0 is at a time before the target picture (CurPic). FIG. 33 illustrates a case of uni-prediction in which the reference picture of L0-prediction is at a time after the target picture. Similarly, uni-prediction can be performed by replacing the L0-prediction reference picture in FIGS. 32 and 33 with an L1-prediction reference picture (RefL1Pic).

Figure 34:
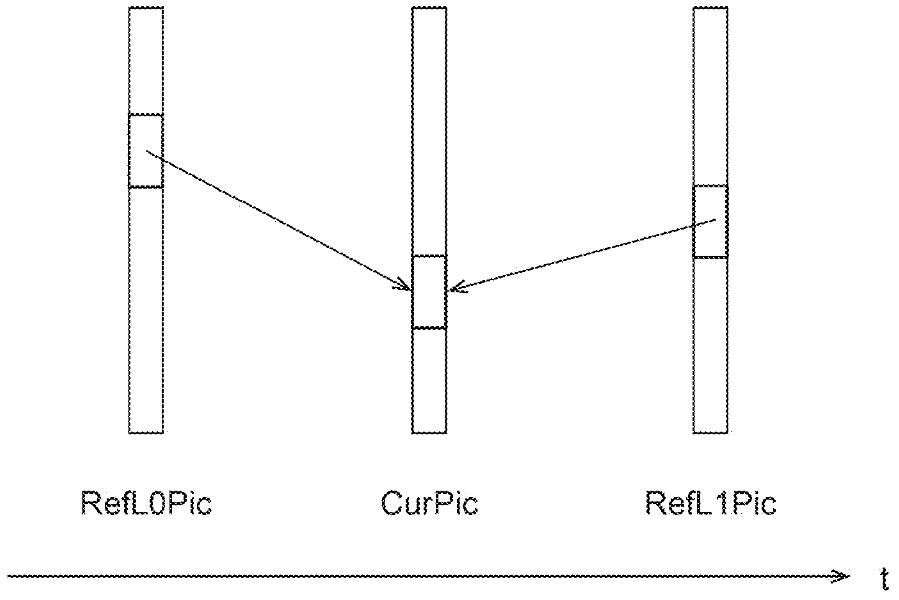
FIG. 34 is a diagram illustrating a prediction direction of motion compensation prediction in bi-prediction in which an L0-prediction reference picture is at a time before the target picture and an L1-prediction reference picture is at a time after the target picture.
Figure 35:
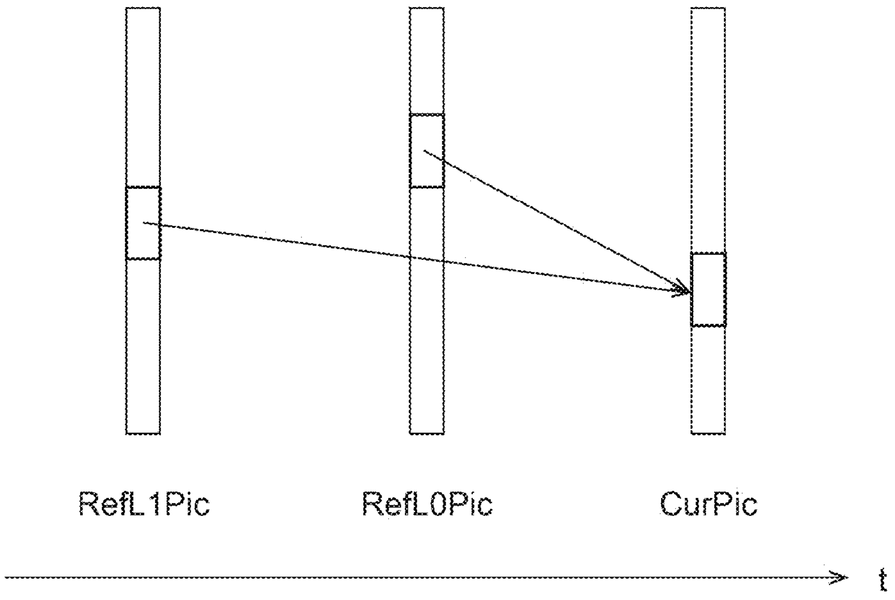
FIG. 35 is a diagram illustrating a prediction direction of motion compensation prediction in bi-prediction in which an L0-prediction reference picture and an L1-prediction reference picture are at a time before the target picture.
Figure 36:
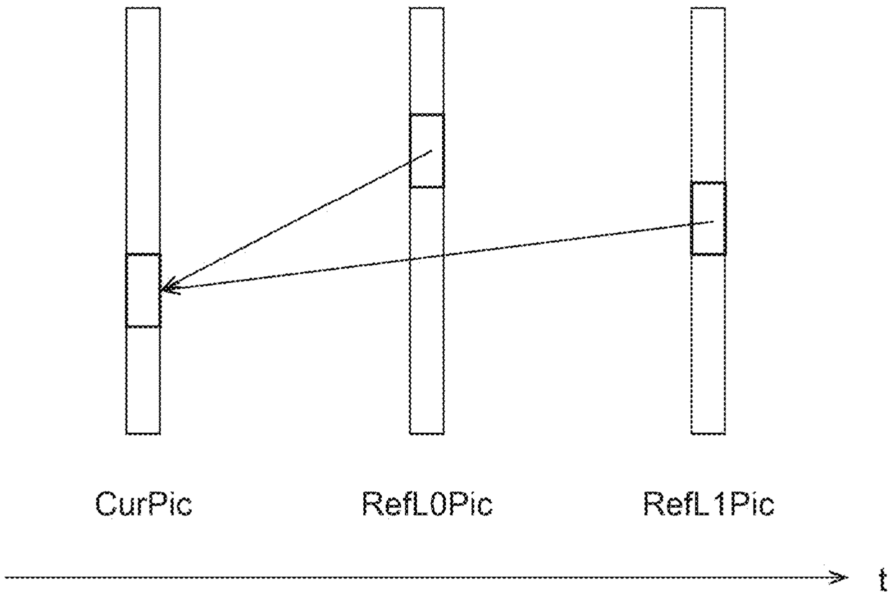
FIG. 36 is a diagram illustrating a prediction direction of motion compensation prediction in bi-prediction in which an L0-prediction reference picture and an L1-prediction reference picture are at a time after the target picture.

The process of performing prediction from two reference pictures is defined as bi-prediction. Bi-prediction performs prediction, expressed as BI prediction, using both L0-prediction and L1-prediction. FIG. 34 illustrates a case of bi-prediction in which an L0-prediction reference picture is at a time before the target picture and an L1-prediction reference picture is at a time after the target picture. FIG. 35 illustrates a case of bi-prediction in which the reference picture for L0-prediction and the reference picture for L1-prediction are at a time before the target picture. FIG. 36 illustrates a case of bi-prediction in which the reference picture for L0-prediction and the reference picture for L1-prediction are at a time after the target picture.

In this manner, it is possible to use prediction without limiting the relationship between the prediction type of L0/L1 and time such that L0 to the past direction and L1 to the future direction. Moreover, bi-prediction may perform each of L0-prediction and L1-prediction using a same reference picture. The determination whether to perform motion compensation prediction in the uni-prediction or the bi-prediction is made on the basis of information (for example, a flag) indicating whether to use the L0-prediction and whether to use the L1-prediction, for example.

Reference Index

In the embodiment of the present invention, it is possible to select an optimal reference picture from a plurality of reference pictures in motion compensation prediction in order to improve motion compensation prediction accuracy. Therefore, the reference picture used in the motion compensation prediction is to be used as a reference index, and the reference index is coded in a bitstream together with the motion vector difference.

Motion Compensation Process Based On Normal Motion Vector Predictor Mode

As illustrated in the inter prediction unit 102 on the coding side in FIG. 16, in a case where inter prediction information by the normal motion vector predictor mode derivation unit 301 has been selected on the inter prediction mode determiner 305, the motion compensation prediction unit 306 acquires this inter prediction information from the inter prediction mode determiner 305, and derives an inter prediction mode, a reference index, and a motion vector of a target block and thereby generates a motion compensation prediction signal. The constructed motion compensation prediction signal is supplied to the prediction method determiner 105.

Similarly, as illustrated in the inter prediction unit 203 on the decoding side in FIG. 22, in a case where the switch 408 is connected to the normal motion vector predictor mode derivation unit 401 during the decoding process, the motion compensation prediction unit 406 acquires inter prediction information by the normal motion vector predictor mode derivation unit 401, and derives an inter prediction mode, a reference index, and a motion vector of a target block and thereby generates a motion compensation prediction signal. The constructed motion compensation prediction signal is supplied to the decoded picture signal superimposer 207.

Motion Compensation Process Based On Normal Merge Mode

As illustrated in the inter prediction unit 102 on the coding side in FIG. 16, in a case where inter prediction information by the normal merge mode derivation unit 302 has been selected on the inter prediction mode determiner 305, the motion compensation prediction unit 306 acquires this inter prediction information from the inter prediction mode determiner 305, and derives an inter prediction mode, a reference index, and a motion vector of a target block, thereby generating a motion compensation prediction signal. The constructed motion compensation prediction signal is supplied to the prediction method determiner 105.

Similarly, as illustrated in the inter prediction unit 203 on the decoding side in FIG. 22, in a case where the switch 408 is connected to the normal merge mode derivation unit 402 during the decoding process, the motion compensation prediction unit 406 acquires inter prediction information by the normal merge mode derivation unit 402, and derives an inter prediction mode, a reference index, and a motion vector of a target block, thereby generating a motion compensation prediction signal. The constructed motion compensation prediction signal is supplied to the decoded picture signal superimposer 207.

Motion Compensation Process Based On Subblock Motion Vector Predictor Mode

As illustrated in the inter prediction unit 102 on the coding side in FIG. 16, in a case where inter prediction information by the subblock motion vector predictor mode derivation unit 303 has been selected on the inter prediction mode determiner 305, the motion compensation prediction unit 306 acquires this inter prediction information from the inter prediction mode determiner 305, and derives an inter prediction mode, a reference index, and a motion vector of a target block, thereby generating a motion compensation prediction signal. The constructed motion compensation prediction signal is supplied to the prediction method determiner 105.

Similarly, as illustrated in the inter prediction unit 203 on the decoding side in FIG. 22, in a case where the switch 408 is connected to the subblock motion vector predictor mode derivation unit 403 during the decoding process, the motion compensation prediction unit 406 acquires inter prediction information by the subblock motion vector predictor mode derivation unit 403, and derives an inter prediction mode, a reference index, and a motion vector of a target block, thereby generating a motion compensation prediction signal. The constructed motion compensation prediction signal is supplied to the decoded picture signal superimposer 207.

Motion Compensation Process Based On Subblock Merge Mode

As illustrated in the inter prediction unit 102 on the coding side in FIG. 16, in a case where inter prediction information by the subblock merge mode derivation unit 304 has been selected on the inter prediction mode determiner 305, the motion compensation prediction unit 306 acquires this inter prediction information from the inter prediction mode determiner 305, and derives an inter prediction mode, a reference index, and a motion vector of a target block, thereby generating a motion compensation prediction signal. The constructed motion compensation prediction signal is supplied to the prediction method determiner 105.

Similarly, as illustrated in the inter prediction unit 203 on the decoding side in FIG. 22, in a case where the switch 408 is connected to the subblock merge mode derivation unit 404 during the decoding process, the motion compensation prediction unit 406 acquires inter prediction information by the subblock merge mode derivation unit 404, and derives an inter prediction mode, a reference index, and a motion vector of a target block, thereby generating a motion compensation prediction signal. The constructed motion compensation prediction signal is supplied to the decoded picture signal superimposer 207.

Motion Compensation Process Based On Affine Transform Prediction

In the normal motion vector predictor mode and the normal merge mode, motion compensation using an affine model is usable based on the following flags. The following flags are reflected in the following flags on the basis of inter prediction conditions determined by the inter prediction mode determiner 305 in the coding process, and are coded in the bitstream. In the decoding process, whether to perform motion compensation using the affine model on the basis of the following flags in the bitstream is specified.

sps_affine_enabled_flag indicates whether motion compensation using an affine model is usable in inter prediction. When sps_affine_enabled_flag is 0, the process is suppressed so as not to perform motion compensation by the affine model in units of sequence. Moreover, inter_affine_flag and cu_affine_type_flag are not transmitted in the coding block (CU) syntax of a coding video sequence. When sps_affine_enabled_flag is 1, motion compensation by an affine model is usable in the coding video sequence.

sps_affine_type_flag indicates whether motion compensation using a 6-parameter affine model is usable in inter prediction. When sps_affine_type_flag is 0, the process is suppressed so as not to perform motion compensation using a 6-parameter affine model. Moreover, cu_affine_type_flag is not transmitted in the CU syntax of the coding video sequence. When sps_affine_type_flag is 1, motion compensation based on a 6-parameter affine model is usable in a coding video sequence. In a case where sps_affine_type_flag does not exist, it shall be 0.

In a case of decoding a P or B slice, when inter_affine_flag is 1 in the current CU, a motion compensation using an affine model is used in order to generate a motion compensation prediction signal of the current CU. When inter_affine_flag is 0, the affine model is not used for the current CU. In a case where inter_affine_flag does not exist, it shall be 0.

In a case of decoding a P or B slice, when cu_affine_type_flag is 1 in the current CU, a motion compensation using a 6-parameter affine model is used in order to generate a motion compensation prediction signal of the current CU. When cu_affine_type_flag is 0, motion compensation using a four-parameter affine model is used to generate a motion compensation prediction signal of the CU currently being processed.

A reference index and a motion vector are derived in units of subblocks in the motion compensation based on the affine model. Accordingly, a motion compensation prediction signal is generated using the reference index and the motion vector to be processed in subblock units.

The four-parameter affine model is a mode in which a motion vector of a subblock is derived from four parameters of a horizontal component and a vertical component of each of motion vectors of two control points, and motion compensation is performed in units of subblocks.

Triangle Merge Mode

The triangle merge mode is a type of merge mode, in which the coding/decoding block is split into diagonal partitions to perform motion compensation prediction. The triangle merge mode is a type of geometric division merge mode in which the coding/decoding block is split into blocks having a non-rectangular shape. In the geometric division merge mode, this corresponds to a mode in which the coding/decoding block is split into two right triangles by a diagonal.

The geometric division merge mode is expressed by a combination of two parameters, for example, an index (angleIdx) indicating a division angle and an index (distanceIdx) indicating a distance from the center of the coding block. As an example, 64 patterns are defined as the geometric division merge mode, and fixed-length encoding is performed. Of the 64 patterns, two modes, in which the index indicating a division angle indicates an angle forming a diagonal of the coding block (for example, 45 degrees (angleIdx=4 in a configuration in which 360 degrees are represented by 32 divisions) or 135 degrees (angleIdx=12 in a configuration in which 360 degrees are represented by 32 divisions)) and the index indicating a distance from the center of the coding block is minimum (distanceIdx=0, indicating that the division boundary passes through the center of the coding block), indicate that the coding block is split by a diagonal, and correspond to the triangle merge mode.

The triangle merge mode will be described with reference to FIGS. 38A and 38B. FIGS. 38A and 38B illustrate an example of prediction of a 16×16 coding/decoding blocks of the triangle merge mode. The coding/decoding block of the triangle merge mode is split into 4×4 subblocks, and each of subblock is assigned to three partitions, namely, uni-prediction partition 0 (UNI0), uni-prediction partition 1 (UNI1), and bi-prediction partition 2 (BI). Here, subblocks above a diagonal are assigned to partition 0, subblocks below the diagonal are assigned to partition 1, and subblocks on the diagonal are assigned to partition 2. When merge_triangle_split_dir is 0, partitions are assigned as illustrated in FIG. 38A, and when merge_triangle_split_dir is 1, partitions are assigned as illustrated in FIG. 38B.

Uni-prediction motion information designated by merge triangle index 0 is used for motion compensation prediction of partition 0. Uni-prediction motion information designated by merge triangle index 1 is used for motion compensation prediction of partition 1. Bi-prediction motion information combining uni-prediction motion information designated by merge triangle index 0 and uni-prediction motion information designated by merge triangle index 1 is used for motion compensation prediction of partition 2.

Here, the uni-prediction motion information is a set of a motion vector and a reference index, while the bi-prediction motion information is formed with two sets of a motion vector and a reference index. The motion information represents either uni-prediction motion information or bi-prediction motion information.

The merging candidate selectors 347 and 447 use the derived merging candidate list mergeCandList as a triangle merging candidate list triangleMergeCandList.

Figure 40:
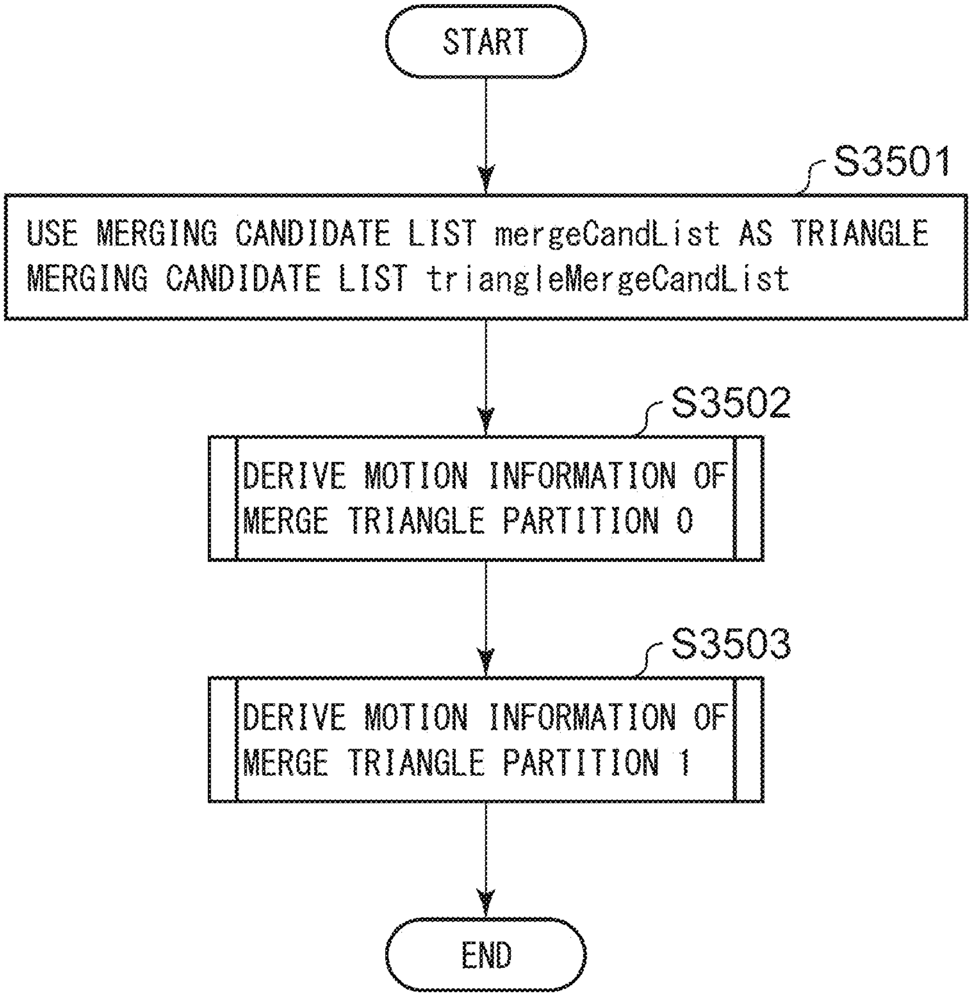
FIG. 40 is a flowchart illustrating triangle merging candidate derivation.

The flowchart of FIG. 40 related to triangle merging candidate derivation will be described.

First, a merging candidate list mergeCandList is used as a triangle merging candidate list triangleMergeCandList (step S3501).

Next, uni-prediction motion information of a merge triangle partition 0 is derived with priority on the merging candidate having a motion information list L0 (step S3502).

Subsequently, uni-prediction motion information of a merge triangle partition 1 is derived with priority on the merging candidate having a motion information list L1 (step S3503).

Note that derivation in steps S3502 and S3503 can be performed in any order, and can be processed in parallel.

Figure 41:
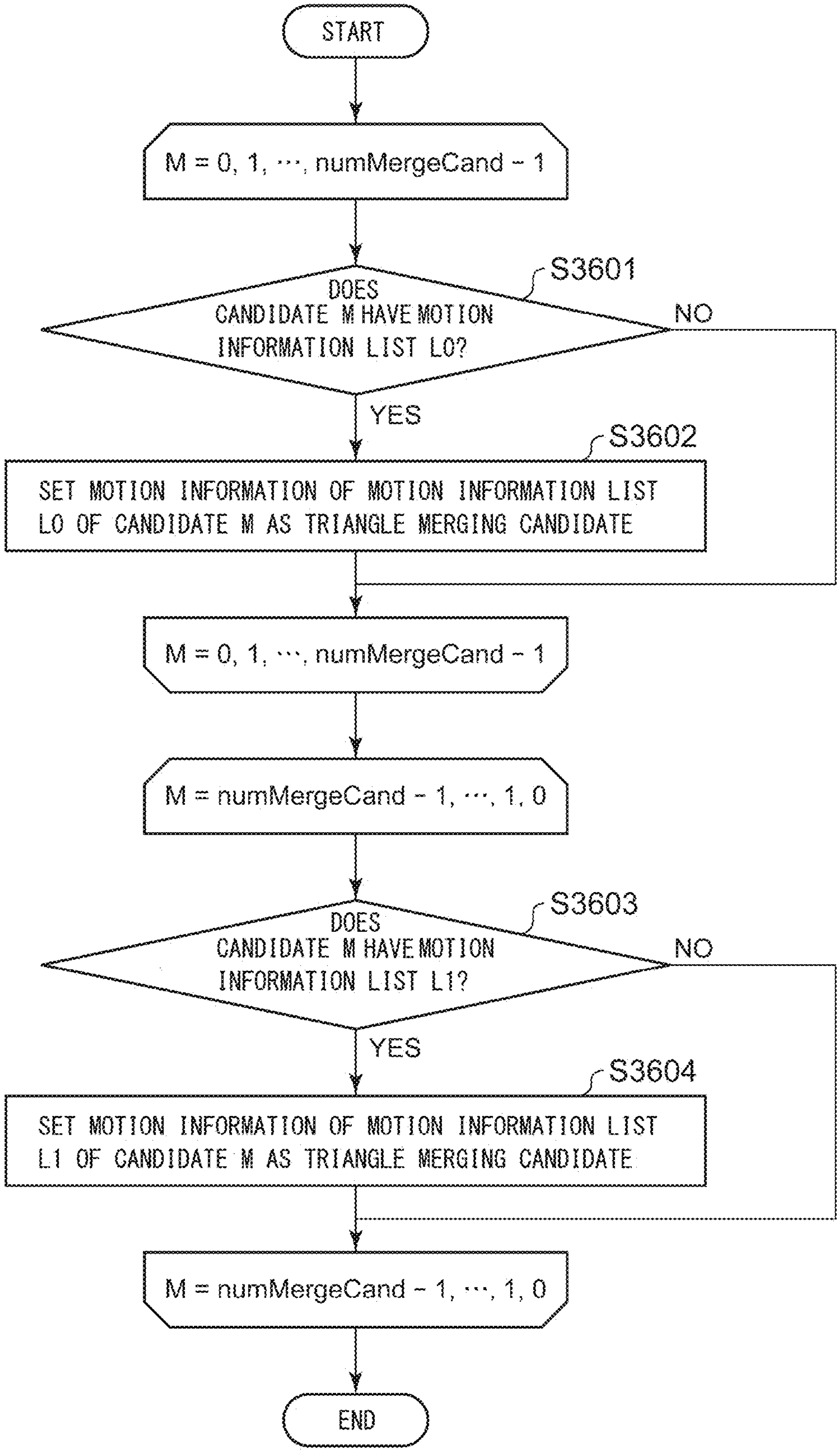
FIG. 41 is a flowchart illustrating derivation of uni-prediction motion information of a merge triangle partition 0 according to a first embodiment.

FIG. 41 is a flowchart illustrating derivation of uni-prediction motion information of the merge triangle partition 0 according to the first embodiment.

First, it is determined whether an Mth candidate, namely, a candidate M, in the derived merging candidate list mergeCandList has motion information of the motion information list L0 (step S3601). In a case where the candidate M has the motion information of the motion information list L0, the motion information of the motion information list L0 of the candidate M is set as a triangle merging candidate (step S3602). Steps S3601 to S3602 are performed in ascending order on the candidates M(M=0, 1, . . . , numMergeCand−1) so as to additionally derive the triangle merging candidates.

Subsequently, it is determined whether the Mth candidate, namely, the candidate M, in the derived merging candidate list mergeCandList has motion information of the motion information list L1 (step S3603). In a case where the candidate M has the motion information of the motion information list L1, the motion information of the motion information list L1 of the candidate M is set as a triangle merging candidate (step S3604). Steps S3603 to S3604 are performed in descending order on the candidates M(M=numMergeCand−1, . . . , 1, 0) so as to additionally derive the triangle merging candidates.

Figure 42:
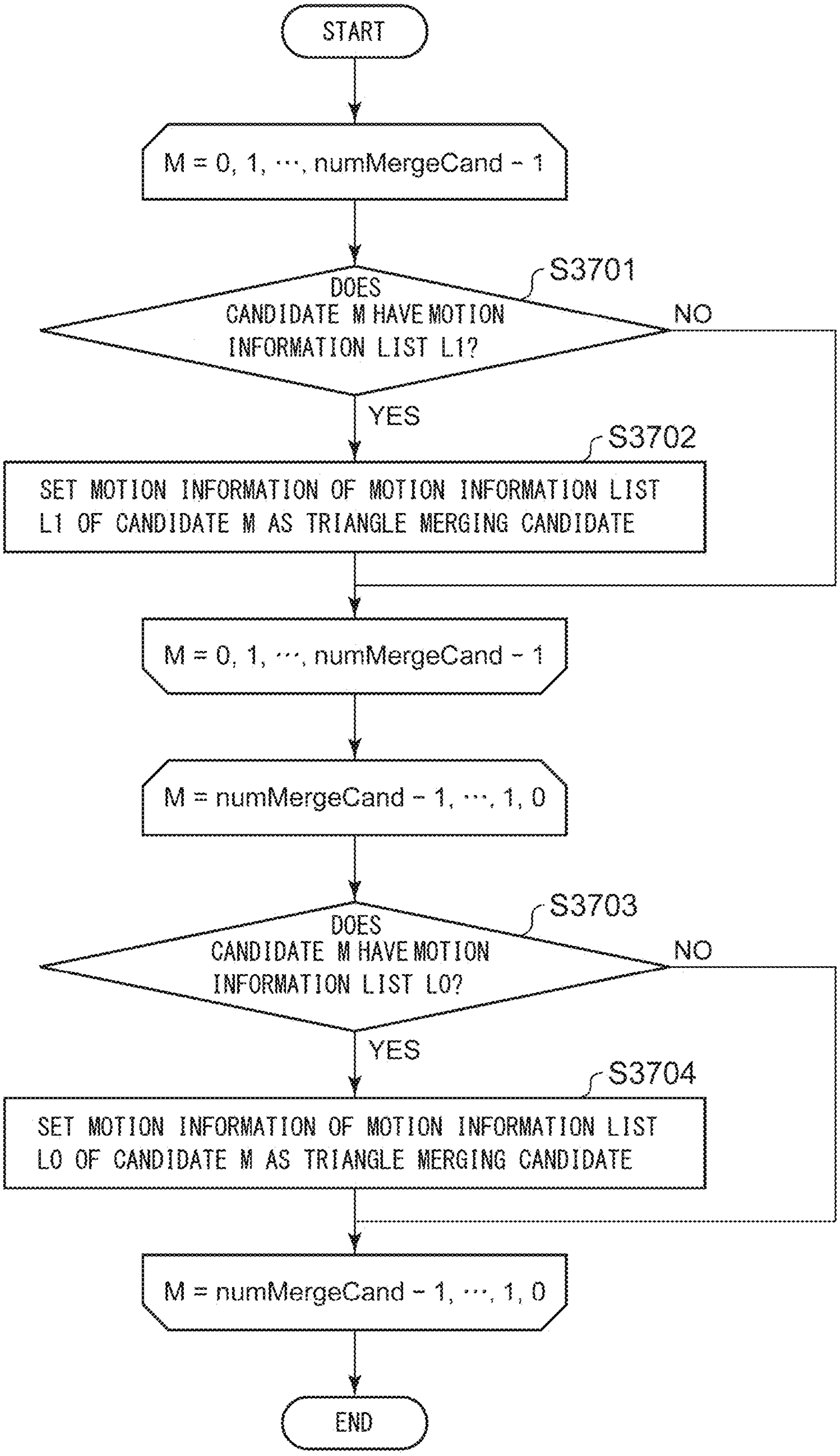
FIG. 42 is a flowchart illustrating derivation of uni-prediction motion information of a merge triangle partition 1 according to the first embodiment.

FIG. 42 is a flowchart illustrating derivation of uni-prediction motion information of the merge triangle partition 1 according to the first embodiment.

First, it is determined whether the Mth candidate, namely, the candidate M, in the derived merging candidate list mergeCandList has motion information of the motion information list L1 (step S3701). In a case where the candidate M has the motion information of the motion information list L1, the motion information of the motion information list L1 of the candidate M is set as a triangle merging candidate (step S3702). Steps S3701 to S3702 are performed in ascending order on the candidates M(M=0, 1, . . . , numMergeCand−1) so as to additionally derive the triangle merging candidates.

Subsequently, it is determined whether the Mth candidate, namely, the candidate M, in the derived merging candidate list mergeCandList has motion information of the motion information list L0 (step S3703). In a case where the candidate M has the motion information of the motion information list L0, the motion information of the motion information list L0 of the candidate M is set as a triangle merging candidate (step S3704). Steps S3703 to S3704 are performed in descending order on the candidates M(M=numMergeCand−1, . . . , 1, 0) so as to additionally derive the triangle merging candidates.

FIGS. 43A and 43B are diagrams illustrating an example of the motion information of the triangle merging candidate according to the first embodiment.

FIG. 43A illustrates an example of a merging candidate list. In the merging candidate with merge index 0, an inter prediction mode is bi-prediction (Pred-BI), the motion information of motion information list L0 is MV0_L0, and the motion information of the motion information list L1 is MV0_L1. In the merging candidate of the merge index 1, the inter prediction mode is uni-prediction (Pred-L0), the motion information of the motion information list L0 is MV1_L0, and the motion information list L1 has no motion information. In the merging candidate of the merge index 2, the inter prediction mode is uni-prediction (Pred-L1), the motion information list L0 has no motion information, and the motion information of the motion information list L1 is MV2_L1. In the merging candidate of the merge index 3, the inter prediction mode is bi-prediction (Pred-BI), the motion information of the motion information list L0 is MV3_L0, and the motion information of the motion information list L1 is MV3_L1. In the merging candidate of the merge index 4, the inter prediction mode is uni-prediction (Pred-L0), the motion information of the motion information list L0 is MV4_L0, and the motion information list L1 has no motion information.

FIG. 43B is a diagram illustrating a status of the motion information of the merge triangle partition 0 and the merge triangle partition 1 in the case of the example of the merging candidate list of FIG. 43A.

The uni-prediction motion information candidates of the merge triangle partition 0 are configured with the motion information in the order of MV0_L0, MV1_L0, MV3_L0, MV4_L0, and MV3_L1, while the uni-prediction motion information candidates of the merge triangle partition 1 are configured with the motion information in the order of MV0_L1, MV2_L1, MV3_L1, MV4_L0, and MV3_L0.

Here, the maximum values of the merge triangle index 0 (merge_triangle_idx0) and the merge triangle index 1 (merge_triangle_idx1) are the same as the merge index (merge_idx). That is, the maximum number of triangle merging candidates of each of the merge triangle partition 0 and the merge triangle partition 1 is equal to the maximum number of merging candidates MaxNumMergeCand. This allows the context of Context-based Adaptive Binary Arithmetic Coding (CABAC) to be used in common among the merge index, the merge triangle index 0, and the merge triangle index 1, making it possible to achieve simplification and memory saving regarding the parsing and the context table. Note that the maximum value (maximum number of merging candidates) of the merge index is encoded (decoded) by a Sequence Parameter Set (SPS). In addition, the maximum values (maximum number of triangle merging candidates) of the merge triangle index 0 and the merge triangle index 1 are also encoded (decoded) by the SPS.

In this manner, the present invention is characterized by changing the priority order of the motion information in the merge triangle partition 0 and the merge triangle partition 1, suppressing the possibility of duplication of the motion information of the merge triangle partition 0 and the merge triangle partition 1 while reusing the merging candidate list, and deriving a triangle merging candidate with high coding efficiency. The uni-prediction motion information of the merge triangle partition 0 may be derived with priority on the motion information list L1, and the uni-prediction motion information of the merge triangle partition 1 may be derived with priority on the motion information list L0.

First Modification

In the first modification, compared with the first embodiment, the merge triangle index is different and the maximum number of triangle merging candidates differs between the merge triangle index 0 and the merge triangle index 1. Here, it is assumed that the maximum number of triangle merging candidates of the merge triangle index 1 is smaller by one than the maximum number of triangle merging candidates of the merge triangle index 0. At this time, the merging candidate selected with the merge triangle index 0 is excluded as the uni-prediction motion information candidate of the merge triangle index 1. That is, the maximum number of triangle merging candidates of the merge triangle index 0 is the same as the maximum number of merging candidates of the merge index, while the maximum number of triangle merging candidates of the merge triangle index 1 is smaller by 1 than the maximum number of merging candidates of the merge index.

As described above, by setting the maximum number of merge triangle indexes 1 smaller by 1 than the merge triangle index 0, the coding efficiency is improved in a bitstream such as Truncated Unary in which the coding efficiency is improved according to the number of candidates. Furthermore, the coding efficiency is improved by excluding duplication with merging candidates.

Here, in typical video coding, the utilization rate of the triangle merge mode is lower than the utilization rate of the normal merge mode. Therefore, the maximum number of triangle merging candidates of the merge triangle index 0 may be set smaller than the maximum number of merging candidates of the merge index. In addition, the closer the candidate in the merging candidate list to the head, the higher the validity and selection rate of the candidate; the farther the candidate is from the head, the lower the validity and selection rate of the candidate. Therefore, in the triangle merge mode, the selection rate of candidates far from the head, that is, the candidates having the large merge triangle index 0 or the large merge triangle index 1 will be low, making it possible to improve the processing efficiency while suppressing the decrease in the coding efficiency.

Second Embodiment

In a second embodiment, in the merge triangle partition 0 and the merge triangle partition 1, there is a difference in the order of search of candidates in the reference list L1 from the case of the first embodiment. Other configurations are similar to those of the first embodiment.

Figure 44:
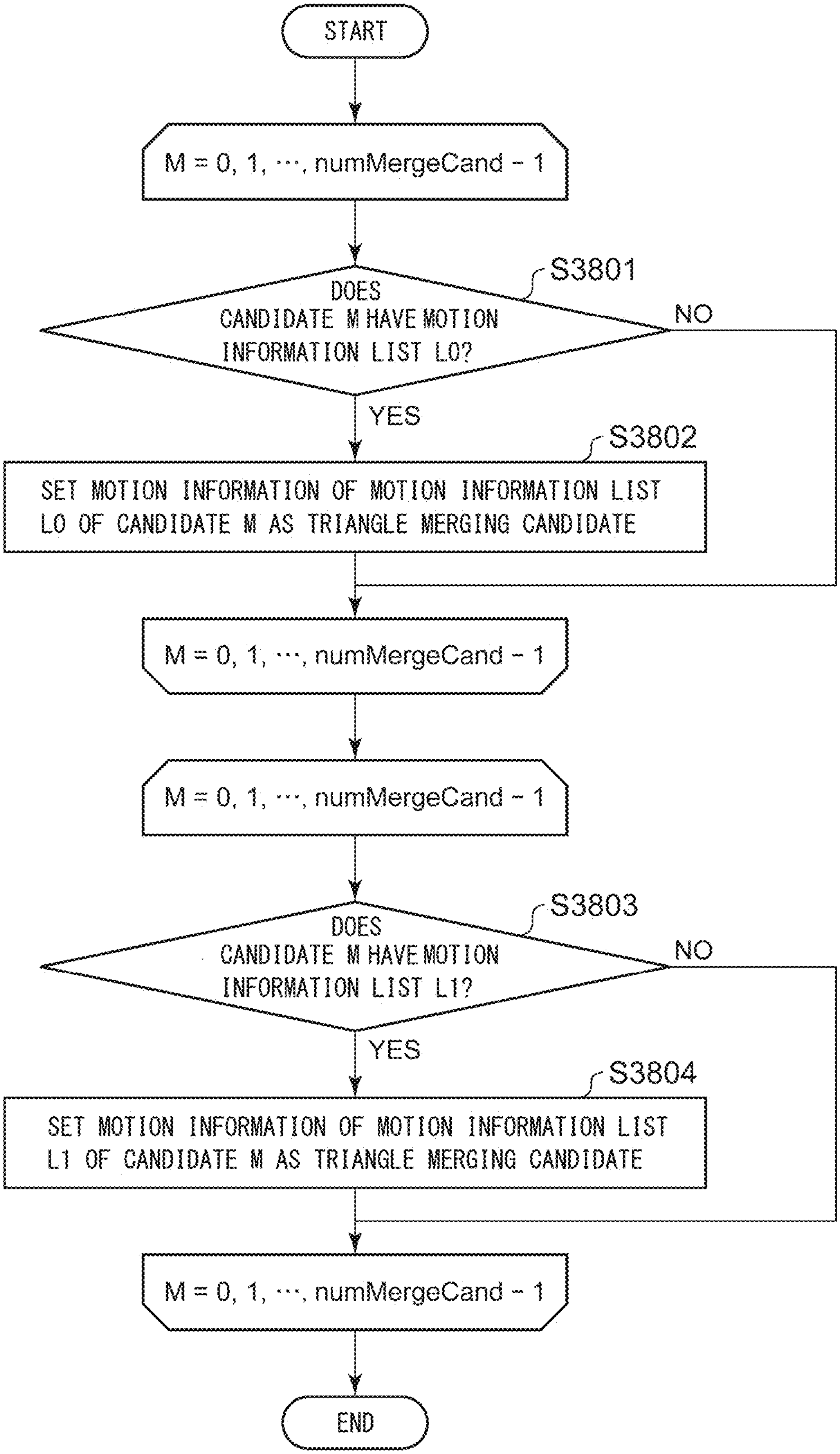
FIG. 44 is a flowchart illustrating derivation of uni-prediction motion information of a merge triangle partition 0 according to a second embodiment.

FIG. 44 is a flowchart illustrating derivation of uni-prediction motion information of a merge triangle partition 0 according to the second embodiment.

First, it is determined whether the Mth candidate, namely, the candidate M, in the derived merging candidate list mergeCandList has motion information of the motion information list L0 (step S3801). In a case where the candidate M has the motion information of the motion information list L0, the motion information of the motion information list L0 of the candidate M is set as a triangle merging candidate (step S3802). Steps S3601 to S3802 are performed in ascending order on the candidates M(M=0, 1, . . . , numMergeCand−1) so as to additionally derive the triangle merging candidates.

Subsequently, it is determined whether the Mth candidate, namely, the candidate M, in the derived merging candidate list mergeCandList has motion information of the motion information list L1 (step S3803). In a case where the candidate M has the motion information of the motion information list L1, the motion information of the motion information list L1 of the candidate M is set as a triangle merging candidate (step S3804). Steps S3803 to S3804 are performed in ascending order on the candidates M(M=0, 1, . . . , numMergeCand−1) so as to additionally derive the triangle merging candidates.

Figure 45:
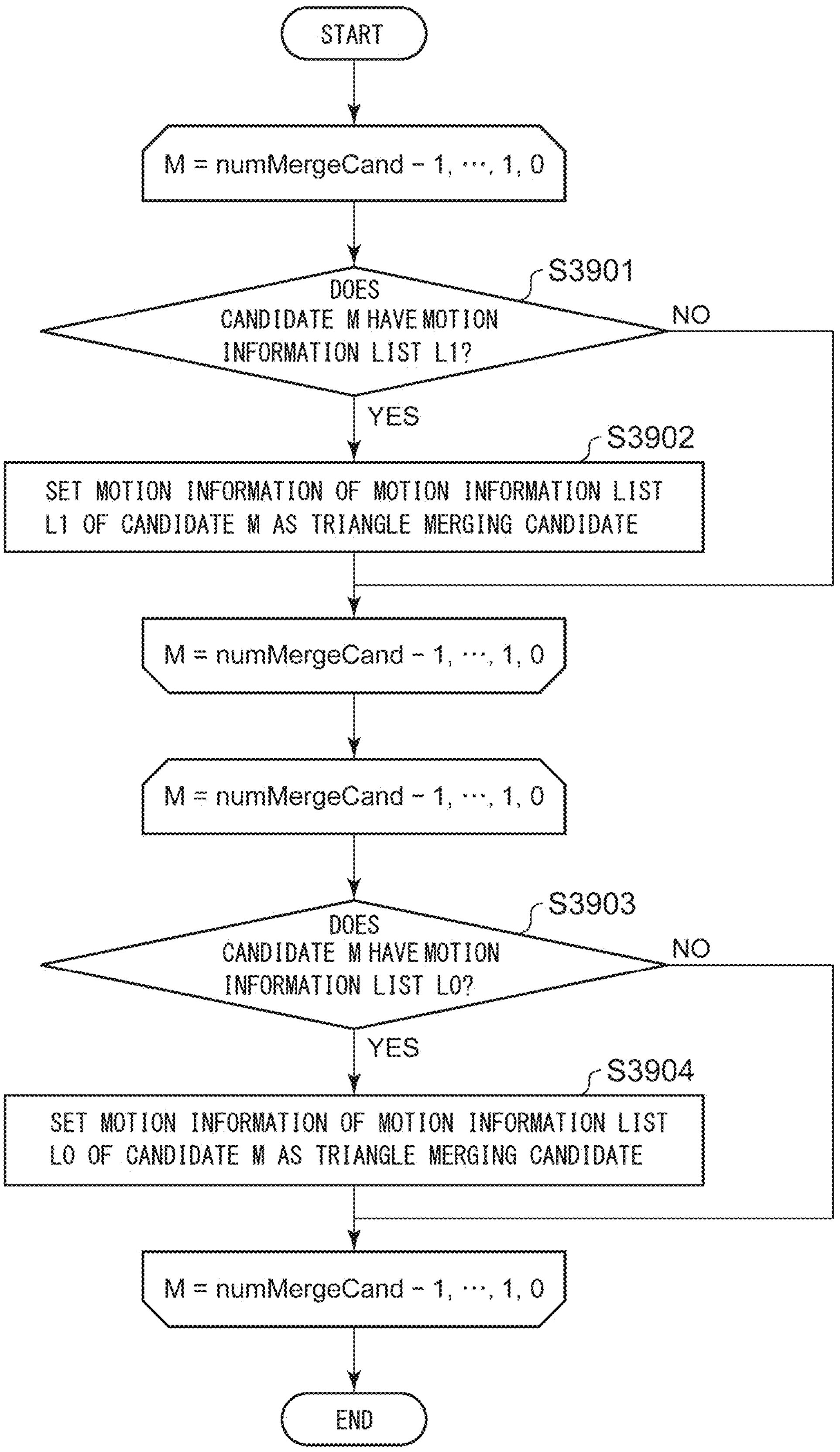
FIG. 45 is a flowchart illustrating derivation of uni-prediction motion information of a merge triangle partition 1 according to the second embodiment.

FIG. 45 is a flowchart illustrating derivation of uni-prediction motion information of a merge triangle partition 1 according to the second embodiment.

First, it is determined whether the Mth candidate, namely, a candidate M, in the derived merging candidate list mergeCandList has motion information of the motion information list L1 (step S3901). In a case where the candidate M has the motion information of the motion information list L1, the motion information of the motion information list L1 of the candidate M is set as a triangle merging candidate (step S3902). Steps S3901 to S3902 are performed in descending order on the candidates M(M=numMergeCand−1, . . . , 1, 0) so as to additionally derive the triangle merging candidates.

Subsequently, it is determined whether the Mth candidate, namely, the candidate M, in the derived merging candidate list mergeCandList has motion information of the motion information list L0 (step S3903). In a case where the candidate M has the motion information of the motion information list L0, the motion information of the motion information list L0 of the candidate M is set as a triangle merging candidate (step S3904). Steps S3903 to S3904 are performed in descending order on the candidates M(M=numMergeCand−1, . . . , 1, 0) so as to additionally derive the triangle merging candidates.

FIGS. 46A and 46B are diagrams illustrating an example of the motion information of the triangle merging candidate according to the second embodiment. FIG. 46A illustrates an example of the merging candidate list, which is similar to FIG. 43A.

FIG. 46B is a diagram illustrating a status of the uni-prediction motion information candidates of the merge triangle partition 0 and the uni-prediction motion information of the merge triangle partition 1 in the case of the example of the merging candidate list of FIG. 46A.

The uni-prediction motion information candidates of the merge triangle partition 0 are configured with the motion information in the order of MV0_L0, MV1_L0, MV3_L0, MV4_L0, and MV0_L1, while the uni-prediction motion information candidates of the merge triangle partition 1 are configured with the motion information in the order of MV3_L1, MV2_L1, MV0_L1, MV4_L0, and MV3_L0.

Here, the maximum values of the merge triangle index 0 (merge_triangle_idx0) and the merge triangle index 1 (merge_triangle_idx1) are the same as the merge index (merge_idx). That is, the maximum number of triangle merging candidates of each of the merge triangle partition 0 and the merge triangle partition 1 is equal to the maximum number of merging candidates MaxNumMergeCand. This allows the context of Context-based Adaptive Binary Arithmetic Coding (CABAC) to be used in common among the merge index, the merge triangle index 0, and the merge triangle index 1, making it possible to achieve simplification and memory saving regarding the parsing and the context table. Note that the maximum value (maximum number of merging candidates) of the merge index is encoded (decoded) by a Sequence Parameter Set (SPS). In addition, the maximum values (maximum number of triangle merging candidates) of the merge triangle index 0 and the merge triangle index 1 are also encoded (decoded) by the SPS.

In this manner, the present invention is characterized by changing the priority order of the motion information in the merge triangle partition 0 and the merge triangle partition 1, suppressing the possibility of duplication of the motion information of the merge triangle partition 0 and the merge triangle partition 1 while reusing the merging candidate list, and deriving a triangle merging candidate with high coding efficiency. The uni-prediction motion information of the merge triangle partition 0 may be derived with priority on the motion information list L1, and the uni-prediction motion information of the merge triangle partition 1 may be derived with priority on the motion information list L0.

First Modification

In the first modification, compared with the second embodiment, the merge triangle index is different and the maximum number of triangle merging candidates differs between the merge triangle index 0 and the merge triangle index 1. Here, it is assumed that the maximum number of triangle merging candidates of the merge triangle index 1 is smaller by one than the maximum number of triangle merging candidates of the merge triangle index 0. At this time, the merging candidate selected with the merge triangle index 0 is excluded as the uni-prediction motion information candidate of the merge triangle index 1. That is, the maximum number of triangle merging candidates of the merge triangle index 0 is the same as the maximum number of merging candidates of the merge index, while the maximum number of triangle merging candidates of the merge triangle index 1 is smaller by 1 than the maximum number of merging candidates of the merge index.

As described above, by setting the maximum number of merge triangle indexes 1 smaller by 1 than the merge triangle index 0, the coding efficiency is improved in a bitstream such as Truncated Unary in which the coding efficiency is improved according to the number of candidates. Furthermore, the coding efficiency is improved by excluding duplication with merging candidates.

Here, in typical video coding, the utilization rate of the triangle merge mode is lower than the utilization rate of the normal merge mode. Therefore, the maximum number of triangle merging candidates of the merge triangle index 0 may be set smaller than the maximum number of merging candidates of the merge index. In addition, the closer the candidate in the merging candidate list to the head, the higher the validity and selection rate of the candidate; the farther the candidate is from the head, the lower the validity and selection rate of the candidate. Therefore, in the triangle merge mode, the selection rate of candidates far from the head, that is, the candidates having the large merge triangle index 0 or the large merge triangle index 1 will be low, making it possible to improve the processing efficiency while suppressing the decrease in the coding efficiency.

In all the embodiments described above, the bitstream output from the picture coding device has a specific data format so as to be decoded following the coding method used in the embodiment. Furthermore, the picture decoding device corresponding to the picture coding device is capable of decoding the bitstream of the specific data format.

In a case where a wired or wireless network is used to exchange a bitstream between the picture coding device and the picture decoding device, the bitstream may be converted to a data format suitable for the transmission form of the communication channel in transmission. In this case, there are provided a transmission device that converts the bitstream output from the picture coding device into coded data in a data format suitable for the transmission form of the communication channel and transmits the coded data to the network, and a reception device that receives the coded data from the network to be restored to the bitstream and supplies the bitstream to the picture decoding device. The transmission device includes memory that buffers a bitstream output from the picture coding device, a packet processing unit that packetizes the bitstream, and a transmitter that transmits packetized coded data via a network. The reception device includes a receiver that receives a packetized coded data via a network, memory that buffers the received coded data, and a packet processing unit that packetizes coded data to construct a bitstream and supplies the constructed bitstream to the picture decoding device.

Moreover, a display unit that displays a picture decoded by the picture decoding device may be added, as a display device, to the configuration. In that case, the display unit reads out a decoded picture signal constructed by the decoded picture signal superimposer 207 and stored in the decoded picture memory 208, and displays the signal on the screen.

Moreover, an imaging unit may be added to the configuration so as to function as an imaging device by inputting a captured picture to the picture coding device. In that case, the imaging unit inputs the captured picture signal to the block split unit 101.

Figure 37:
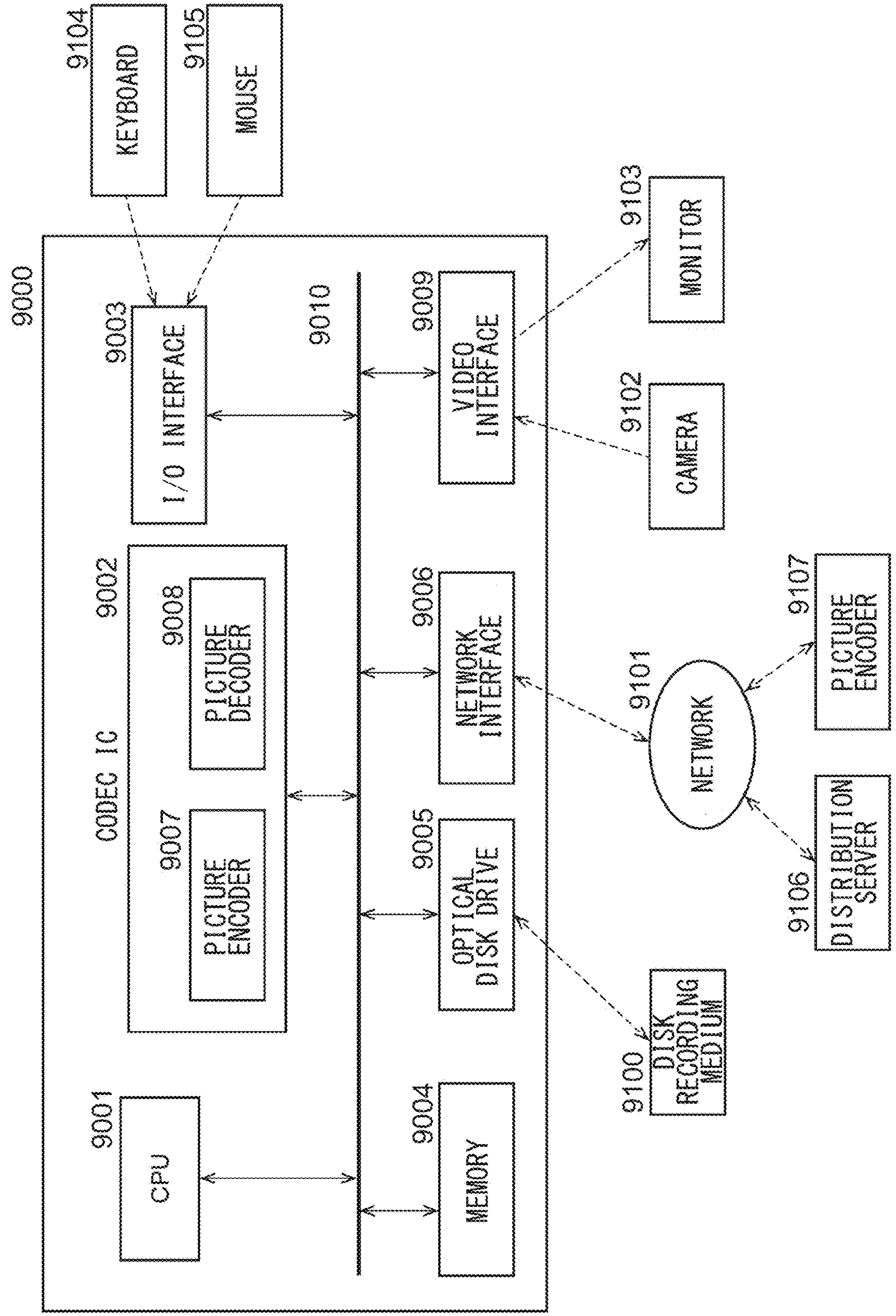
FIG. 37 is a diagram illustrating an example of a hardware configuration of a coding-decoding device according to an embodiment of the present invention.

FIG. 37 illustrates an example of a hardware configuration of the coding-decoding device according to the present embodiment. The coding-decoding device includes the configurations of the picture coding device and the picture decoding device according to the embodiments of the present invention. A coding-decoding device 9000 includes a CPU 9001, a codec IC 9002, an I/O interface 9003, memory 9004, an optical disk drive 9005, a network interface 9006, and a video interface 9009, in which individual units are connected by a bus 9010.

A picture encoder 9007 and a picture decoder 9008 are typically implemented as a codec IC 9002. The picture coding process of the picture coding device according to the embodiments of the present invention is executed by the picture encoder 9007. The picture decoding process in the picture decoding device according to the embodiment of the present invention is executed by the picture decoder 9008. The I/O interface 9003 is implemented by a USB interface, for example, and connects to an external keyboard 9104, mouse 9105, or the like. The CPU 9001 controls the coding-decoding device 9000 on the basis of user's operation input via the I/O interface 9003 so as to execute operation desired by the user. The user's operations on the keyboard 9104, the mouse 9105, or the like include selection of which function of coding or decoding is to be executed, coding quality setting, input/output destination of a bitstream, input/output destination of a picture, or the like.

In a case where the user desires operation of reproducing a picture recorded on a disk recording medium 9100, the optical disk drive 9005 reads out a bitstream from the inserted disk recording medium 9100, and transmits the readout bitstream to the picture decoder 9008 of the codec IC 9002 via the bus 9010. The picture decoder 9008 executes a picture decoding process in the picture decoding device according to the embodiments of the present invention on the input bitstream, and transmits the decoded picture to the external monitor 9103 via the video interface 9009. The coding-decoding device 9000 has a network interface 9006, and can be connected to an external distribution server 9106 and a mobile terminal 9107 via a network 9101. In a case where the user desires to reproduce a picture recorded on the distribution server 9106 or the mobile terminal 9107 instead of the picture recorded on the disk recording medium 9100, the network interface 9006 obtains a bitstream from the network 9101 instead of reading out a bitstream from the input disk recording medium 9100. In a case where the user desires to reproduce the picture recorded in the memory 9004, the picture decoding processing is performed by the picture decoding device according to the embodiments of the present invention on the bitstream recorded in the memory 9004.

In a case where the user desires to perform operation of coding a picture captured by an external camera 9102 and recording the picture in the memory 9004, the video interface 9009 inputs the picture from the camera 9102, and transmits the picture to the picture encoder 9007 of the codec IC 9002 via the bus 9010. The picture encoder 9007 executes the picture coding process by the picture coding device according to the embodiment of the present invention on a picture input via the video interface 9009 and thereby creates a bitstream. Subsequently, the bitstream is transmitted to the memory 9004 via the bus 9010. In a case where the user desires to record a bitstream on the disk recording medium 9100 instead of the memory 9004, the optical disk drive 9005 writes the bitstream on the inserted disk recording medium 9100.

It is also possible to implement a hardware configuration having a picture coding device and not having a picture decoding device, or a hardware configuration having a picture decoding device and not having a picture coding device. Such a hardware configuration is implemented by replacing the codec IC 9002 with the picture encoder 9007 or the picture decoder 9008.

The above-described process related to coding and decoding may naturally be implemented as a transmission, storage, and reception device using hardware, and alternatively, the process may be implemented by firmware stored in read only memory (ROM), flash memory, or the like, or by software provided for a computer or the like. The firmware program and the software program may be provided by being recorded on a recording medium readable by a computer or the like, may be provided from a server through a wired or wireless network, or may be provided through data broadcasting by terrestrial or satellite digital broadcasting.

The present invention has been described with reference to the present embodiments. The above-described embodiment has been described merely for exemplary purposes. Rather, it can be readily conceived by those skilled in the art that various modification examples may be made by making various combinations of the above-described components or processes, which are also encompassed in the technical scope of the present invention.

The present invention can be used for picture coding and decoding techniques that split a picture into blocks to perform prediction.

100 Picture coding device, 101 Block split unit, 102 Inter prediction unit, 103 Intra prediction unit, 104 Decoded picture memory, 105 Prediction method determiner, 106 Residual generation unit, 107 Orthogonal transformer/quantizer, 108 Bit strings coding unit, 109 Inverse quantizer/inverse orthogonal transformer, 110 Decoded picture signal superimposer, 111 Coding information storage memory, 200 Picture decoding device, 201 Bit strings decoding unit, 202 Block split unit, 203 Inter prediction unit, 204 Intra prediction unit, 205 Coding information storage memory, 206 Inverse quantizer/inverse orthogonal transformer, 207 Decoded picture signal superimposer, 208 Decoded picture memory.

What is claimed is:

1. A picture coding device for coding a moving picture using a merge mode and forming a bitstream, the picture coding device comprising:

a normal merging candidate list constructor structured to construct a normal merging candidate list including normal merging candidates;

a normal merging candidate selector structured to select a normal merging candidate being uni-prediction or bi-prediction from the normal merging candidate list based on a merge index;

a triangle merging candidate selector structured to select a first triangle merging candidate being uni-prediction from the normal merging candidate list based on a first triangle merge index and select a second triangle merging candidate being uni-prediction from the normal merging candidate list based on a second triangle merge index; and a coding unit structured to code the merging index, or the first triangle merge index and the second triangle merge index, wherein the first triangle merging candidate is selected with priority on the merging candidate in L0 motion information list over the merging candidate in L1 motion information list, and wherein the second triangle merging candidate is selected with priority on the merging candidate in L1 motion information list over the merging candidate in L0 motion information list.

2. A picture coding method for coding a moving picture using a merge mode and forming a bitstream, the picture coding method comprising:

a normal merging candidate list construction step of constructing a normal merging candidate list including normal merging candidates;

a normal merging candidate selecting step of selecting a normal merging candidate being uni-prediction or bi-prediction from the normal merging candidate list based on a merge index;

a triangle merging candidate selecting step of selecting a first triangle merging candidate being uni-prediction from the normal merging candidate list based on a first triangle merge index and select a second triangle merging candidate being uni-prediction from the normal merging candidate list based on a second triangle merge index; and a coding step of coding the merging index, or the first triangle merge index and the second triangle merge index, wherein the first triangle merging candidate is selected with priority on the merging candidate in L0 motion information list over the merging candidate in L1 motion information list, and wherein the second triangle merging candidate is selected with priority on the merging candidate in L1 motion information list over the merging candidate in L0 motion information list.

3. A picture decoding device using a merge mode, the picture decoding device comprising:

a decoding unit structured to decode a merging index, or a first triangle merge index and a second triangle merge index, a normal merging candidate list constructor structured to construct a normal merging candidate list including normal merging candidates;

a normal merging candidate selector structured to select a normal merging candidate being uni-prediction or bi-prediction from the normal merging candidate list based on the merge index; and a triangle merging candidate selector structured to select a first triangle merging candidate being uni-prediction from the normal merging candidate list based on the first triangle merge index and select a second triangle merging candidate being uni-prediction from the normal merging candidate list based on the second triangle merge index, wherein the first triangle merging candidate is selected with priority on the merging candidate in L0 motion information list over the merging candidate in L1 motion information list, and wherein the second triangle merging candidate is selected with priority on the merging candidate in L1 motion information list over the merging candidate in L0 motion information list.

4. A picture decoding method using a merge mode, the picture decoding method comprising:

a decoding step of decoding a merging index, or a first triangle merge index and a second triangle merge index, a normal merging candidate list construction step of constructing a normal merging candidate list including normal merging candidates;

a normal merging candidate selecting step of selecting a normal merging candidate being uni-prediction or bi-prediction from the normal merging candidate list based on the merge index; and a triangle merging candidate selecting step of selecting a first triangle merging candidate being uni-prediction from the normal merging candidate list based on the first triangle merge index and selecting a second triangle merging candidate being uni-prediction from the normal merging candidate list based on the second triangle merge index, wherein the first triangle merging candidate is selected with priority on the merging candidate in L0 motion information list over the merging candidate in L1 motion information list, and wherein the second triangle merging candidate is selected with priority on the merging candidate in L1 motion information list over the merging candidate in L0 motion information list.

5. A method for storing a bitstream formed by coding a moving picture, comprising:

a normal merging candidate list construction step of constructing a normal merging candidate list including normal merging candidates;

a normal merging candidate selecting step of selecting a normal merging candidate being uni-prediction or bi-prediction from the normal merging candidate list based on a merge index;

a triangle merging candidate selecting step of selecting a first triangle merging candidate being uni-prediction from the normal merging candidate list based on a first triangle merge index and select a second triangle merging candidate being uni-prediction from the normal merging candidate list based on a second triangle merge index;

a coding step of coding the merging index, or the first triangle merge index and the second triangle merge index to form a bitstream; and a storing step of storing the bitstream on a recording medium, wherein the first triangle merging candidate is selected with priority on the merging candidate in L0 motion information list over the merging candidate in L1 motion information list, and wherein the second triangle merging candidate is selected with priority on the merging candidate in L1 motion information list over the merging candidate in L0 motion information list.

6. A method for transmitting a bitstream formed by coding a moving picture, comprising:

a normal merging candidate list construction step of constructing a normal merging candidate list including normal merging candidates;

a normal merging candidate selecting step of selecting a normal merging candidate being uni-prediction or bi-prediction from the normal merging candidate list based on a merge index;

a triangle merging candidate selecting step of selecting a first triangle merging candidate being uni-prediction from the normal merging candidate list based on a first triangle merge index and select a second triangle merging candidate being uni-prediction from the normal merging candidate list based on a second triangle merge index;

a coding step of coding the merging index, or the first triangle merge index and the second triangle merge index to form a bitstream; and a transmitting step of transmitting the bitstream, wherein the first triangle merging candidate is selected with priority on the merging candidate in L0 motion information list over the merging candidate in L1 motion information list, and wherein the second triangle merging candidate is selected with priority on the merging candidate in L1 motion information list over the merging candidate in L0 motion information list.

* * * * *